US012637342B2

(12) United States Patent
Ferranti et al.

(10) Patent No.: US 12,637,342 B2
(45) Date of Patent: May 26, 2026

(54) CONTAINER OPENER

(71) Applicant: Draft Top, Inc., Ewing, NJ (US)

(72) Inventors: Armand Joseph Ferranti, Long Branch, NJ (US); Alexander Armand Caracappa, Medford, MA (US); Lyra Turner, E. Montpelier, VT (US)

(73) Assignee: Draft Top, Inc., Ewing, NJ (US)

(*) Notice: Subject to any disclaimer, the term of this patent is extended or adjusted under 35 U.S.C. 154(b) by 0 days.

(21) Appl. No.: 18/860,073

(22) PCT Filed: Apr. 26, 2023

(86) PCT No.: PCT/US2023/019944
§ 371 (c)(1),
(2) Date: Oct. 25, 2024

(87) PCT Pub. No.: WO2023/212030
PCT Pub. Date: Nov. 2, 2023

(65) Prior Publication Data

US 2025/0282599 A1 Sep. 11, 2025

Related U.S. Application Data

(60) Provisional application No. 63/335,518, filed on Apr. 27, 2022.

(51) Int. Cl.
*B67B 7/00* (2006.01)

(52) U.S. Cl.
CPC .................................... *B67B 7/38* (2013.01)

(58) Field of Classification Search
CPC .... B67B 7/34; B67B 7/16; B67B 7/44; B67B 2007/303; B67B 7/38
See application file for complete search history.

(56) References Cited

U.S. PATENT DOCUMENTS

| | | | | |
|---|---|---|---|---|
| 1,018,266 | A | 2/1912 | Polakovich | |
| 1,530,024 | A | 3/1925 | Washburn | |
| 2,176,714 | A * | 10/1939 | Hoppenstand | B67B 7/30 7/152 |
| 2,749,612 | A * | 6/1956 | Blue | B67B 7/34 30/442 |
| 4,155,160 | A * | 5/1979 | Bobo | B67B 7/34 30/435 |

(Continued)

FOREIGN PATENT DOCUMENTS

AT 112582 B 3/1929

OTHER PUBLICATIONS

International Search Report and Written Opinion for PCT International Application No. PCT/US2023/019944 issued Sep. 8, 2023, 17 pages.

(Continued)

*Primary Examiner* — Andrew M Tecco
*Assistant Examiner* — Nicholas E Igbokwe
(74) *Attorney, Agent, or Firm* — Duane Morris LLP

(57) ABSTRACT

A container opener includes a clamp that holds a container; a puncturing device that punctures a lid of the container held in the clamp; a blade that cuts the lid from the container while the blade and the container rotate with respect to each other: and a separating device that separates the puncturing device from the lid.

18 Claims, 104 Drawing Sheets

(56) References Cited

U.S. PATENT DOCUMENTS

| | | | | | |
|---|---|---|---|---|---|
| 4,633,589 | A * | 1/1987 | Gray | B67B 7/34 30/427 |
| 5,228,203 | A * | 7/1993 | Hahn | B67B 7/385 30/418 |
| 6,158,130 | A * | 12/2000 | Chong | B67B 7/36 30/418 |
| 10,633,236 | B1 | 4/2020 | Harris et al. | |
| 2003/0150297 | A1 * | 8/2003 | Mazur | B67B 7/14 81/3.09 |
| 2005/0028646 | A1 * | 2/2005 | Hefti | B67B 7/18 81/3.4 |
| 2008/0307659 | A1 * | 12/2008 | Freeman | B67B 7/34 30/410 |
| 2015/0014354 | A1 * | 1/2015 | Kellenberger | B65D 81/3876 222/83 |
| 2017/0355583 | A1 * | 12/2017 | Kelly | B67B 7/16 |

OTHER PUBLICATIONS

Examination Report issued for Australian Patent Application No. 2023263317 dated Nov. 12, 2025, 4 pages.

Examination Report No. 2 issued for Australian Patent Application No. 2023263317 dated Jan. 20, 2026, 5 pages.

* cited by examiner

SECTION D-D

100

SECTION E-E

100

SECTION J-J

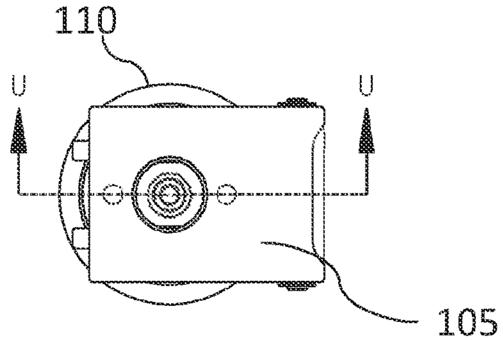
Fig. 16A
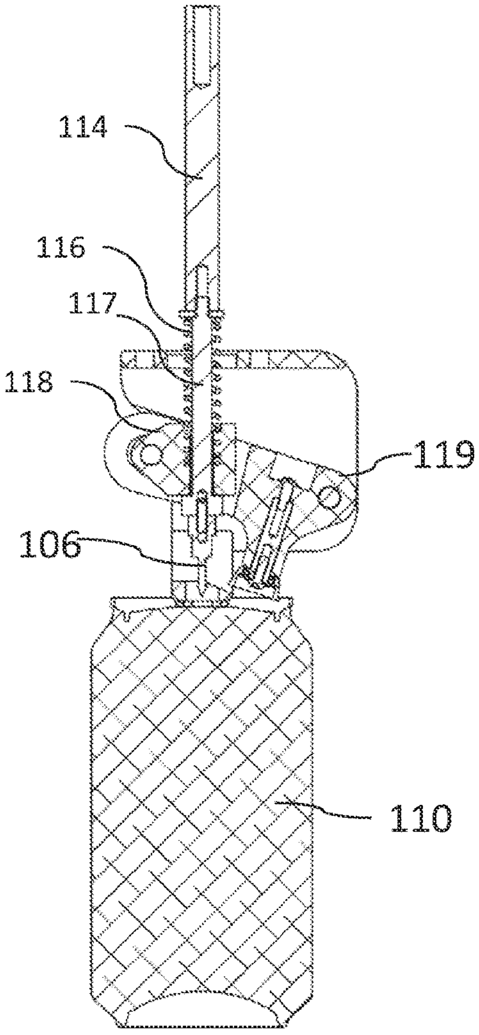
SECTION U-U
Fig. 16B
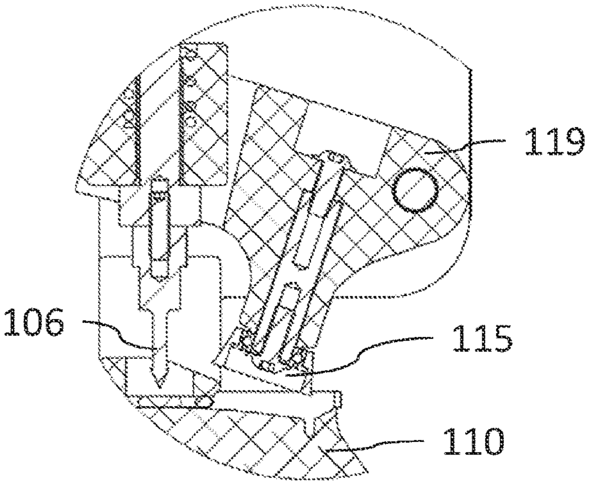
DETAIL M
SCALE 1 : 1

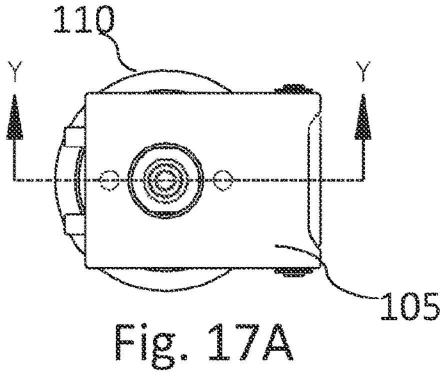
Fig. 17A
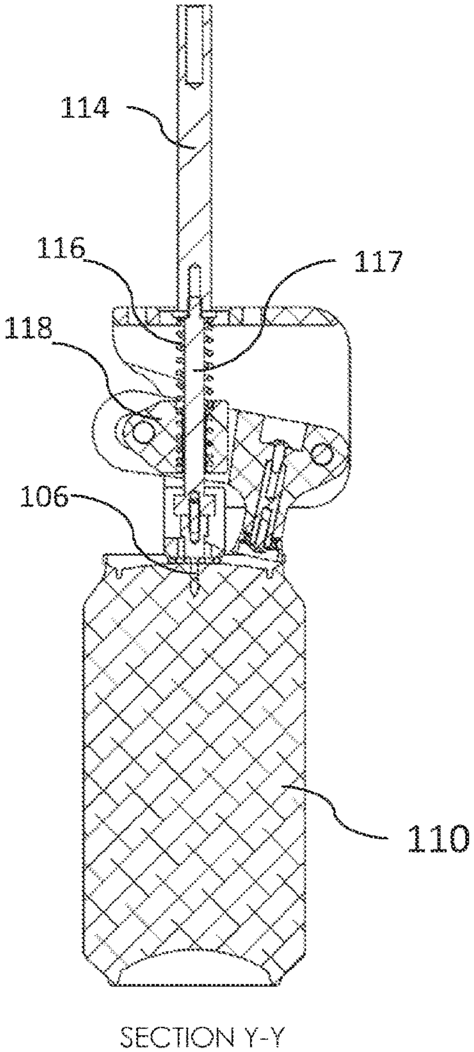
Fig. 17B
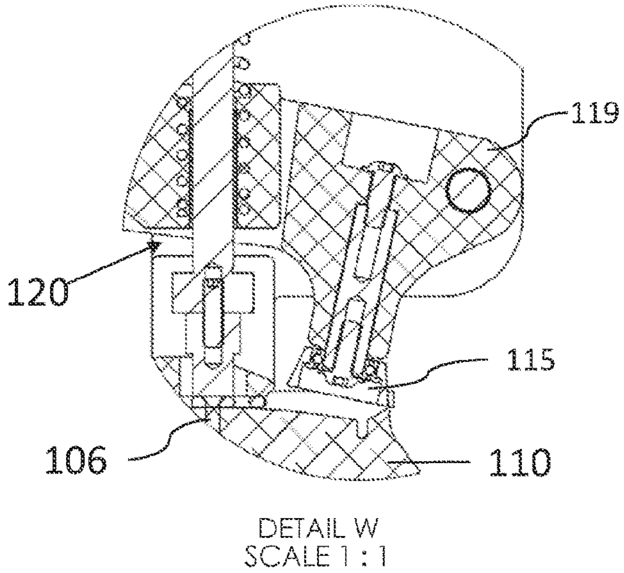

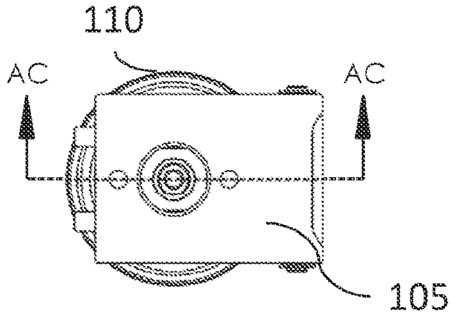
Fig. 18A
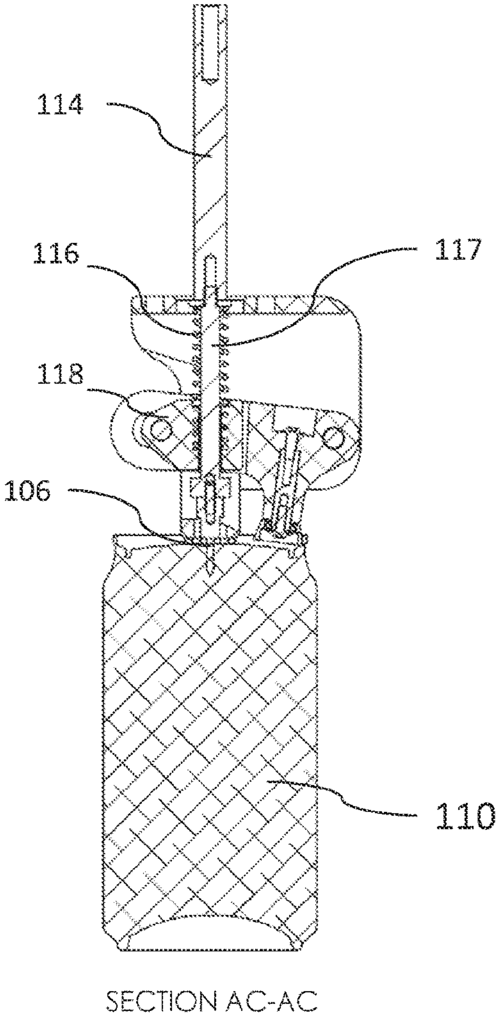
Fig. 18B
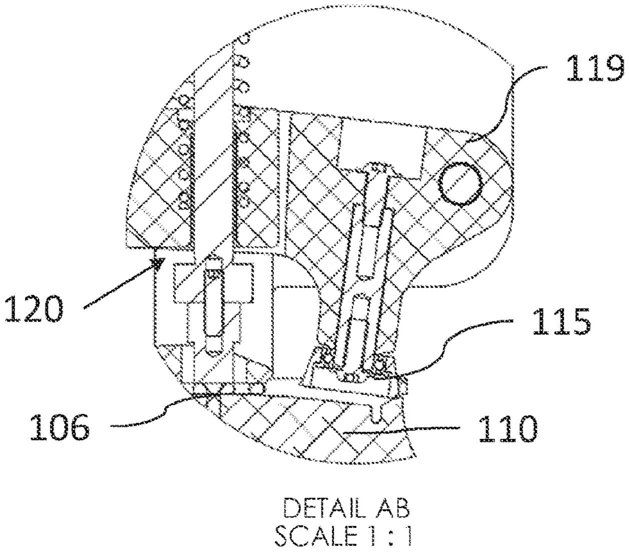

SECTION AF-AF

SECTION AG-AG

SECTION AK-AK

SECTION AL-AL

200

SECTION AB-AB

200

SECTION F-F

200

SECTION J-J

SECTION C-C

SECTION G-G

SECTION K-K

SECTION L-L

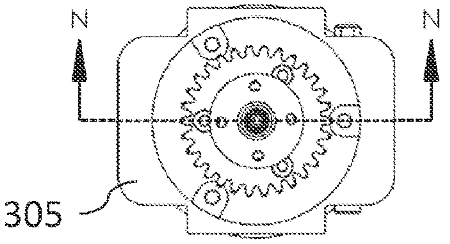
Fig. 78A
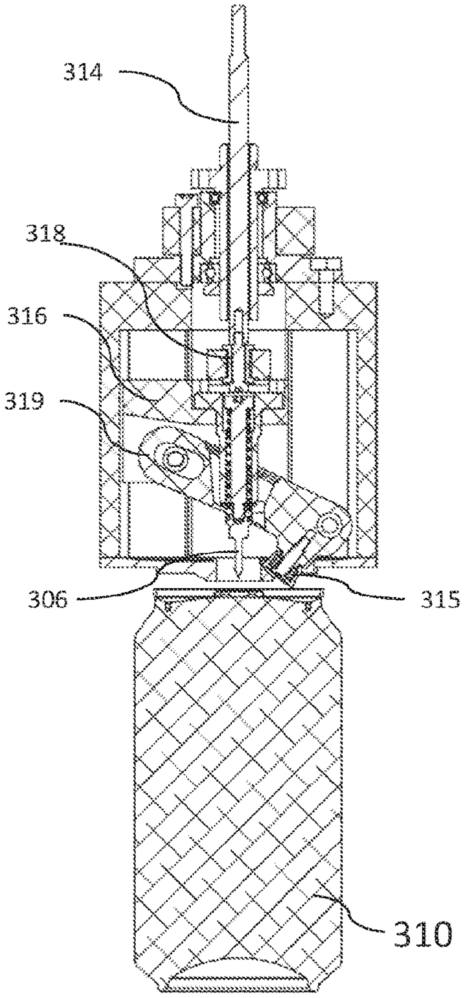
SECTION N-N
Fig. 78B
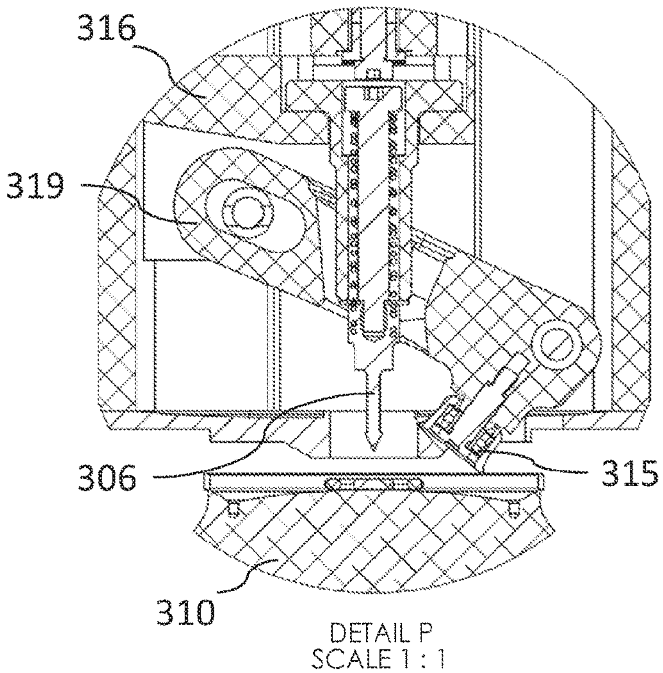
DETAIL P
SCALE 1 : 1

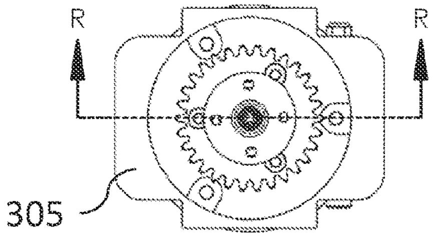
Fig. 79A
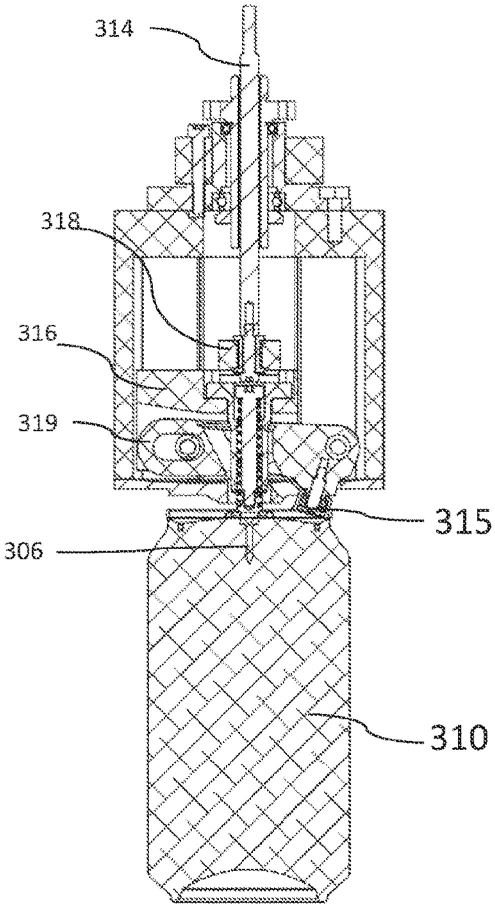
SECTION R-R
Fig. 79B
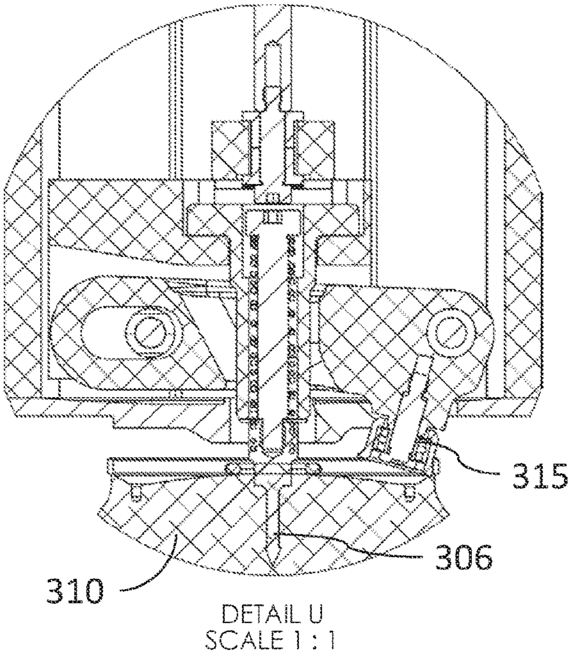
DETAIL U
SCALE 1 : 1

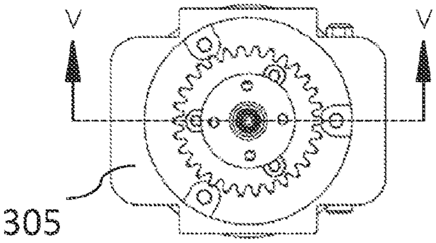
Fig. 80A
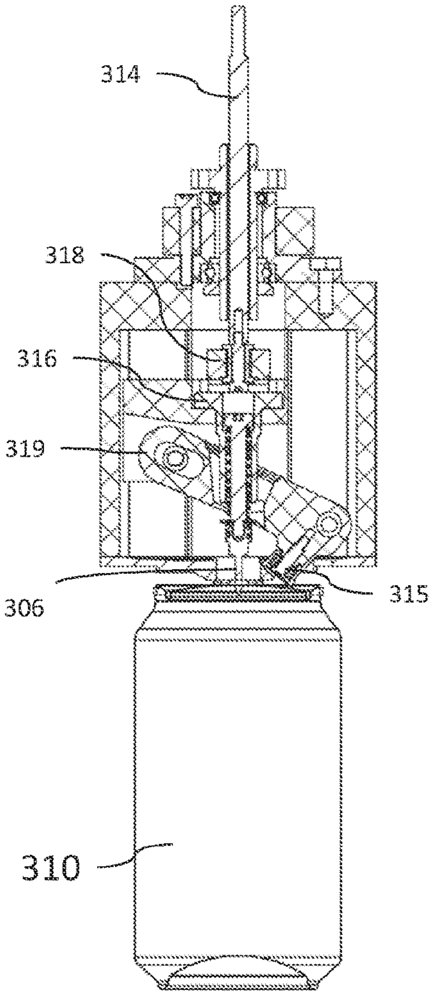
SECTION V-V
Fig. 80B
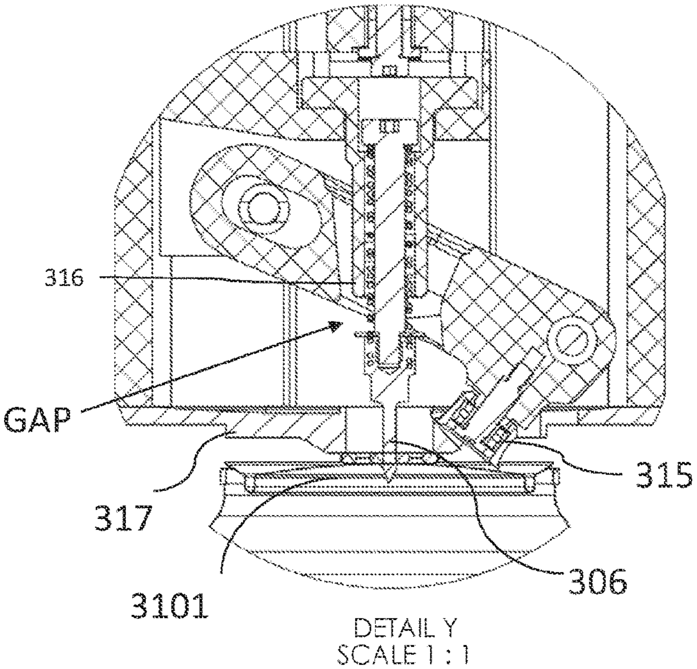
DETAIL Y
SCALE 1 : 1

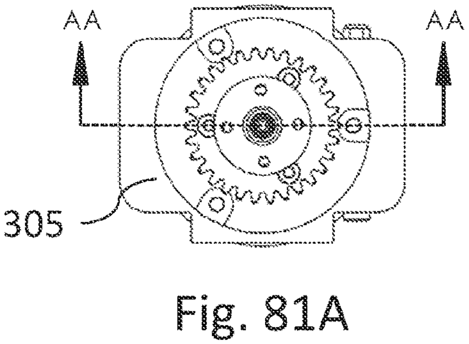
Fig. 81A
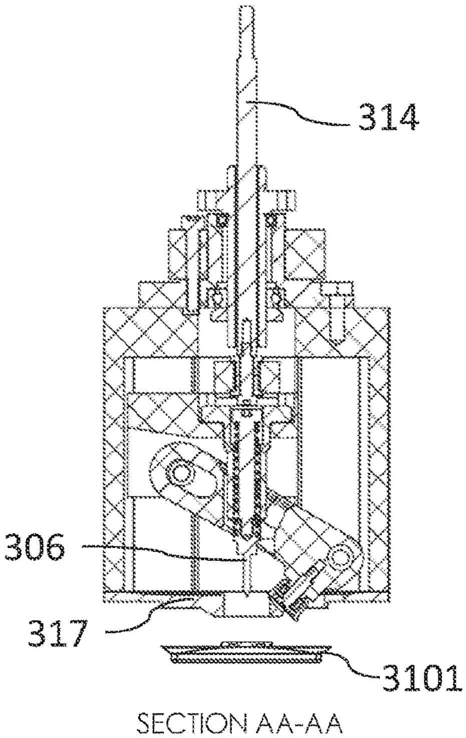
Fig. 81B
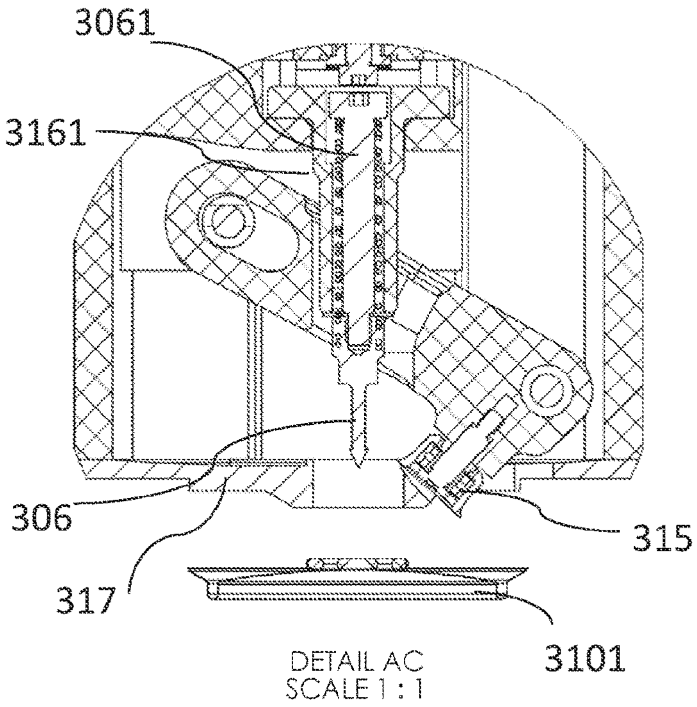

SECTION J-J

DETAIL N
SCALE 2 : 1

SECTION J-J
SCALE 1 : 1

SECTION M-M
SCALE 1 : 1

SECTION C-C

SECTION D-D

SECTION G-G

SECTION E-E

SECTION F-F

CONTAINER OPENER

CROSS REFERENCE TO RELATED APPLICATIONS

This application is a National Stage Application, filed under 35 U.S.C. 371, of International Patent Application No. PCT/US2023/019944, filed on Apr. 26, 2023, which claims the benefit of U.S. Provisional Patent Application No. 63/335,518, filed Apr. 27, 2022, each of which is hereby incorporated by reference in its entirety for all purposes as if fully set forth herein.

FIELD

The present disclosure generally relates to the technical field of cutlery and bar utensils, and in particular, an apparatus and method for opening a planar portion of a sealed container.

BACKGROUND

Traditional opening devices remove a planar upper surface of a sealed container. However, these devices are limited in the types of containers they can open and are constrained in the method of accessing the container contents.

A recent trend among soda or beverage cans, e.g., beer cans, is to engage the installed tab located at the planar top surface of the can while including a perforated indentation opposite the tab to improve flow of the soda or beverage from the can once opened. However, this conventional technique requires a separate tool, such as a key or other instrument, to puncture the perforated indentation. In addition, for applications in a bar, restaurant, or concession environment, the two-step process of this conventional technique is cumbersome or impractical that inhibits a bartender or concession worker from quickly opening and delivering the container. Moreover, engaging the installed tab and puncturing the perforated indentation may only increase flow of the liquid from the can based on the limited dimensions of the tabbed mouth opening. For example, the perforated indentation constrains the flow of denser liquids. Concurrently, the developmental costs for changing and implementing a perforated indentation design are impractical for the limited amount of target consumers. Moreover, the conventional installed tab, the conventional installed tab and perforated indentation, or traditional opening devices create only a small opening in the container. However, this small opening hinders the user from smelling the full aroma of the container contents. e.g., beer, thereby effecting the user's sense of taste.

Additionally, traditional opening devices, either manually operated or machine operated, present various access challenges for planar top containers without an engagement tab or mouth. For example, manually operated opening devices use a single blade to remove the entire planar upper surface. These conventional devices require many rotations of a handle or crank to utilize the single blade to cut around the entire circumferential edge of the container. In another example, machine operated opening devices are limited by the speed of the motor during the opening process. Furthermore, both the manually operated and machine operated devices require a user to align and engage the single blade along the circumferential edge before commencing the opening process, which is both time consuming and cumbersome. Moreover, the distance that the shoulder or lip of various containers protrudes outward from the engagement point of the blade can make the opening device ineffective by not allowing the blade to puncture and engage the container surface at an appropriate angle. The shoulder or lip also prevents certain manual devices from fitting on the can and engaging with the rim, while other machine operated devices cause the can to tip at an angle to engage which would cause the contents to spill out during the top removal process.

Additionally, although traditional manually operated and machine operated devices remove the planar upper surface of a container, these devices leave sharp edges on the container upon removal that are harmful to the user. The contents of such containers subsequently need to be removed to an intermediate container for user safety following the opening process.

SUMMARY

To overcome the problems described above, embodiments of the present disclosure include a container opener including a handle that when pulled downward creates a sequence of events, for example, clamping a container, lowering a carriage that causes (i) a barb to puncture a lid of the container, (ii) a blade to puncture the container, and (iii) rotation of the blade and the container with respect to each other to cut off a lid of the container. When the handle is pushed upward, the sequence is reversed such that the carriage is raised, the container is unclamped, and the lid is separated from the barb.

According to an embodiment of the present disclosure, a container opener includes a clamp that holds a container; a puncturing device that punctures a lid of the container held in the clamp; a blade that cuts the lid from the container while the blade and the container rotate with respect to each other; and a separating device that separates the puncturing device from the lid.

The container opener can further include a handle, wherein motion of the handle in a first direction rotates the blade and the container with respect to each other. In an aspect, motion of the handle in the first direction forces the puncturing device to puncture the lid. In an aspect, motion of the handle in a second direction causes the separating device to separate the puncturing device from the lid.

In an aspect, the clamp is configured to hold containers having different diameters.

The container opener can further include a motor that rotates the blade and the container with respect to each other.

In an aspect, the blade is a plurality of blades. In an aspect, the plurality of blades and the container rotate at least 120 degrees with respect to each other.

In an aspect, the blade and the container rotate at least 360 degrees with respect to each other.

In an aspect, the puncturing device punctures the lid in a central portion of the lid. In an aspect, the puncturing device moves a set distance to puncture the lid no matter a diameter of the container.

According to another embodiment of the present disclosure, a method of opening a container includes clamping the container; puncturing a lid of the container by a puncturing device; capturing the lid by the puncturing device; rotating a blade and the container with respect to each other to cut the lid from the container; unclamping the container: and separating the puncturing device from the lid.

In an aspect, motion of a handle in a first direction causes the clamping, the puncturing, and the rotating. In an aspect, motion of the handle in a second direction causes the unclamping, and the separating.

In an aspect, wherein the rotating is performed by a motor.

In an aspect, the blade rotates and the container is stationary.

According to another embodiment of the present disclosure a container opener includes a handle; a tab grabber to grab a tab on a lid of a container; a cutting blade; and an actuating mechanism operatively coupled to the handle, the tab grabber, and the cutting blade; wherein the actuating mechanism is configured to translate a rotational movement of the handle in a first direction to a movement of the tab grabber and the cutting blade in a vertical direction of the container opener such that the tab grabber grabs the tab of the lid of the container held in the container opener and the cutting blade cuts off the lid.

In an aspect, the actuating mechanism is configured to translate a rotational movement of the handle in a second direction to separate the tab grabber from the lid.

The above and other features, elements, characteristics, steps, and advantages of the present invention will become more apparent from the following detailed description of preferred embodiments of the present invention with reference to the attached drawings.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description.

FIG. 16A is a top view of a blade assembly including a can below.

FIG. 16B is a side cross-sectional view along U-U of FIG. 16A.

FIG. 17A is a top view of a blade assembly including a can below.

FIG. 17B is a side cross-sectional view along Y-Y of FIG. 17A.

FIG. 18A is a top view of a blade assembly including a can below.

FIG. 18B is a side cross-sectional view along AC-AC of FIG. 18A.

FIG. 76A is a top view of a handle and a gear assembly with the handle in the up position.

FIG. 76B is a right side cross-section view taken along M-M of FIG. 76A.

FIG. 77 is a top perspective view of a blade assembly.

FIG. 78A is a top view of a blade assembly.

FIG. 78B is a front cross-section view taken along N-N of FIG. 78A.

FIG. 79A is a top view of a blade assembly.

FIG. 79B is a front cross-section view taken along R-R of FIG. 79A.

FIG. 80A is a top view of a blade assembly.

FIG. 80B is a front cross-section view taken along V-V of FIG. 80A.

FIG. 81A is a top view of a blade assembly.

FIG. 81B is a front cross-section view taken along AA-AA of FIG. 81A.

FIG. 82A is a view of a plunger.

Figure 82A:
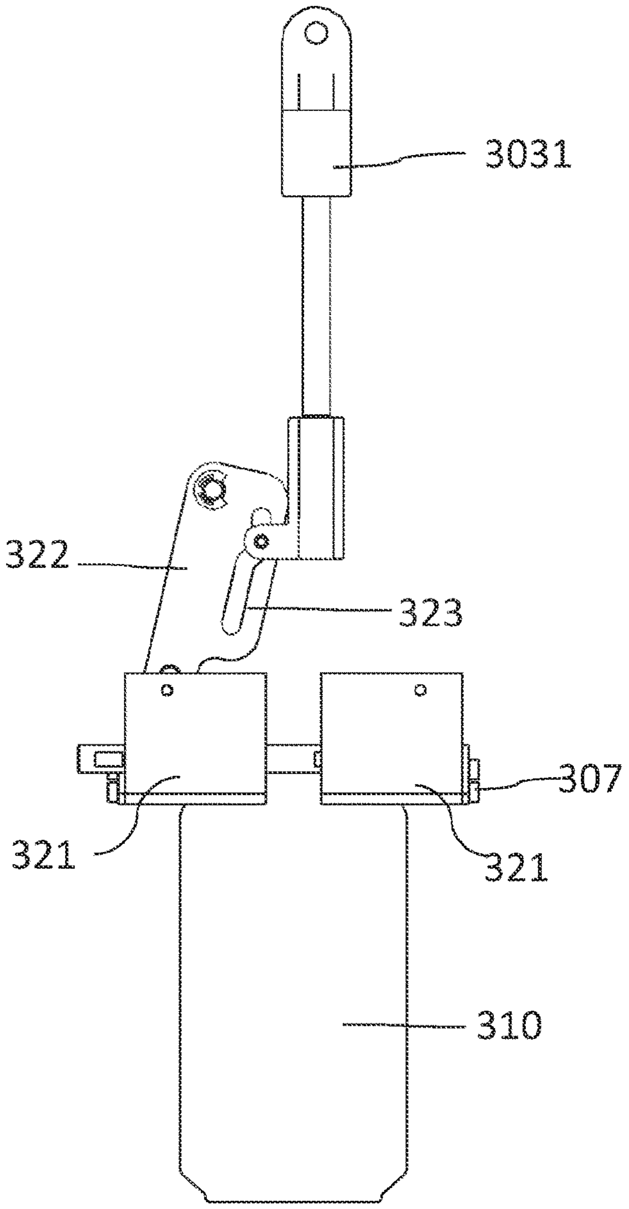
Figure 82B:
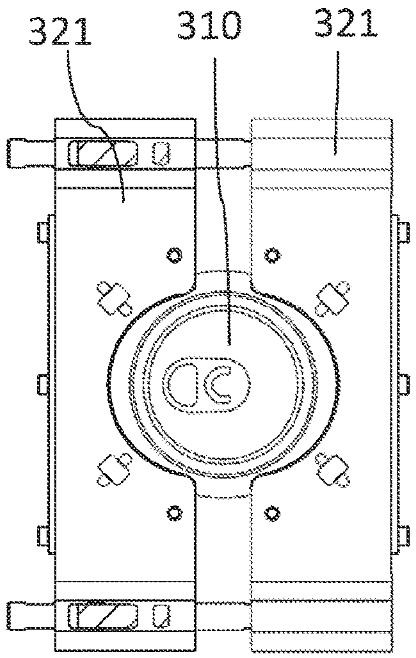

FIG. 82B is a top view of a clamp assembly.

Figure 83A:
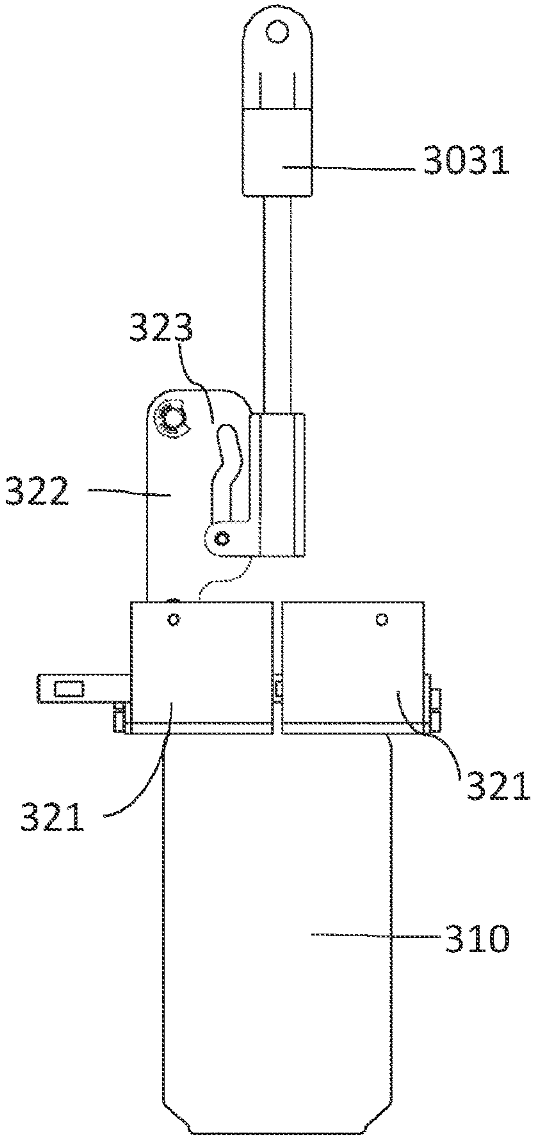

FIG. 83A is a view of a plunger.

Figure 83B:
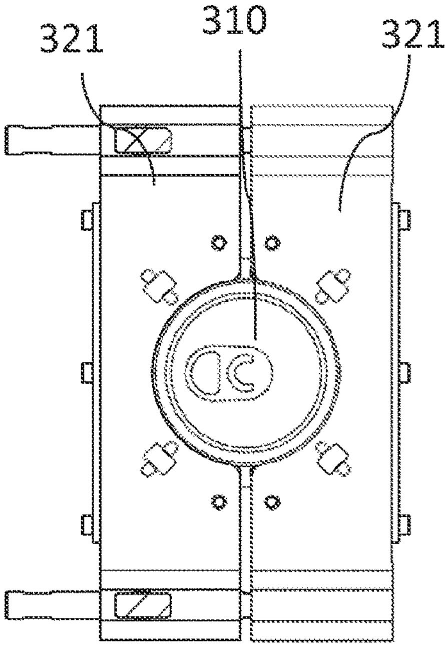

FIG. 83B is a top view of a clamp assembly.

Figure 84:
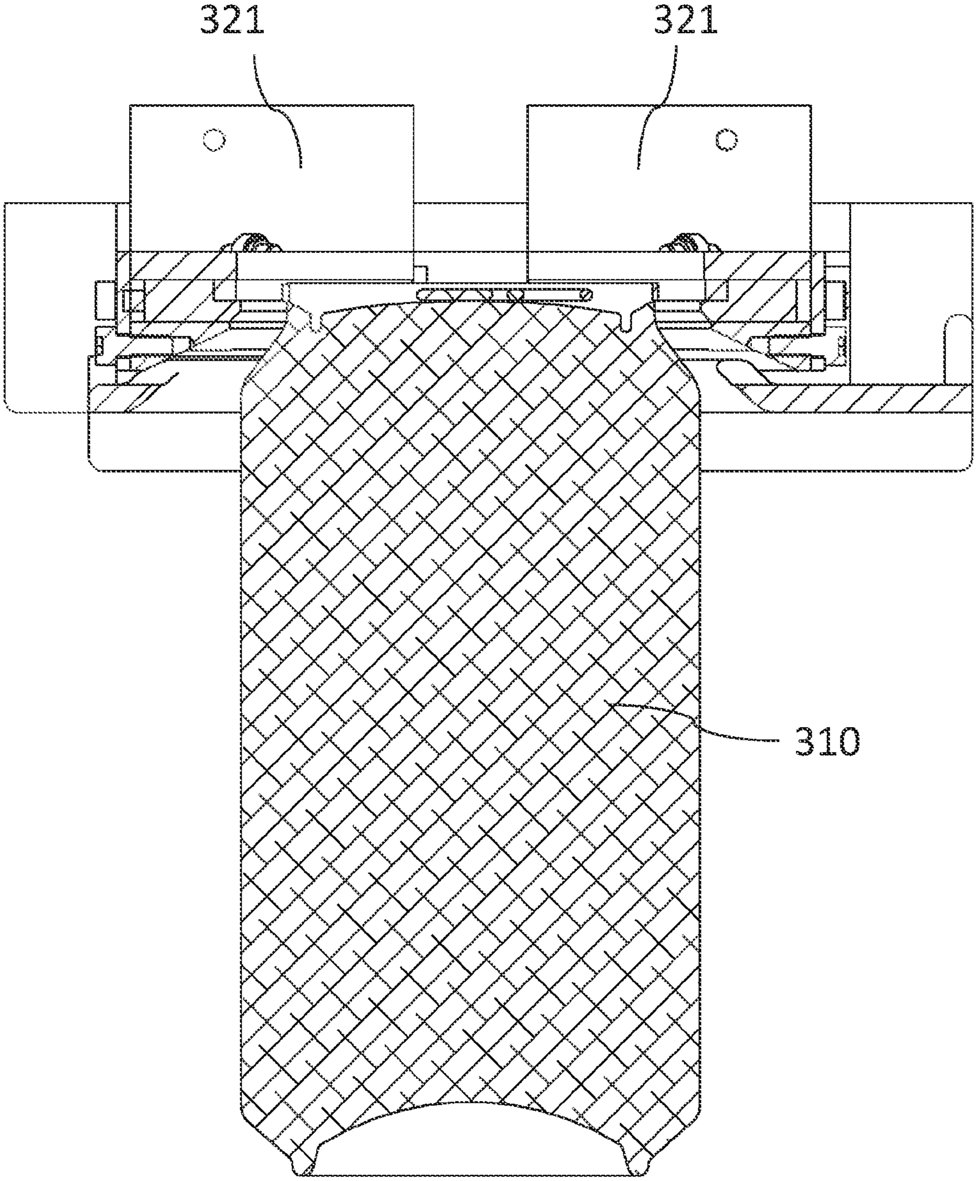
Figure 85:
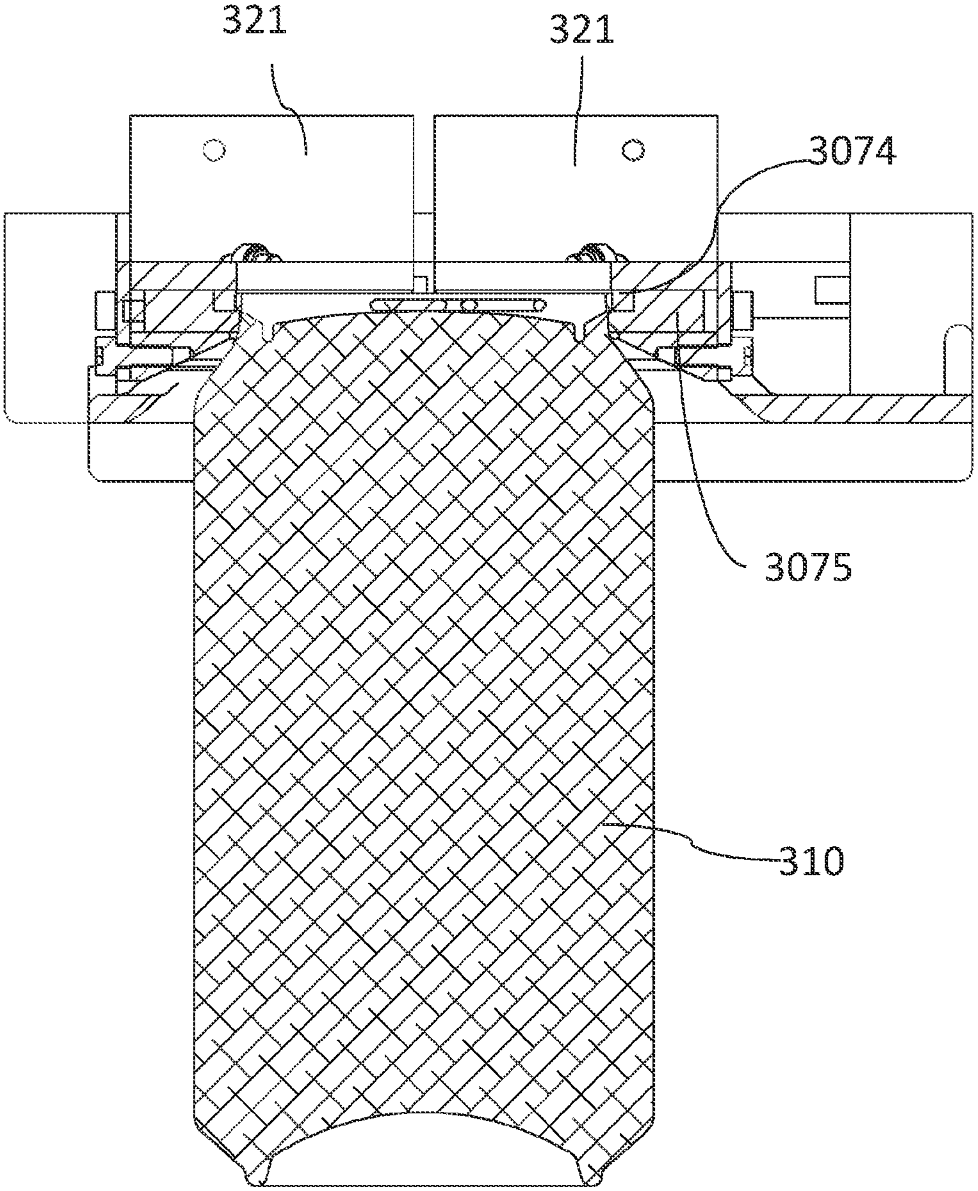

FIG. 84 and FIG. 85 are side views of a clamp assembly.

Figure 86:
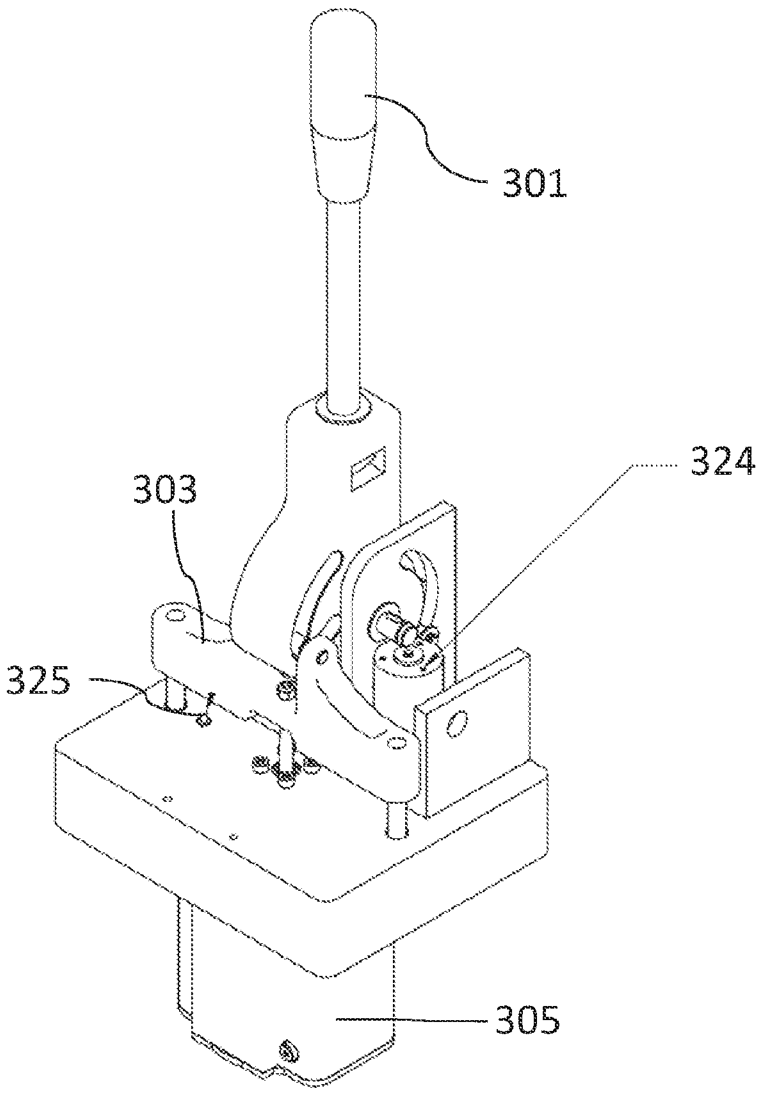

FIG. 86 shows an alternative configuration including a motor.

Figure 87:
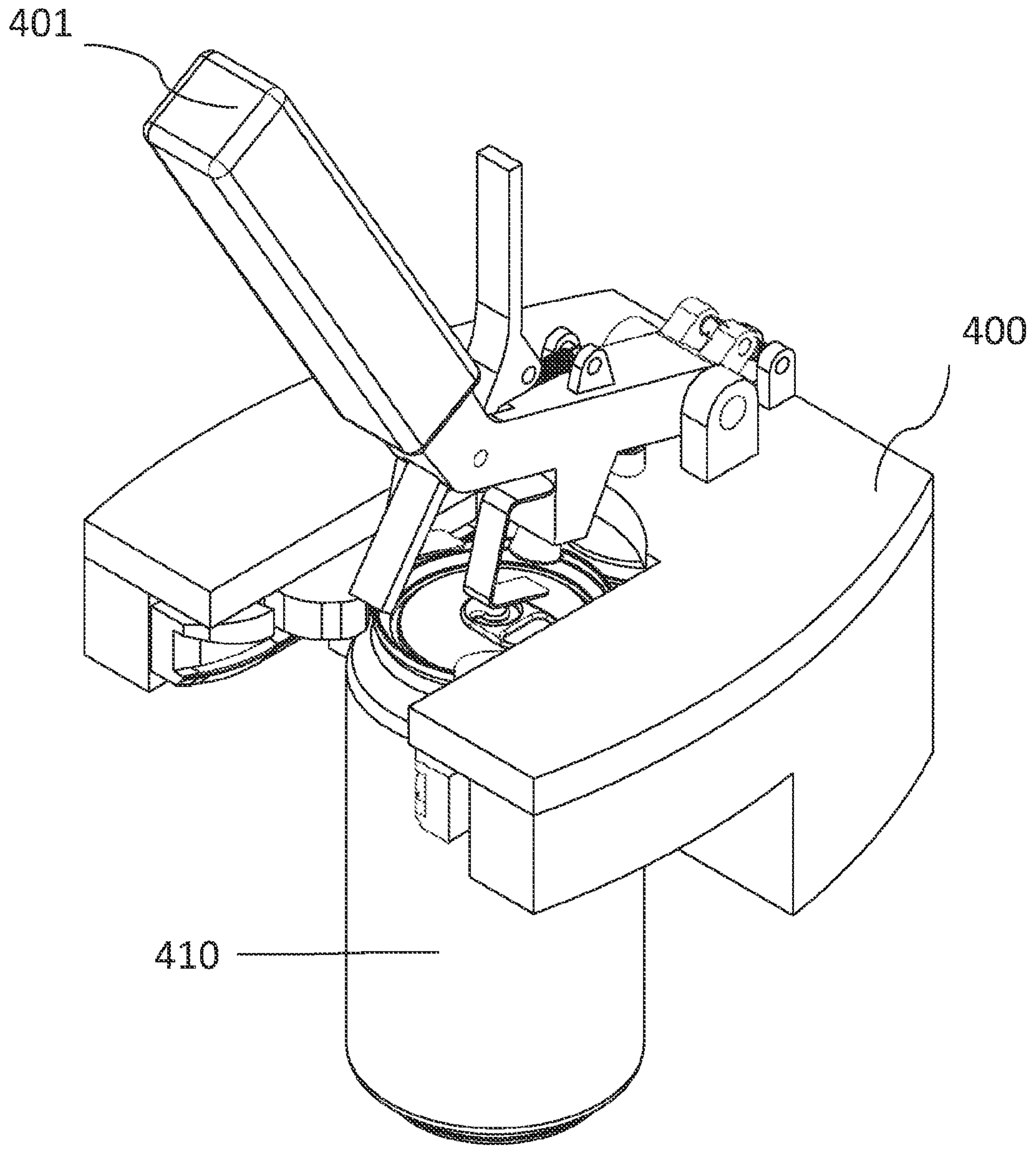

FIG. 87 is a top perspective view of a container opener with a handle in the up position and a can in position.

Figure 88:
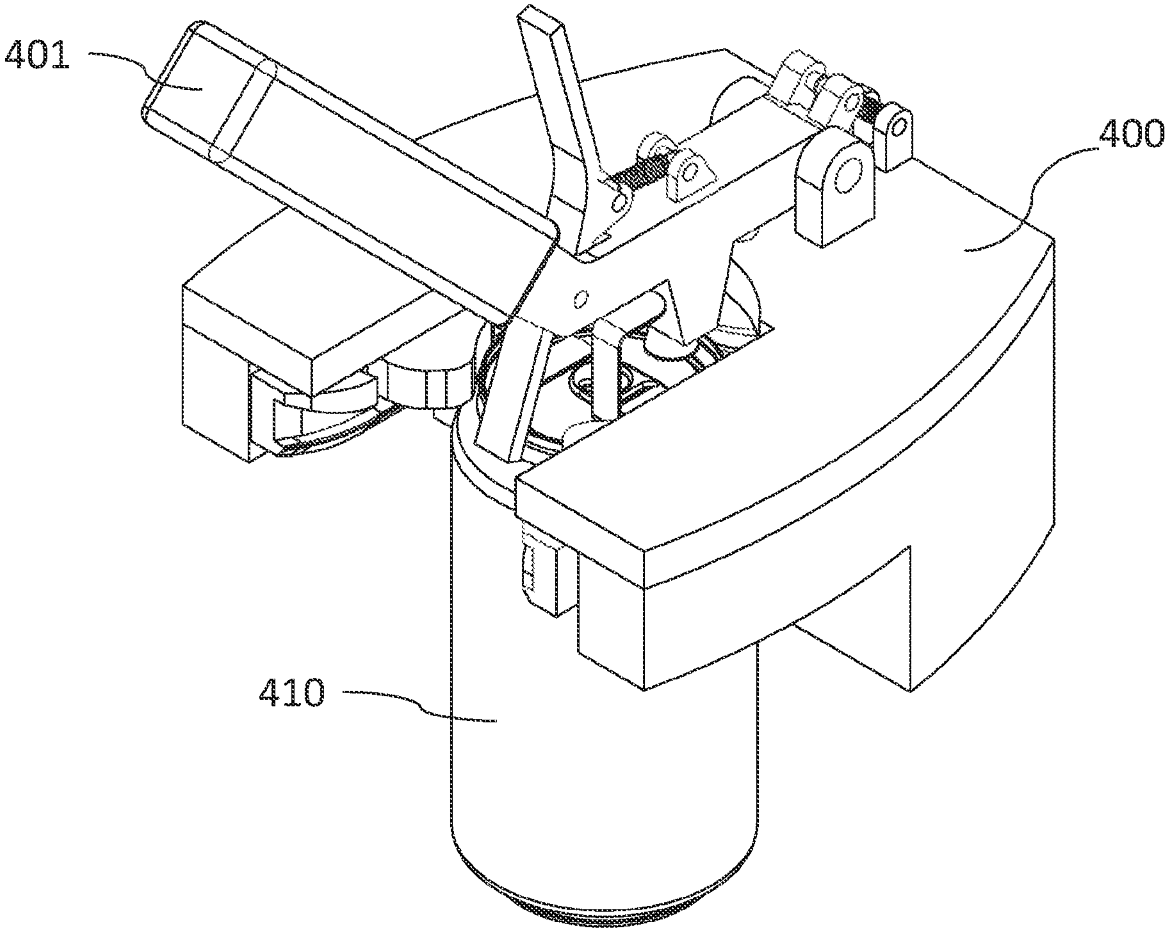

FIG. 88 is a top perspective view of a container opener with a handle in the down position.

Figure 89:
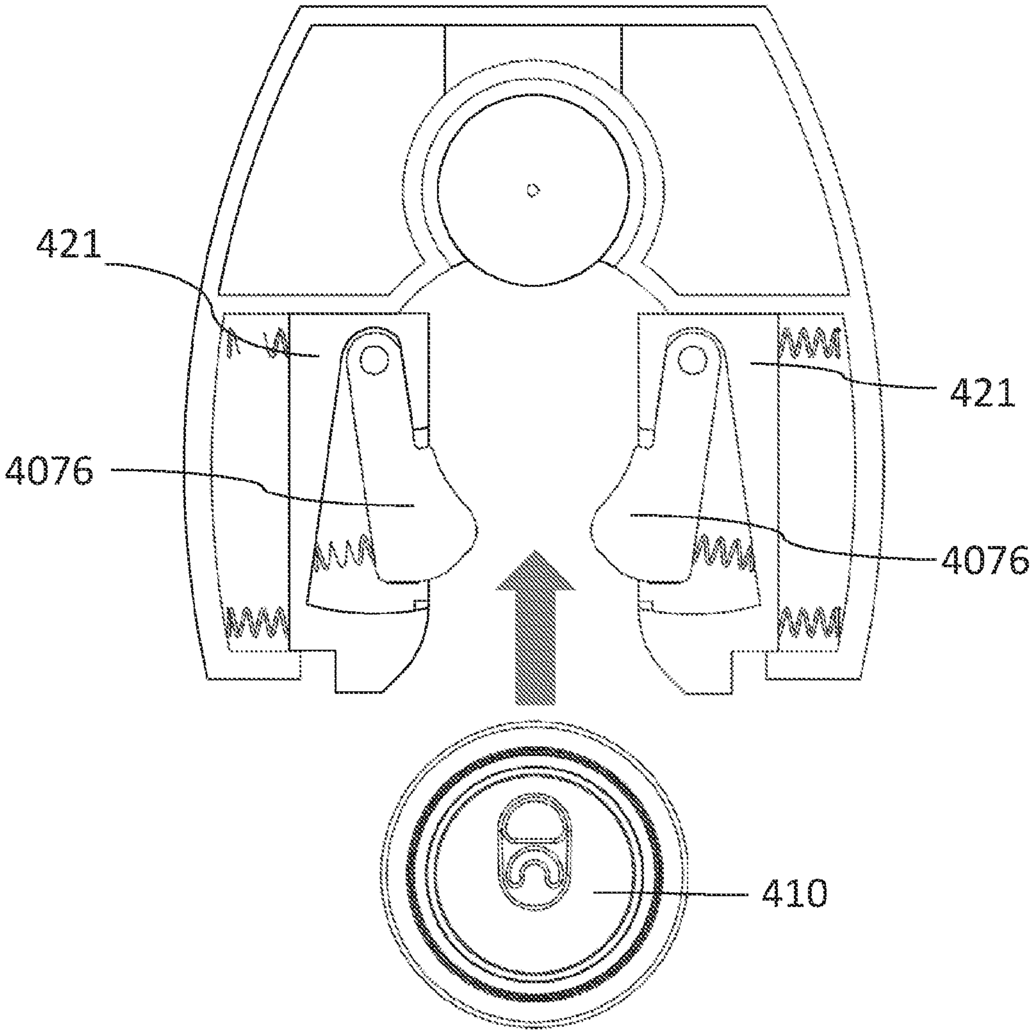

FIG. 89 is a top view showing a can in position before being pushed into clamps.

Figure 90:
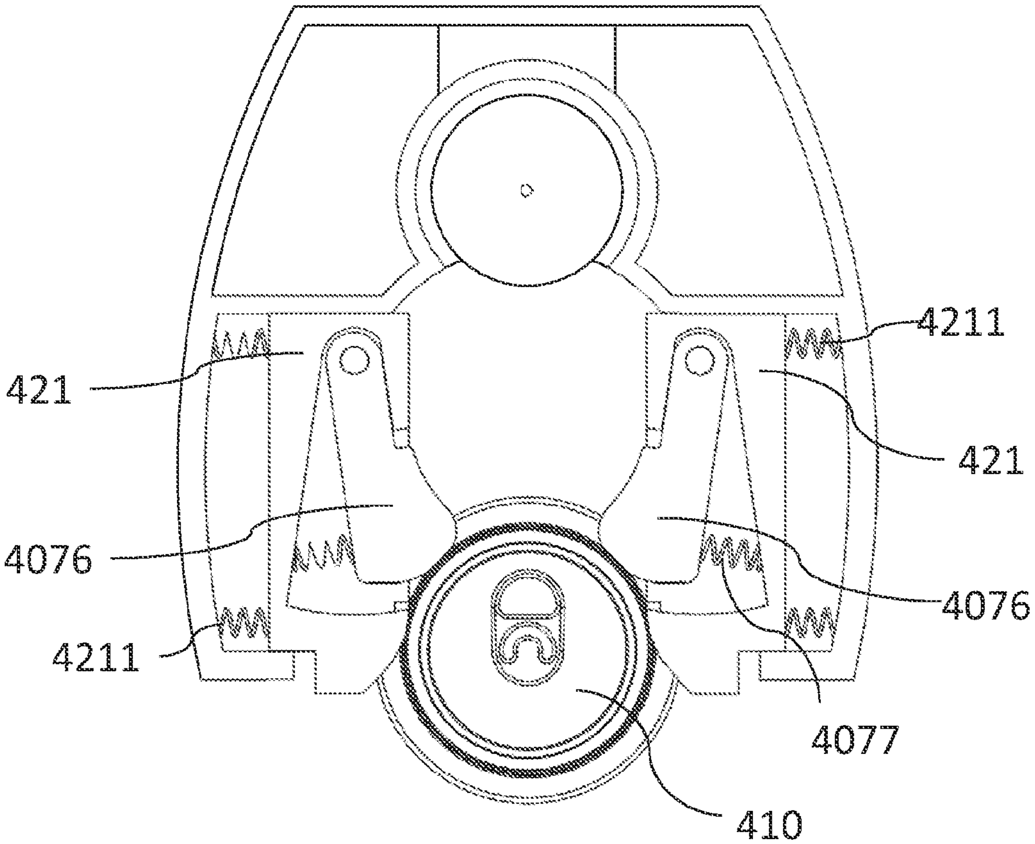

FIG. 90 is a top view showing a can in position while being pushed into clamps.

Figure 91:
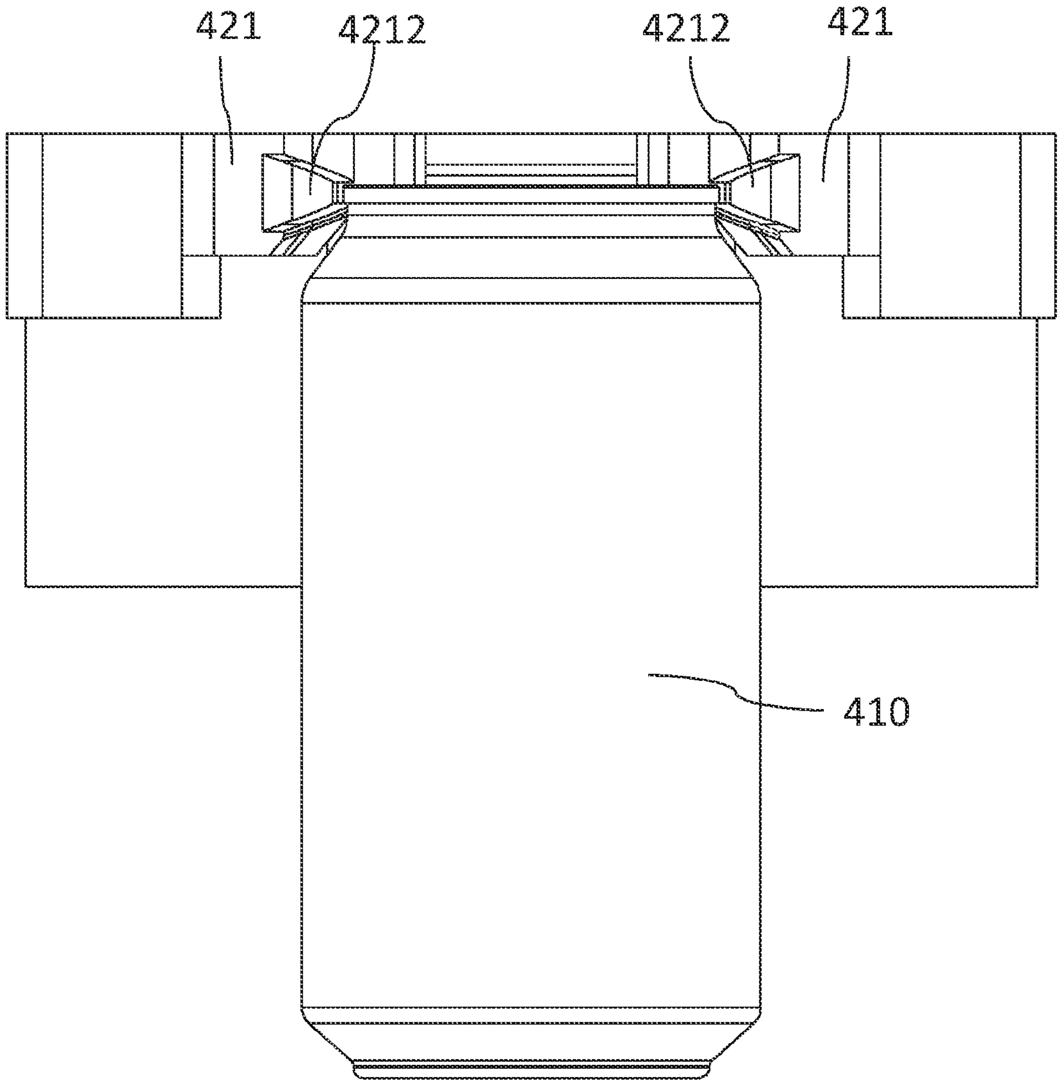

FIG. 91 is a front view of FIG. 90.

Figure 92:
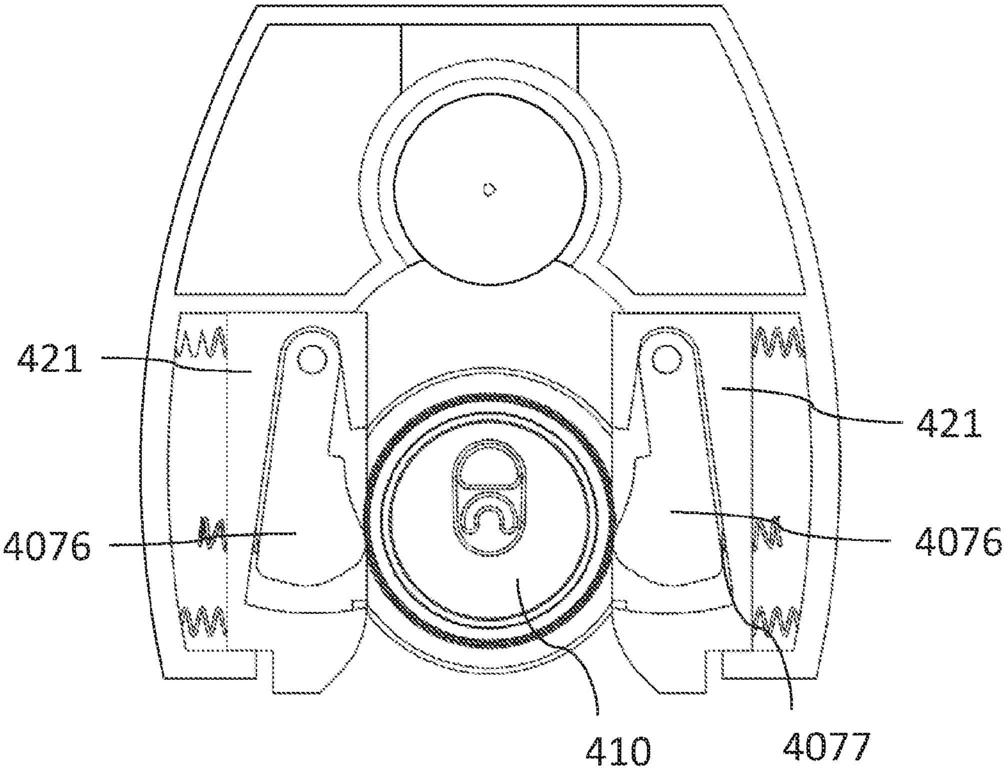

FIG. 92 is a top view showing a can continued to be pushed into clamps.

Figure 93:
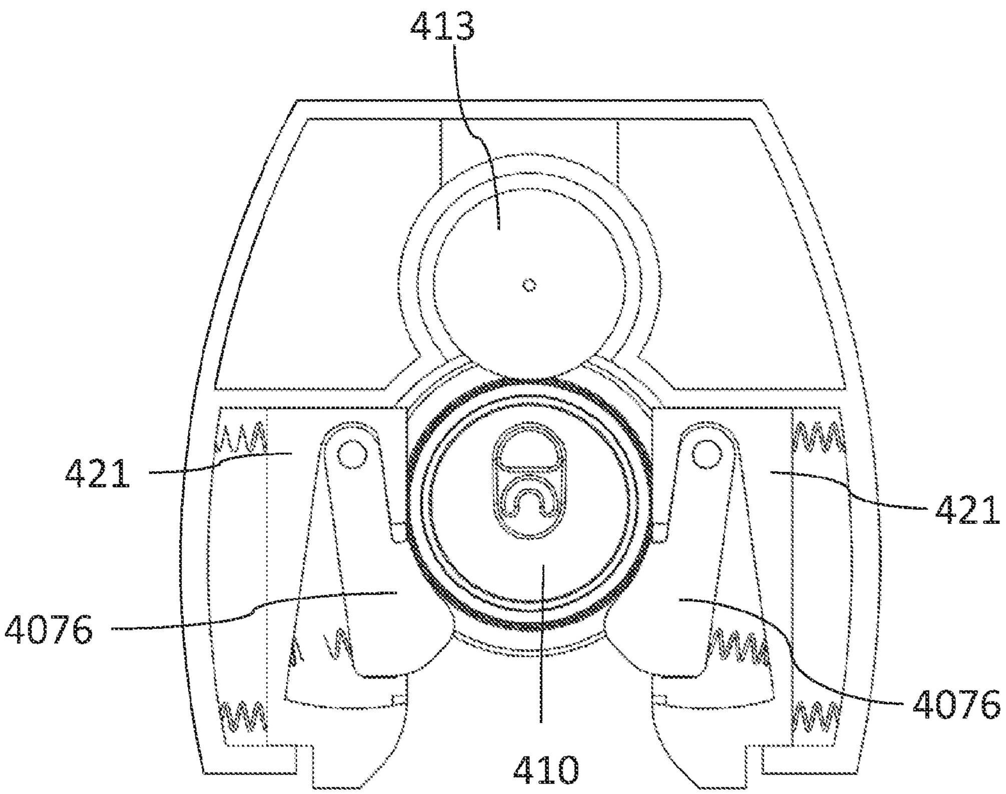

FIG. 93 is a top view showing a can pushed all the way into clamps.

Figure 94A:
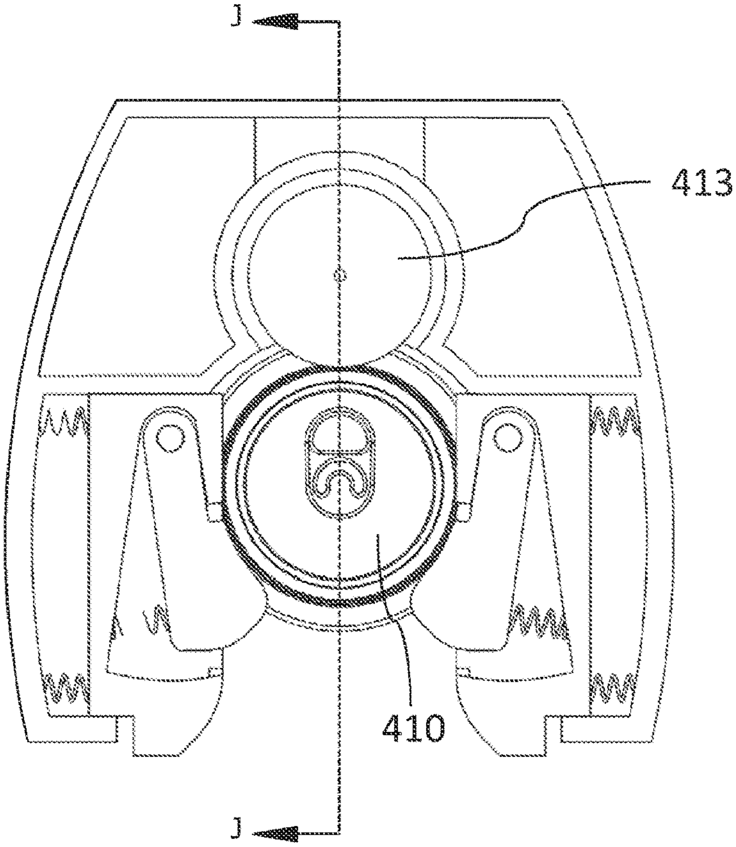

FIG. 94A is a top view with a can in position all the way into clamps.

Figure 94B:
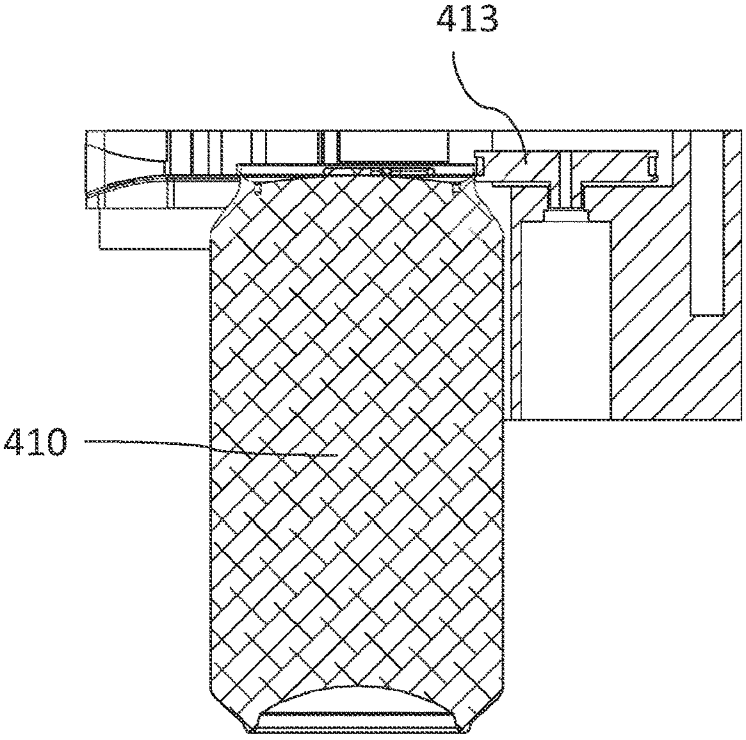

FIG. 94B is a cross-section view along J-J of FIG. 94A.

Figure 95A:
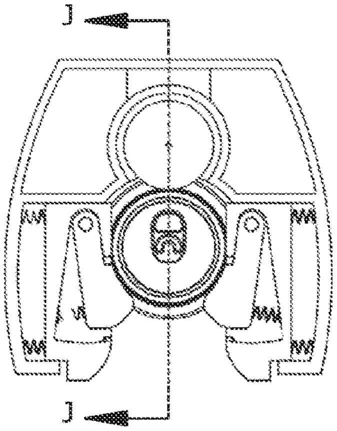

FIG. 95A is a top view with a can in position.

Figure 95B:
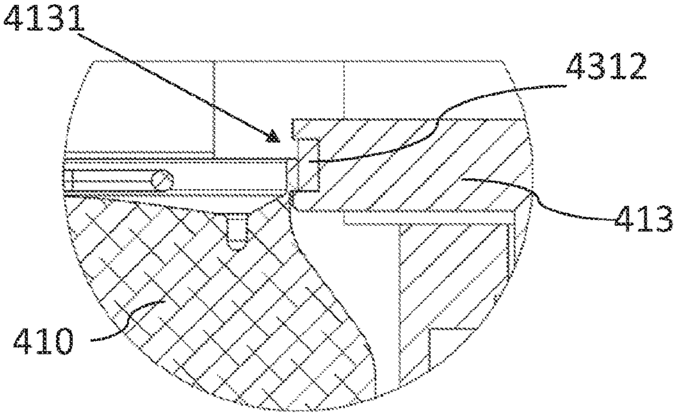
Figure 95B:
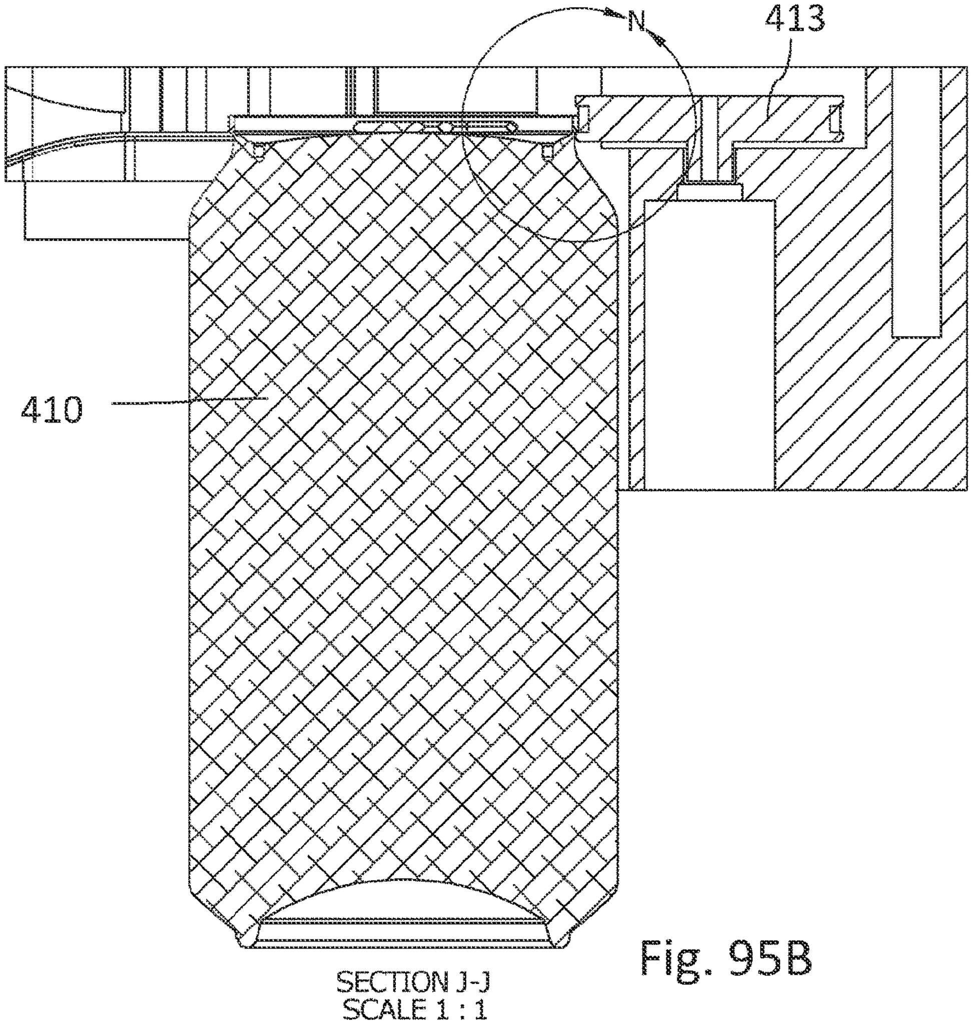

FIG. 95B is a cross-section view along J-J of FIG. 95A.

Figure 96A:
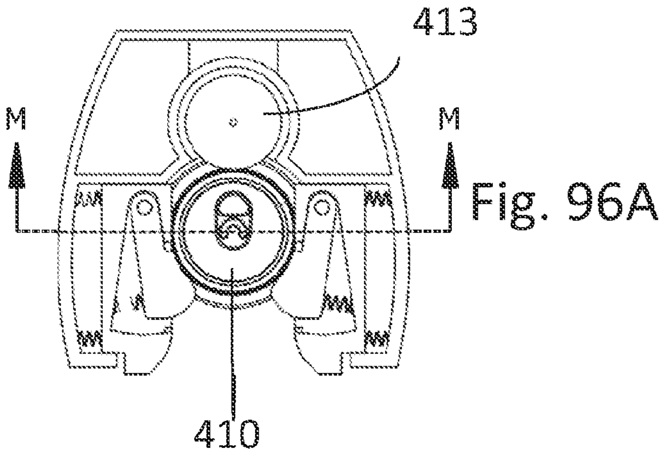

FIG. 96A is a top view with a can 410 clamped in position

Figure 96B:
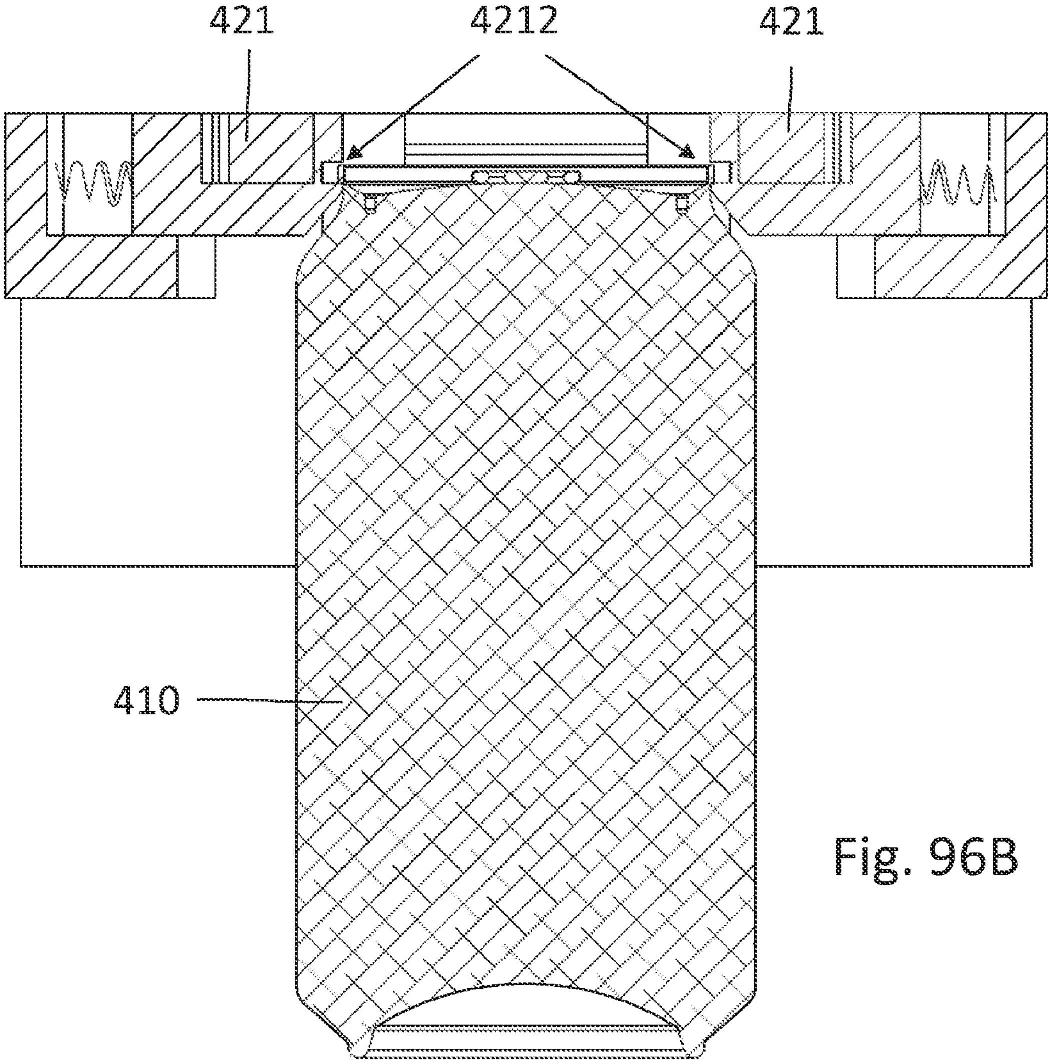

FIG. 96B is a cross-section view along M-M of FIG. 96A.

Figure 97A:
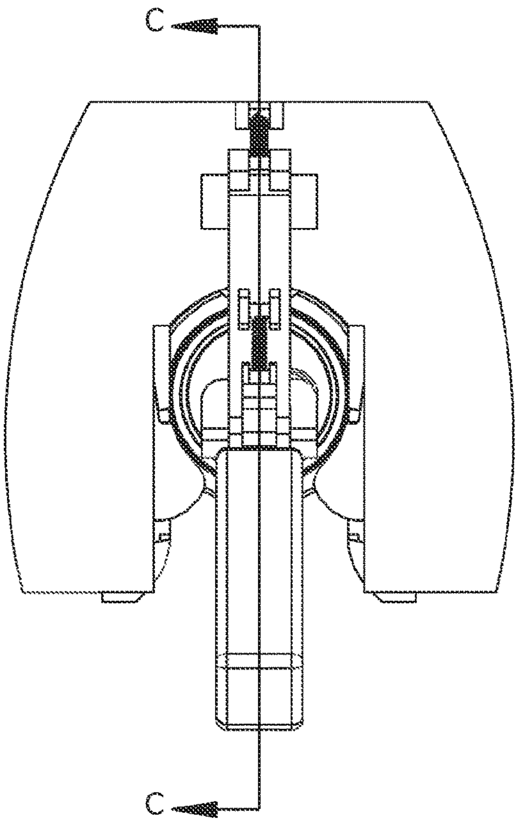

FIG. 97A is a top view with a can clamped in position and a handle up.

Figure 97B:
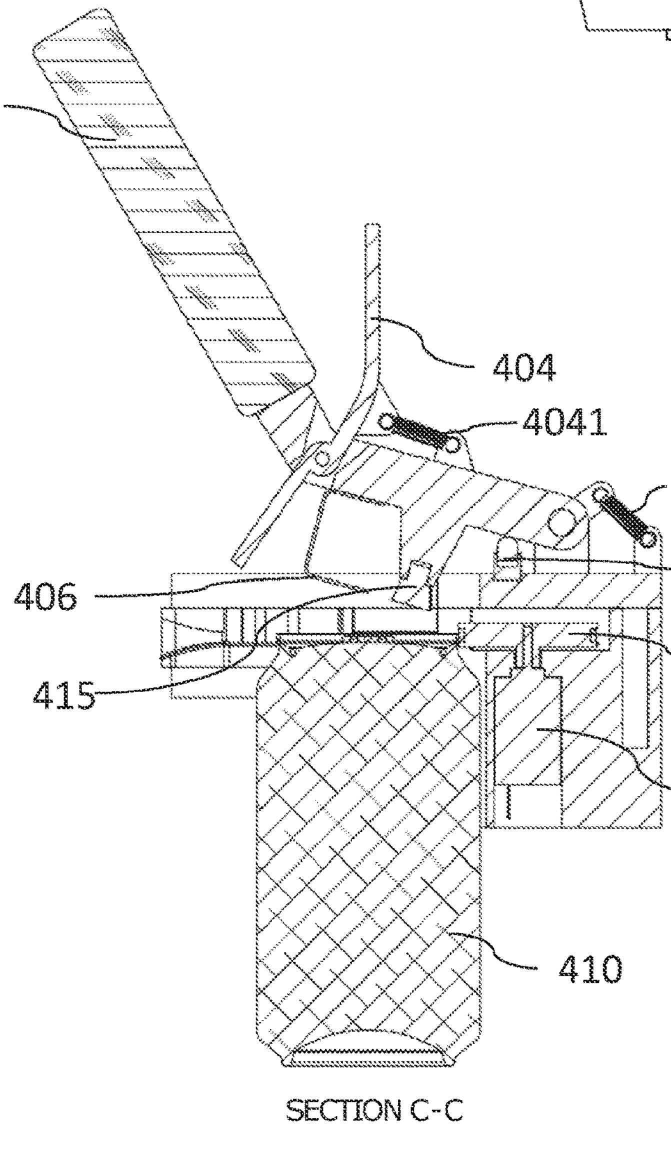

FIG. 97B is a cross-section view along C-C of FIG. 97A.

Figure 98A:
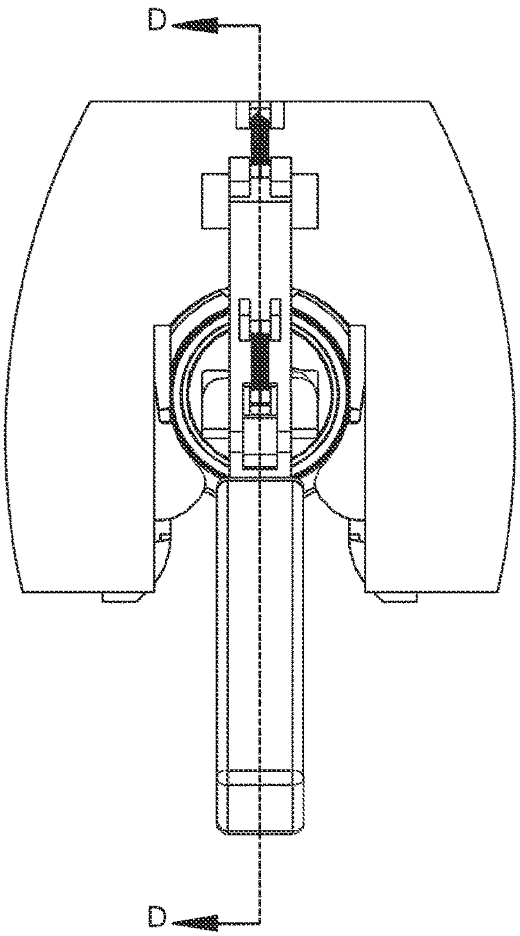

FIG. 98A is a top view with a can clamped in position and a handle down.

Figure 98B:
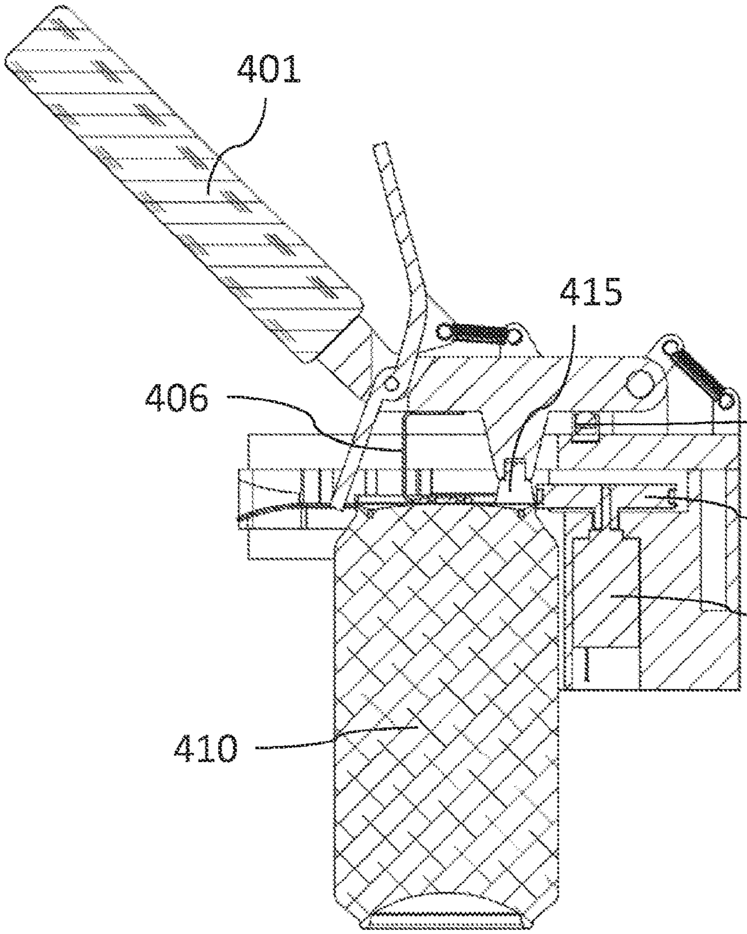

FIG. 98B is a cross-section view along D-D of FIG. 98A.

Figure 99A:
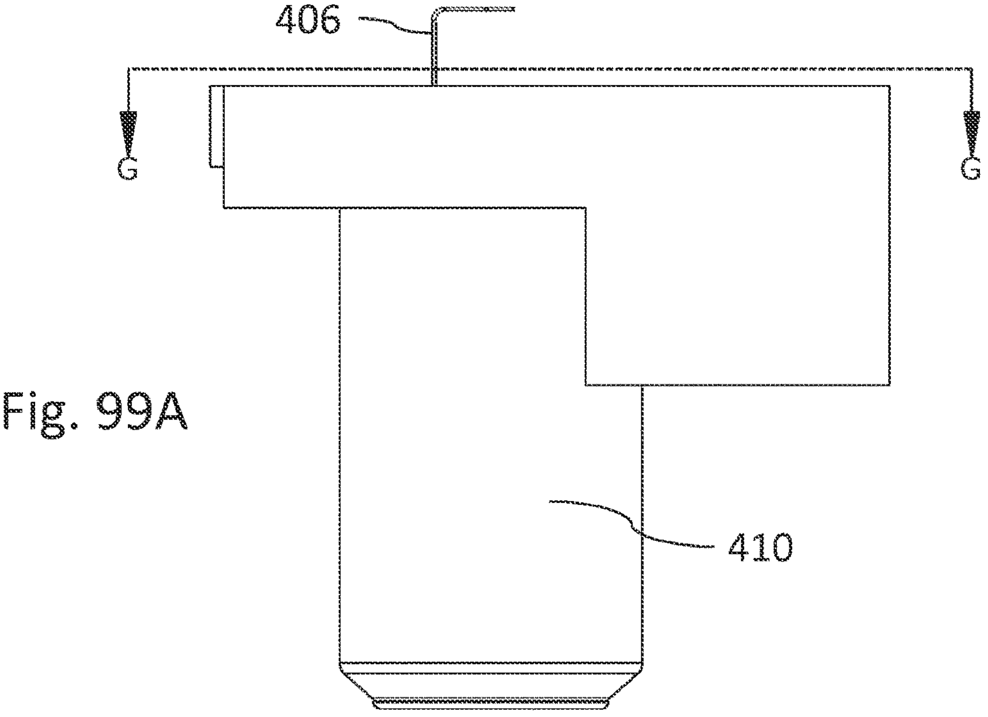

FIG. 99A is a side view with a can clamped in position and a handle down.

Figure 99B:
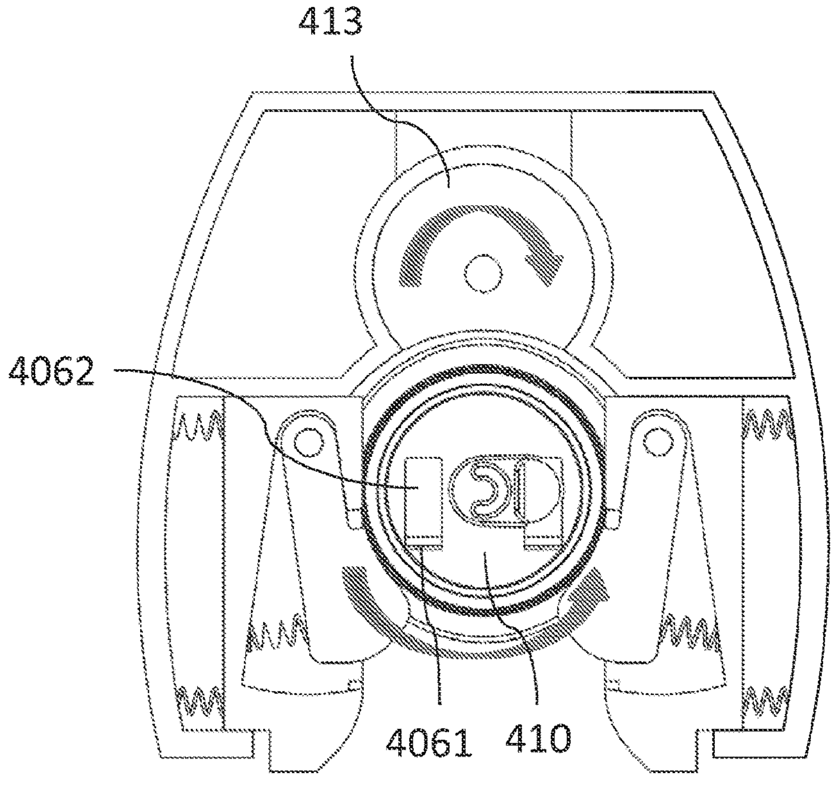

FIG. 99B is a cross-section view along G-G of FIG. 99A.

Figure 100A:
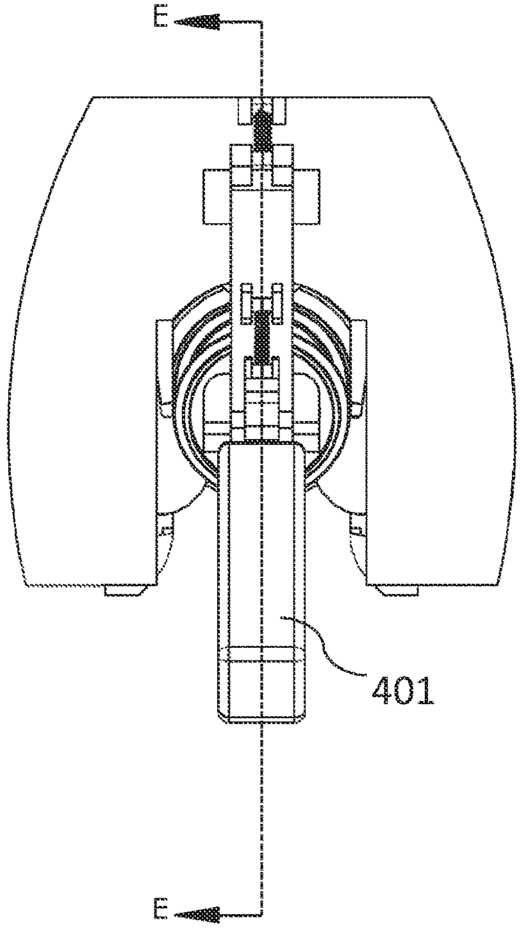

FIG. 100A is a top view with the can clamped in position and a handle up.

Figure 100B:
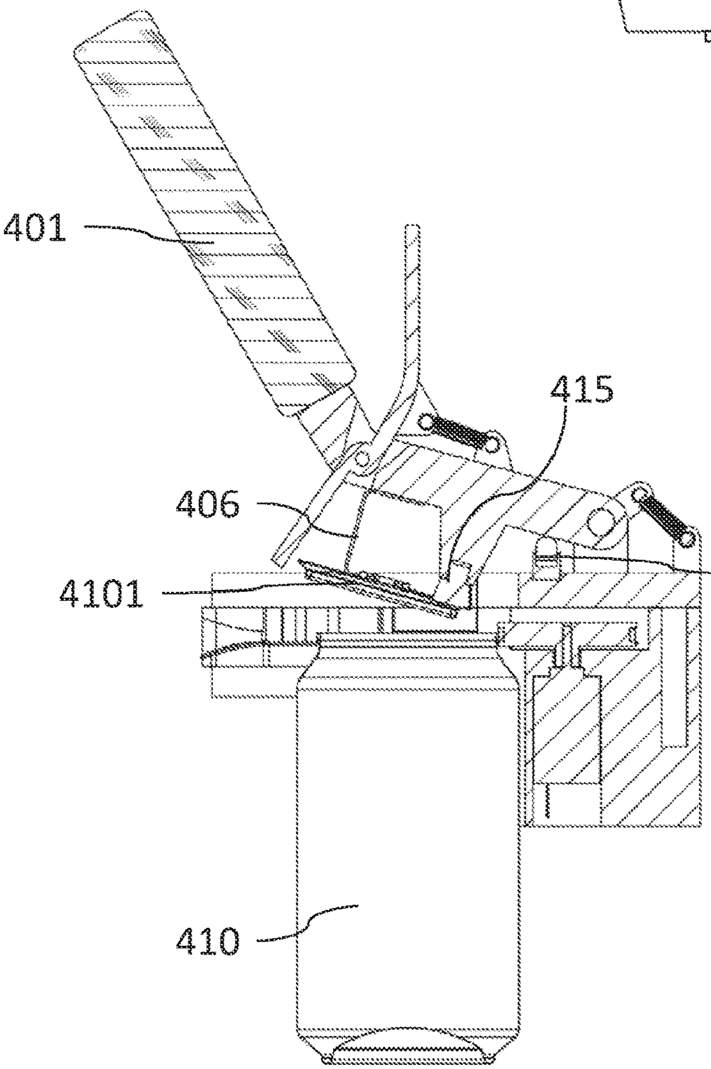

FIG. 100B is a cross-section view along E-E of FIG. 100A.

Figure 101A:
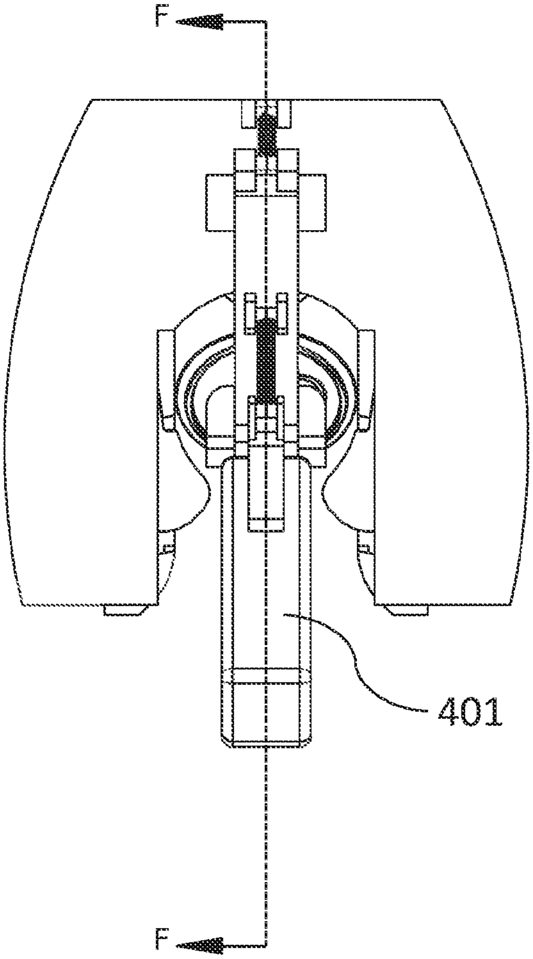

FIG. 101A is a top view with the can clamped in position and with handle up.

Figure 101B:
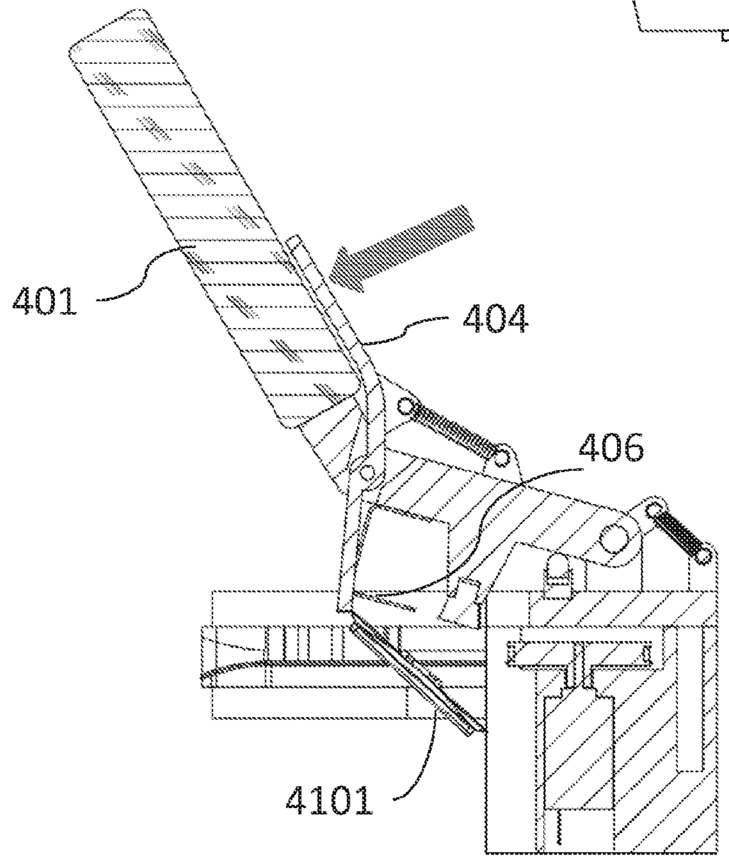

FIG. 101B is a cross section view along F-F of FIG. 101A.

Figure 102:
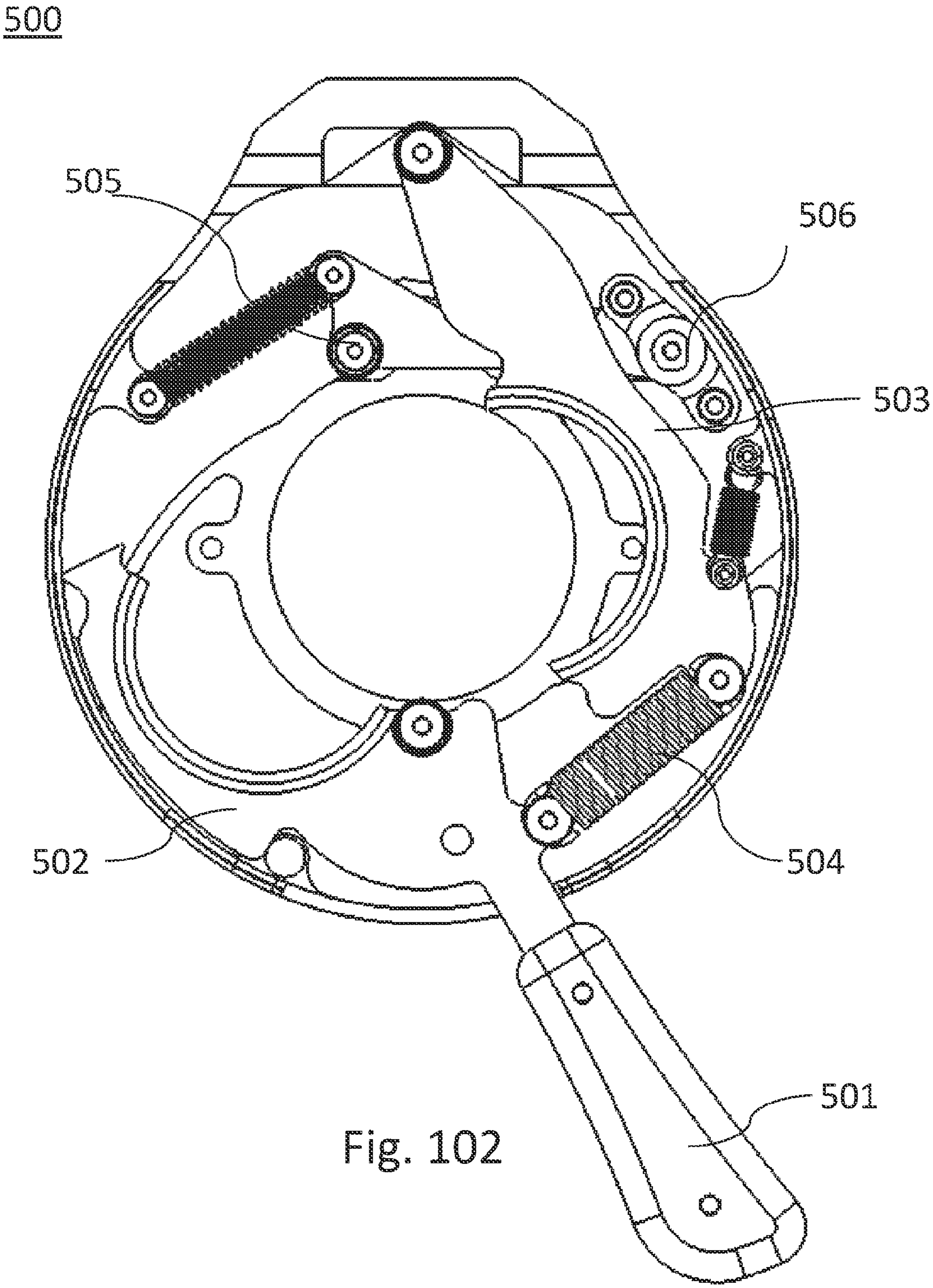

FIG. 102 is a top view of an open clamp.

Figure 103:
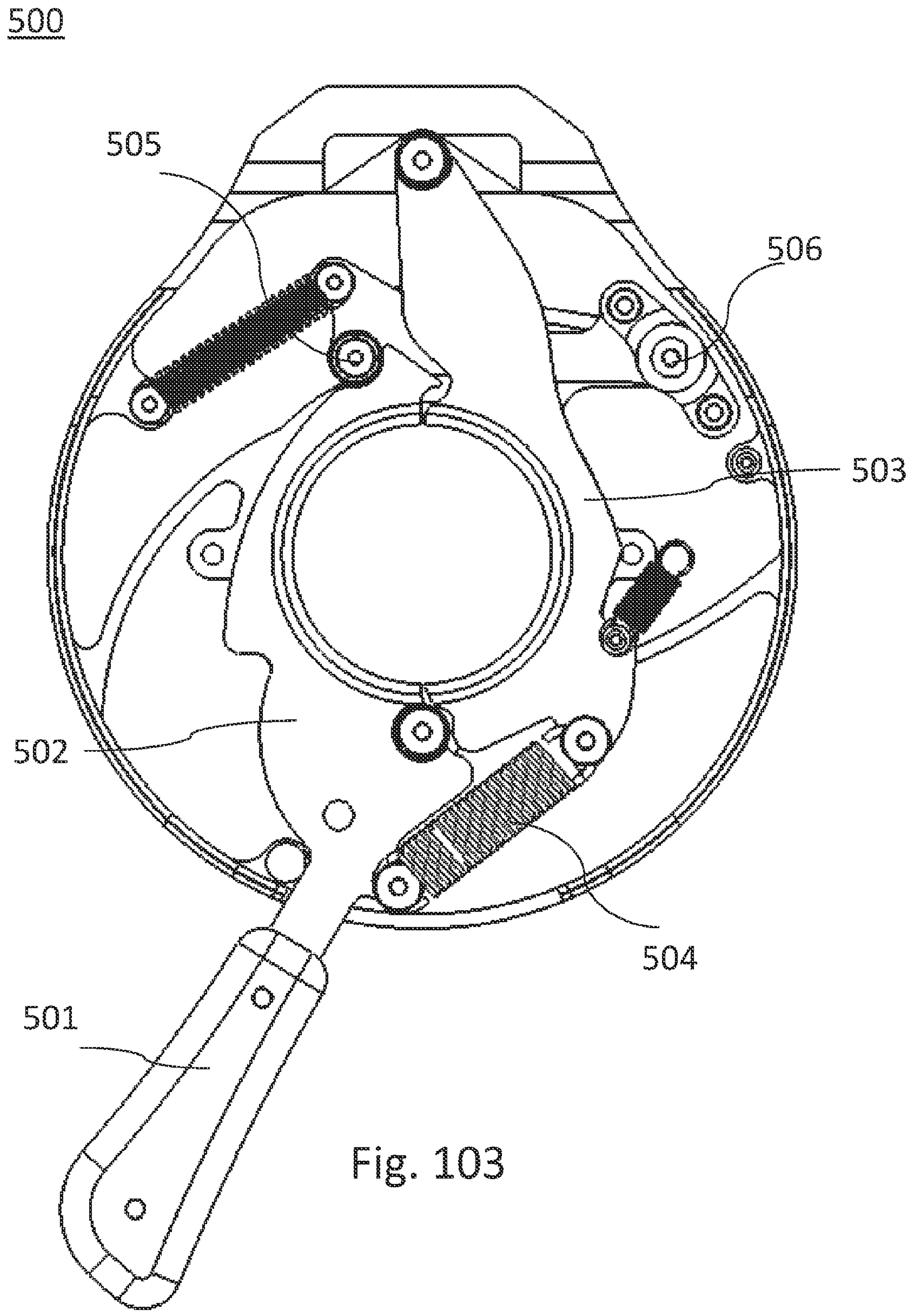

FIG. 103 is a top view of a closed clamp.

DETAILED DESCRIPTION

The following discussion omits or only briefly describes conventional features of container opening devices that are apparent to those skilled in the art. It is noted that various embodiments are described in detail with reference to the drawings, in which like reference numerals represent like parts and assemblies throughout the several views. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations.

Unless otherwise specifically defined herein, all terms are to be given their broadest reasonable interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Moreover, the drawing figures are not necessarily to scale and certain features may be shown exaggerated in scale or in somewhat schematic form in the interest of clarity and conciseness. In the description, relative terms such as "horizontal," "vertical," "up." "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The embodiments described herein are directed to opening sealed containers, such as sealed cans, which permit the user to separate a portion or an entire upper planar surface of the container from a pressed outer edge or rim of the container.

Additionally, by way of example, the embodiments described herein permit the user to safely open and/or remove the upper planar surface of a sealed container with both ease and efficiency. Further, by way of example, the embodiments described herein permit the user to open and/or remove the entire upper planar surface of such container with minimal resulting sharp edges. Moreover, the embodiments described herein permit the user to smell the full aroma of the container contents, e.g., beer, thereby allowing the user to fully enjoy the taste of the container contents.

Figure 1:
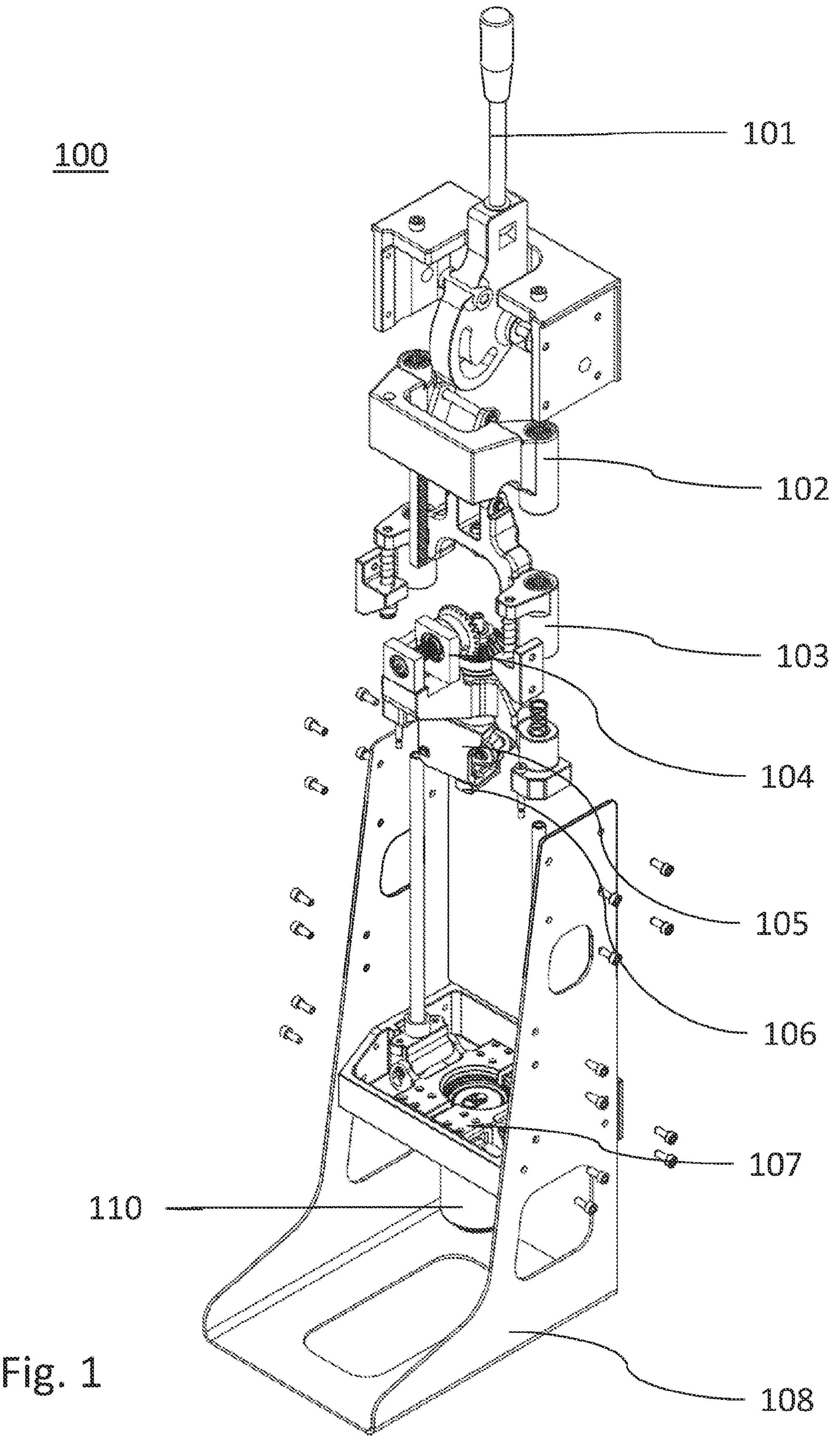
FIG. 1 is an exploded perspective view of a container opener according to a first embodiment of the present disclosure.
Figure 2:
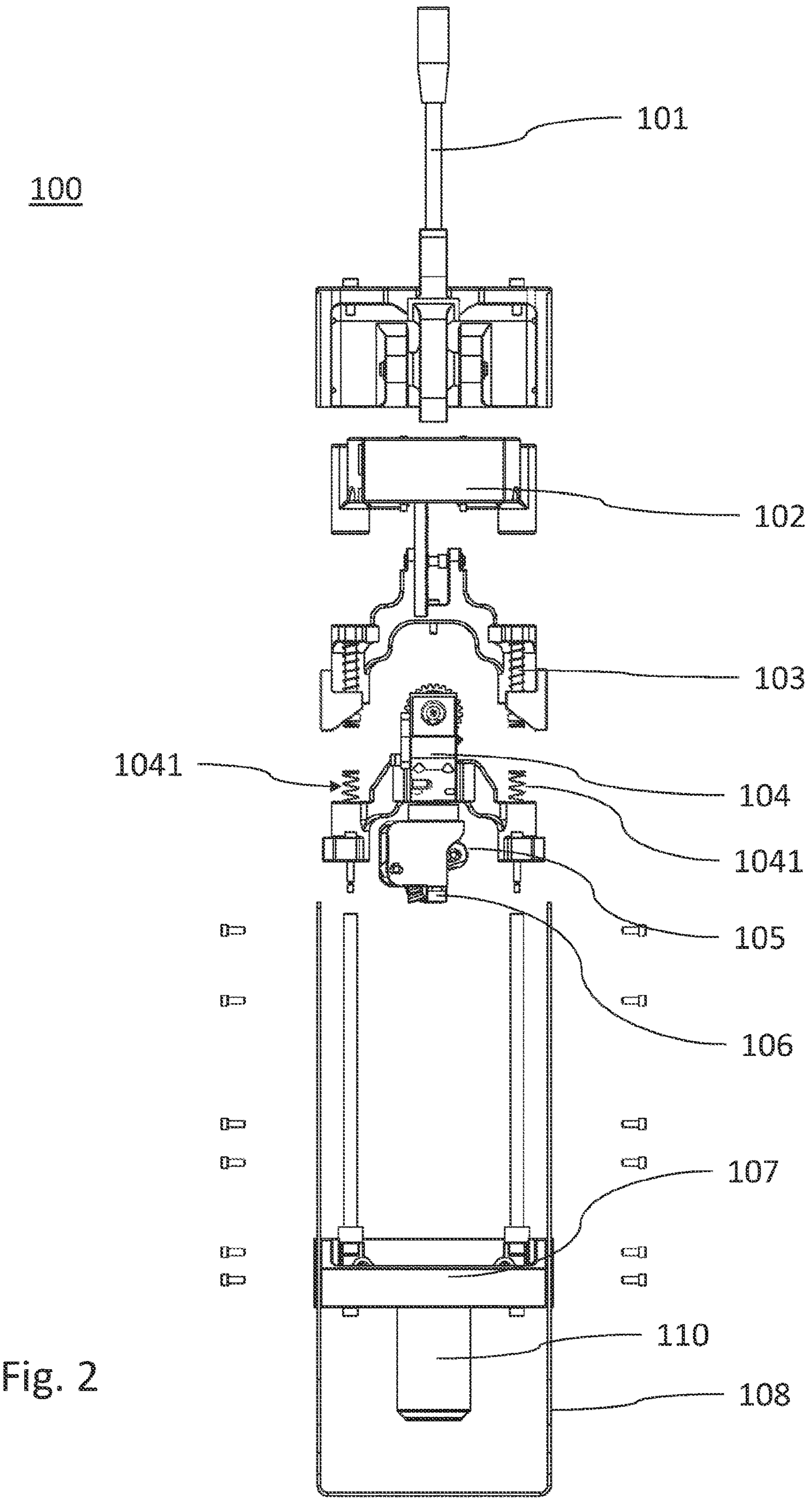
FIG. 2 is an exploded front view of the container opener of FIG. 1.

FIGS. 1-23 are used to describe a container opener device 100 of a first embodiment of the present disclosure. FIG. 1 is an exploded perspective view and FIG. 2 is an exploded front view showing primary components of the container opener 100. From top to bottom. FIGS. 1 and 2 show a handle 101, a rack guide cartridge 102, a plunger cartridge 103, a main cartridge 104, a blade assembly 105, a barb 106, a clamp assembly 107, and a base 108.

Figure 3:
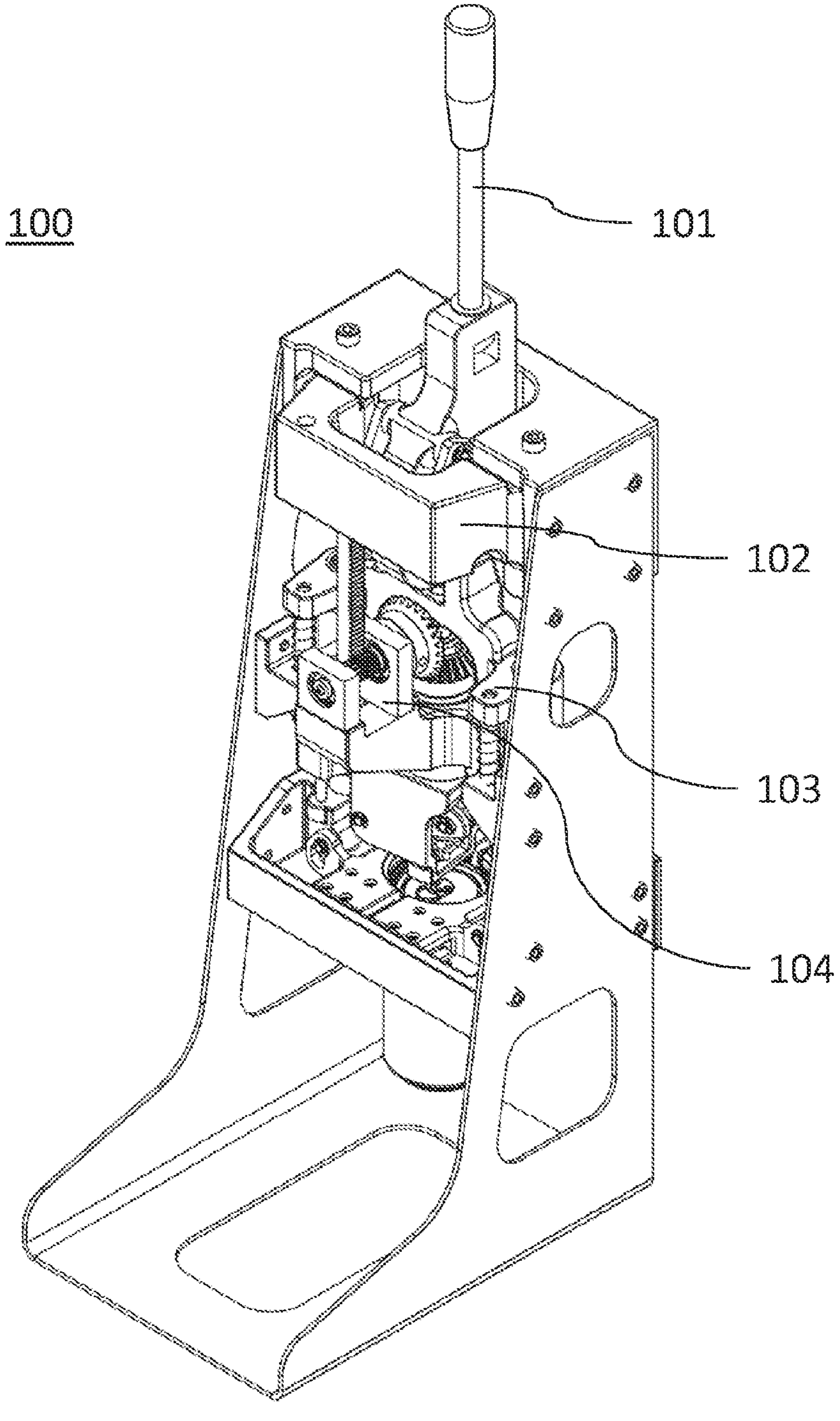
FIG. 3 is a perspective view of a container opener in a home state.

FIG. 3 is a perspective view of the container opener 100 in a home state. In this position the main carriage 104, the plunger carriage 103, the rack guide carriage 102, and the handle 101 are in their upward positions.

Figure 4:
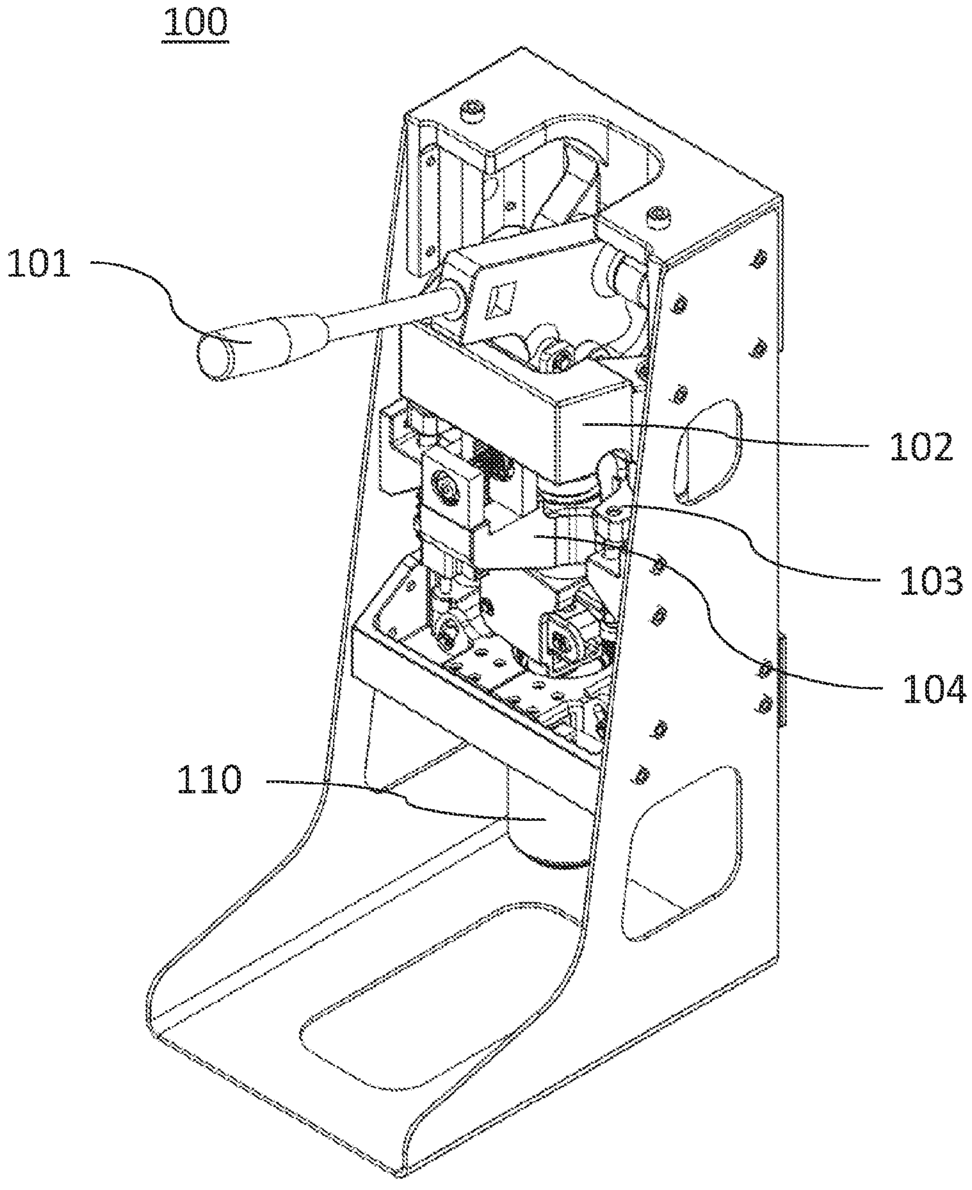
FIG. 4 is a perspective view of a container opener in an operational state.

FIG. 4 a perspective view of the container opener 100 in an operational state. FIG. 4 shows that as the handle 101 is pulled downward, the three carriages (the main carriage 104, the plunger carriage 103, the rack guide carriage 102) lower to create a sequence of events. The sequence is as follows: a can 110 is clamped, the barb 106 punctures the can 110, a blade punctures the can 110, and the blade assembly 105 spins at least 360 degrees to cut a lid off the can 110. This sequence is then reversed when the handle 101 is lifted. These sequences are described in greater detail below.

Figure 5:
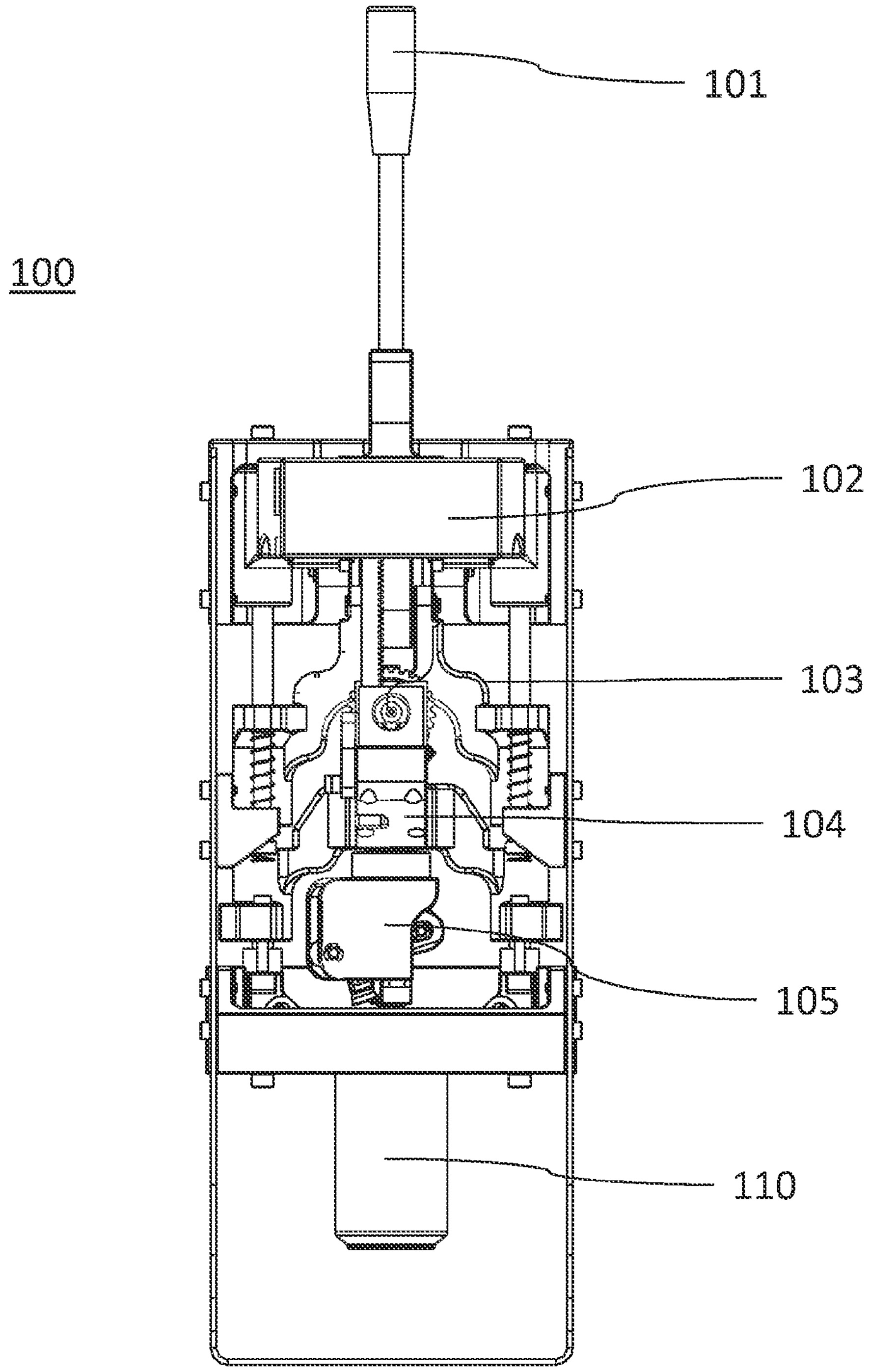
FIG. 5 is a front view of a container opener with a handle up.

FIG. 5 is a front view of the container opener 100 with the handle 101 up. FIG. 5 shows the rack guide carriage 102, the plunger carriage 103, the main carriage 104, and the blade assembly 105.

The rack guide carriage 102 lowers through the entirety of the handle stroke. As the rack guide carriage 102 lowers it spins a pinion (located on the main carriage 104) to spin a gear train and allow the blade assembly 105 to rotate. More details on this can be found with respect to FIG. 14.

The plunger carriage 103 is what pushes the main carriage 104 down to its lower position when the handle 101 is pulled down. The plunger carriage 103 mounts a plunger shaft that is used to extend the blade and the barb to puncture the can 110. There are two springs (see FIG. 15) between the plunger carriage 103 and the main carriage 104 that sequence these two carriages so that the main housing lowers (to actuate the can clamp) first. The main housing is a subassembly that holds the gear train and the blade assembly 105. It houses the bearings/shaft that allow the blade assembly 105 to rotate. The main housing raises and lowers with movement of the handle 101. The movement of the main housing is coupled to the can clamp. When the main housing lowers it closes the clamp and vice versa. Also, the main housing lifts up at the end of the handle stroke to pull the lid out of the can 110 (while the can 110 is still clamped) then unclamps the can 110.

Once the main housing bottoms out, the plunger continues to travel, closing the gap between the plunger carriage 103 and the main carriage 104 so the barb and blade can be extended The main carriage 104 is used to mount bearings that allow the blade assembly 105 to spin, a pinion gear and a gear train to spin the blade assembly, and cam followers that extend and retract the can clamp. An upward vertical motion of the main carriage 104 pulls the top of the can 110 out of the body of the can 110 after it is cut and unclamps the can 110.

Figure 6:
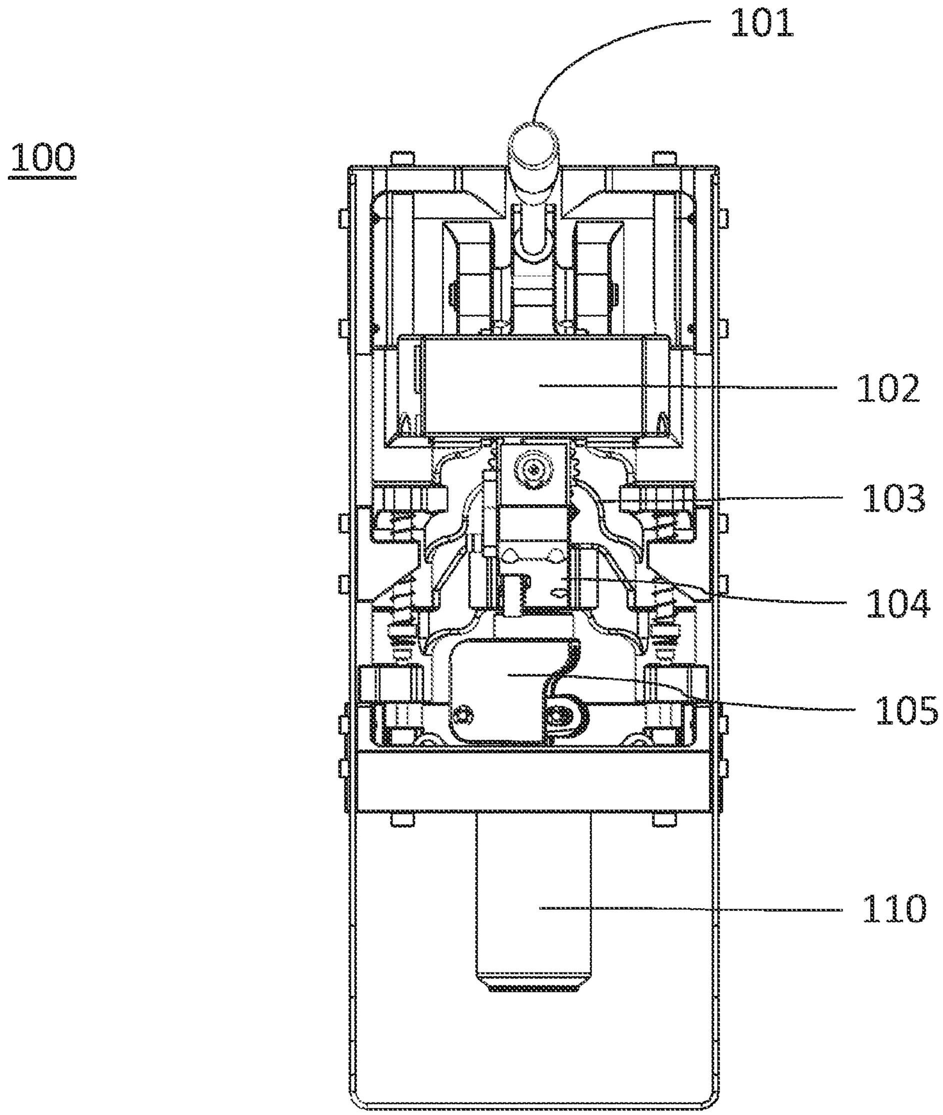
FIG. 6 is a front view of container opener with a handle down.

FIG. 6 is a front view of the container opener 100 with the handle 101 down showing that pulling the handle 101 down forces the main carriage 104, the plunger carriage 103, and the rack guide carriage 102 together.

Figure 7:
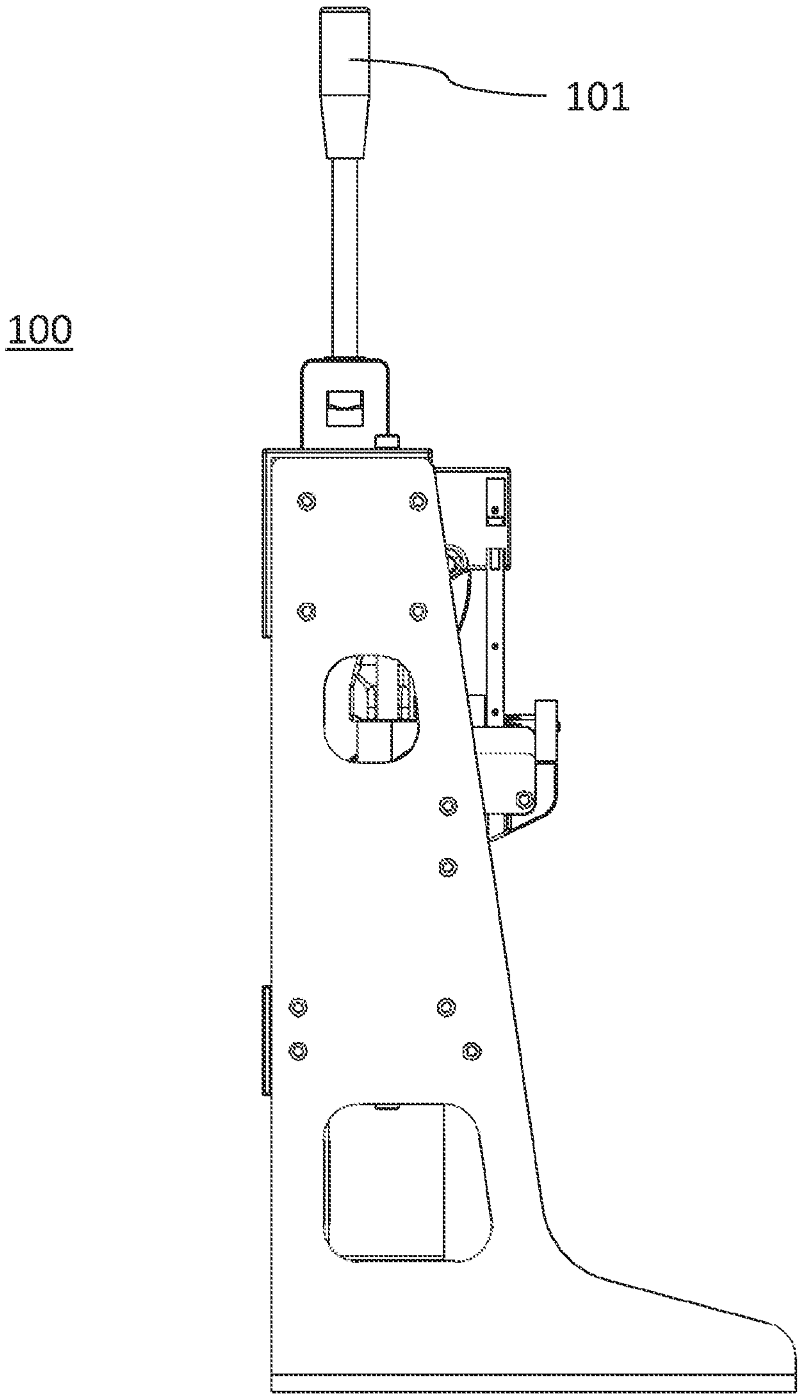
FIG. 7 is a left side view of a container opener with a handle up.
Figure 8:
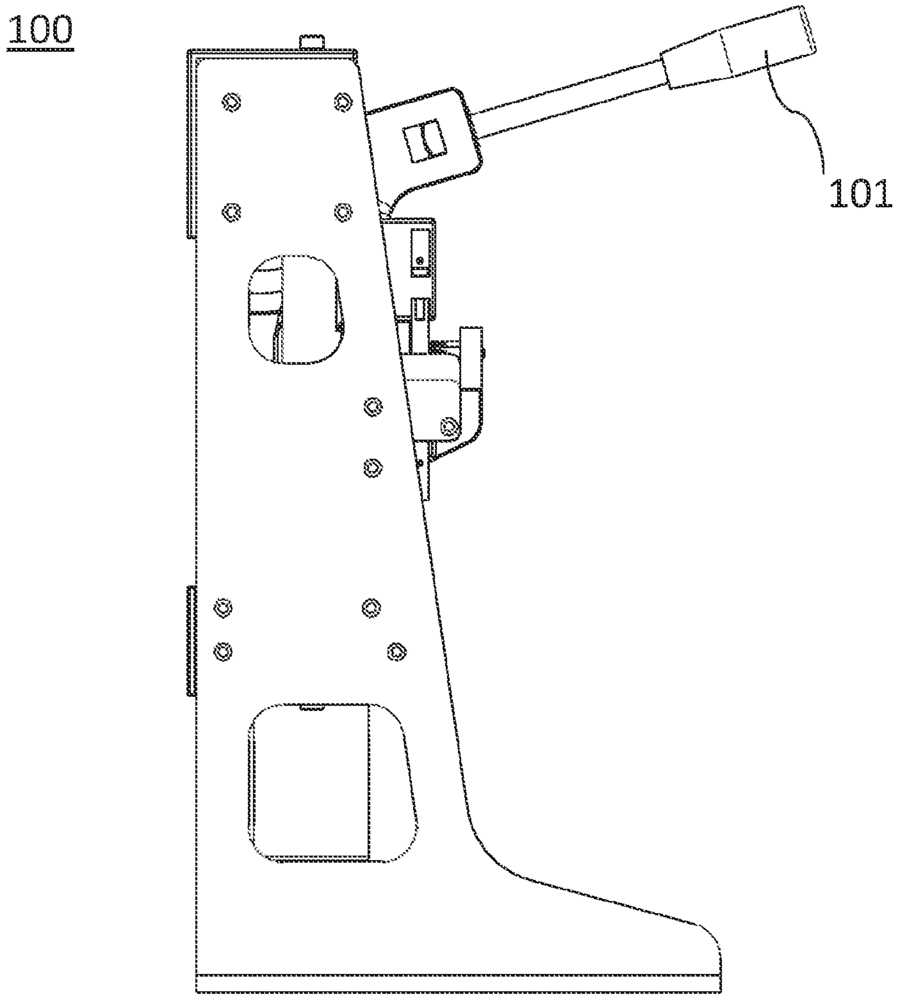
FIG. 8 is a left side view of a container opener with a handle down.

FIG. 7 is a left side view of the container opener 100 with the handle 101 up. FIG. 8 is a left side view of the container opener 100 with the handle 101 down.

Figure 9B:
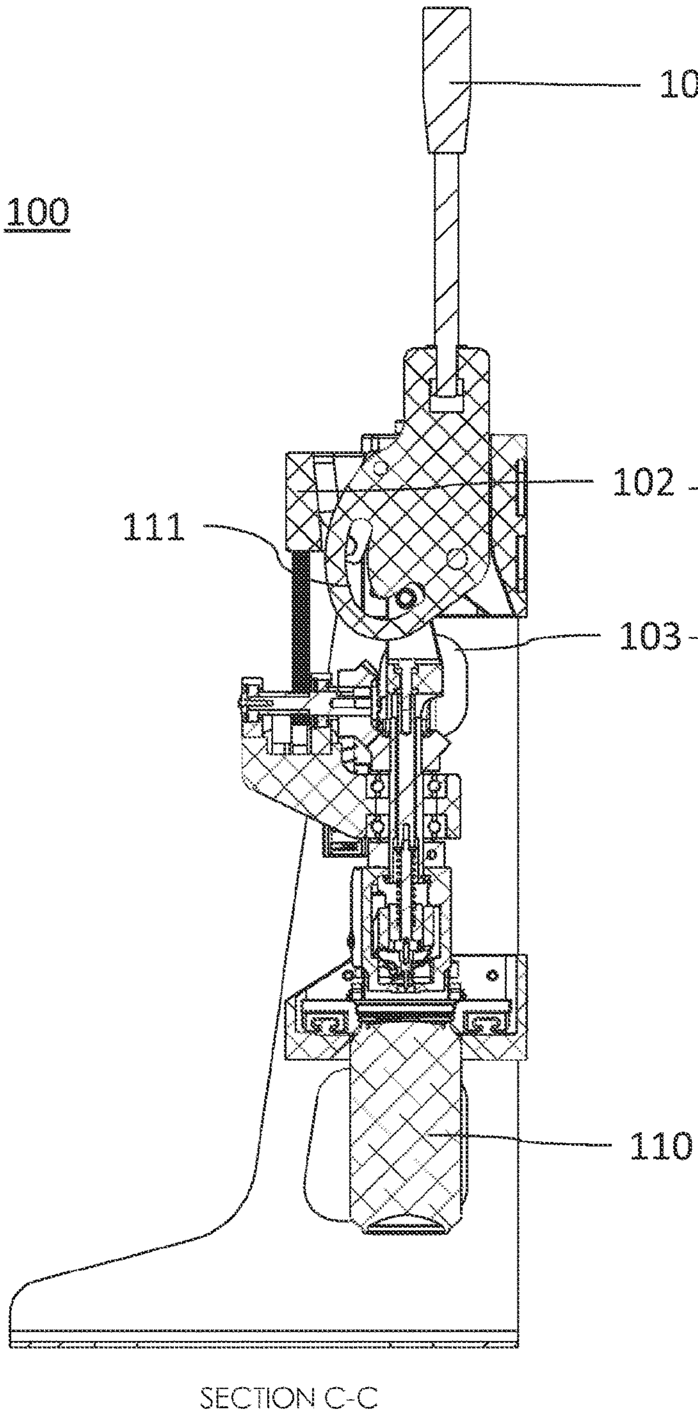
FIG. 9B is a right side cross-sectional view along C-C of FIG. 9A.
Figure 9A:
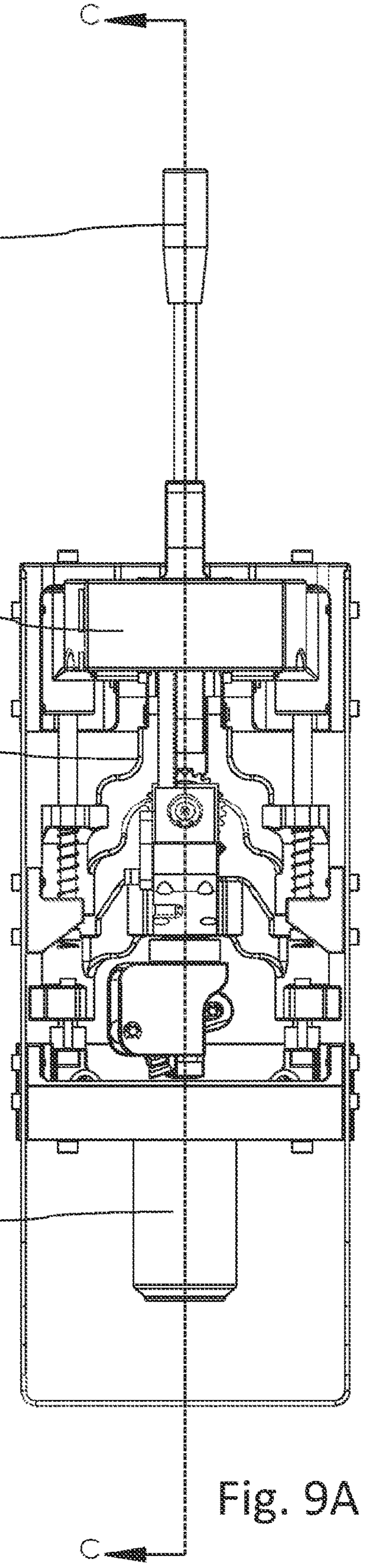
FIG. 9A is a front view of a container opener with a handle up.

FIG. 9A is a front view of the container opener 100 with the handle 101 up. FIG. 9B is a right side cross-sectional view along C-C of FIG. 9A showing a cam slot 111 in the handle 101. The cam slot 111 in the handle 101 has two sections. A vertical motion section pushes the plunger carriage 103 down to a set distance. A rotary motion section of the cam slot 111 is concentric with a pivot of the handle 101 which locks the plunger carriage 103 in its lower position and allows the handle 101 to continue to rotate, without moving the plunger carriage 103, to continue driving the rack guide 102 down to allow the can 110 to spin.

Figure 10B:
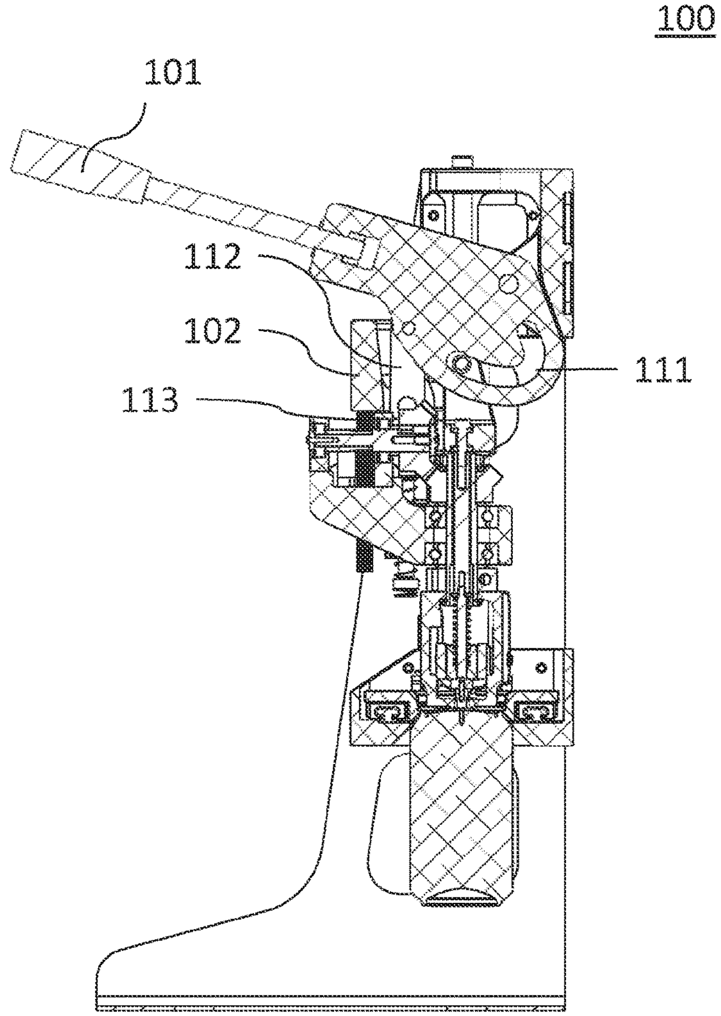
FIG. 10B is a right side cross-sectional view along D-D of FIG. 10A.
Figure 10A:
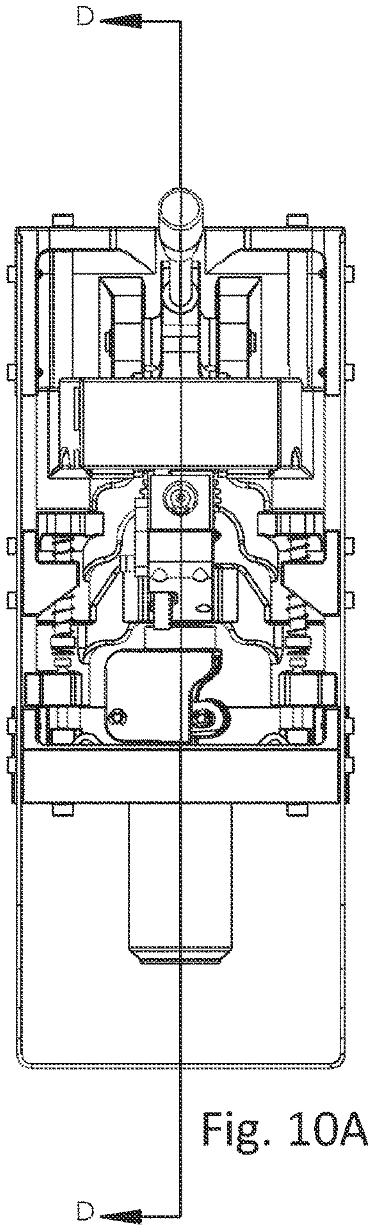
FIG. 10A is a front view of a container opener with the handle down.

FIG. 10A is a front view of the container opener 100 with the handle 101 down. FIG. 10B is a right side cross-sectional view along D-D of FIG. 10A. FIG. 10B show links 112, the rack guide carriage 102, and a rack and pinion 113. The rack guide carriage 102 is driven down by a linkage from the handle cam 111.

Figure 11B:
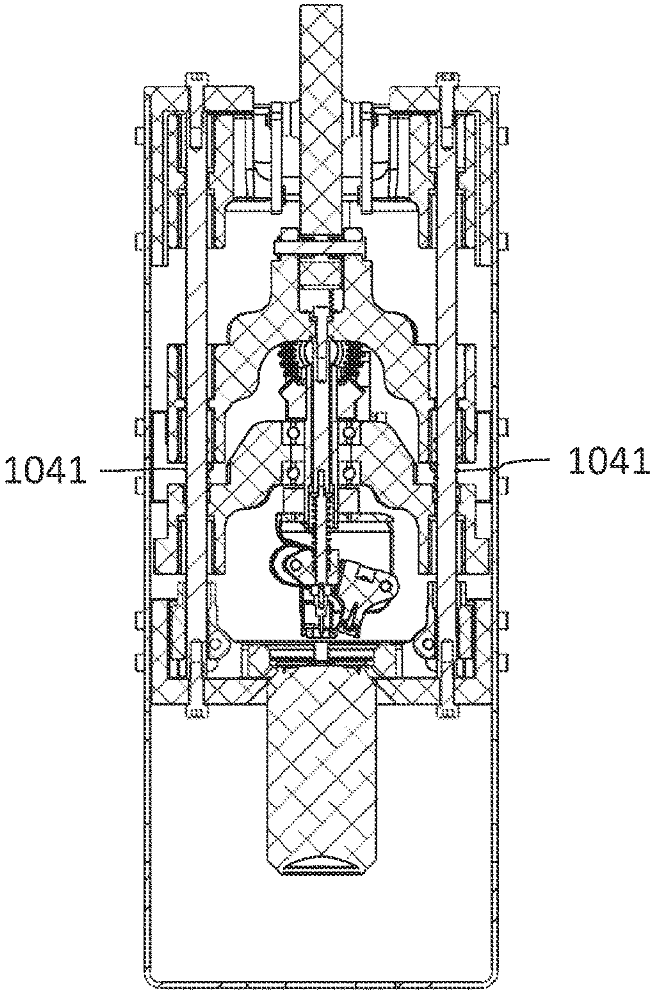
FIG. 11B is a front cross-sectional view along E-E of FIG. 11A.
Figure 11A:
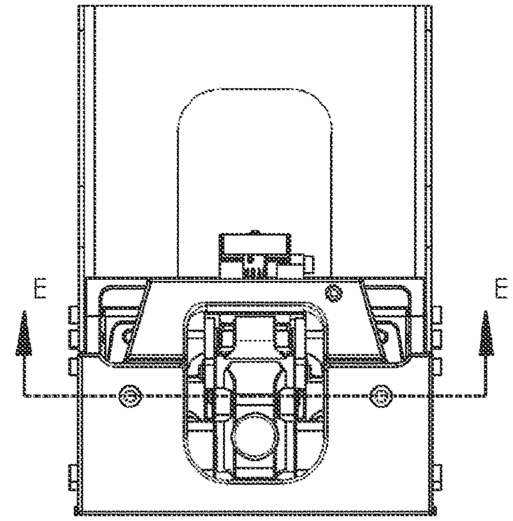
FIG. 11A is a top view of container opener with the handle up.

FIG. 11A is a top view of the container opener 100 with the handle 101 up. FIG. 11B is a front cross-sectional view along E-E of FIG. 11A. FIG. 11B shows springs 1041 between the plunger cartridge 103 and the main carriage 104. These springs 1041 are also shown in FIG. 2.

Figure 12B:
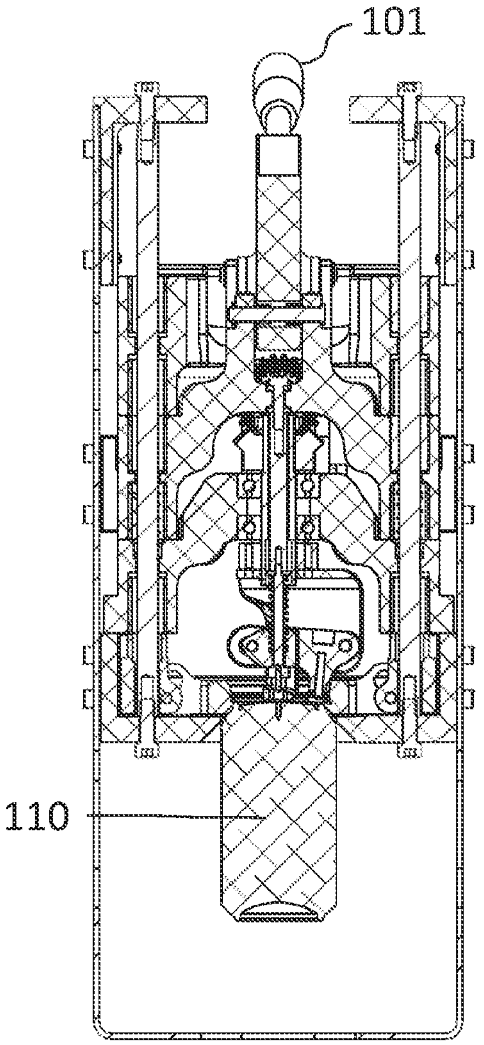
FIG. 12B is a front cross-sectional view along F-F of FIG. 12A.
Figure 12A:
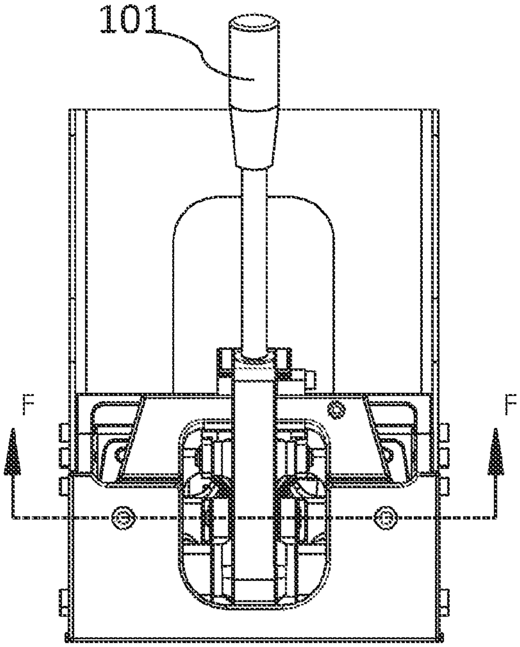
FIG. 12A is a top view of a container opener with the handle down and a can in place.

FIG. 12A is a top view of the container opener 100 with the handle 101 down and a can 110 in place. FIG. 12B is a front cross-sectional view along F-F of FIG. 12A.

Figure 13:
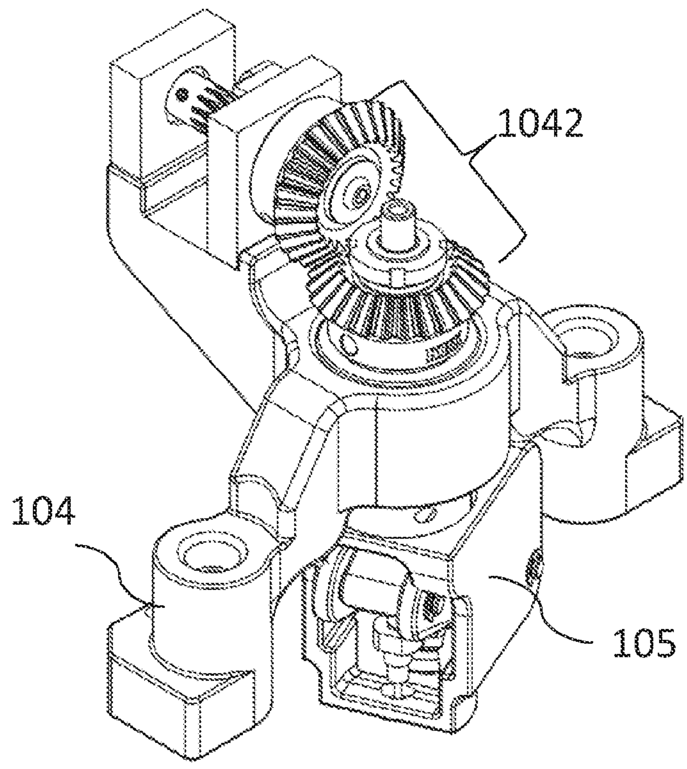
FIG. 13 is a perspective view of a main housing.

FIG. 13 is a perspective view of a main housing. The main housing is the larger component that everything is attached to and includes three main components, the main carriage 104 including a housing and guides, a gear train 1042, and the blade assembly 105. Guides are bushings inside the main carriage 104 that allow the main housing to slide up and down on vertical guide shafts. The gear train 1042 allows the blade assembly 105 to spin. When a rack gear is pushed down by the handle 101, the smaller spur gear and horizontal bevel gear are spun. The bevel gear spins the vertical bevel gear which spins the whole blade assembly 105. The blade assembly 105 is mounted to the main housing through a shaft that goes through the larger bearings in the middle. The blade assembly 105 is attached to a central shaft that goes through the bearings and the vertical bevel gear. A ventral shaft is hollow with a smaller shaft inside. This shaft is connected to the plunger carriage 103 so when the plunger carriage 103 is pushed down, it pushes the smaller internal shaft actuating the blade 115 and the barb 106.

Figure 14A:
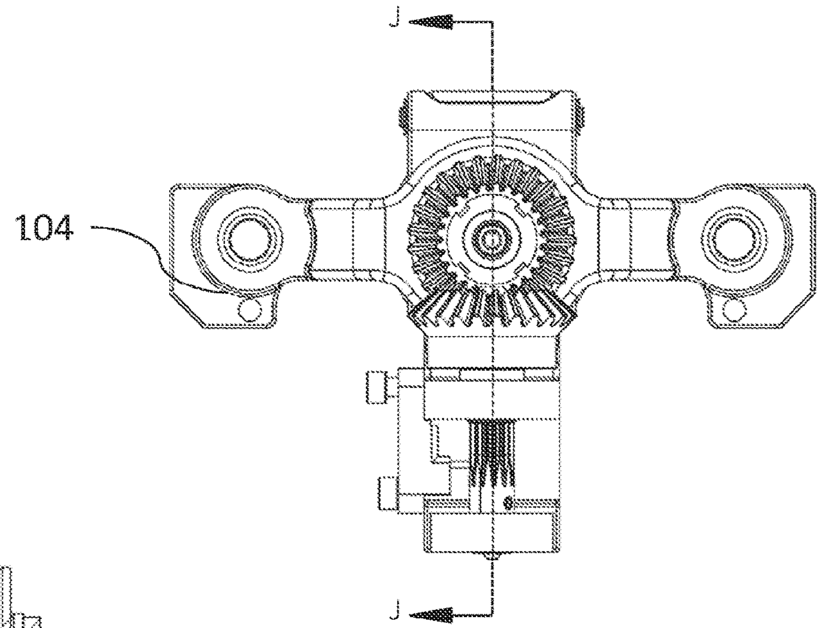
FIG. 14A is a top view of a main carriage and a blade assembly.
Figure 14B:
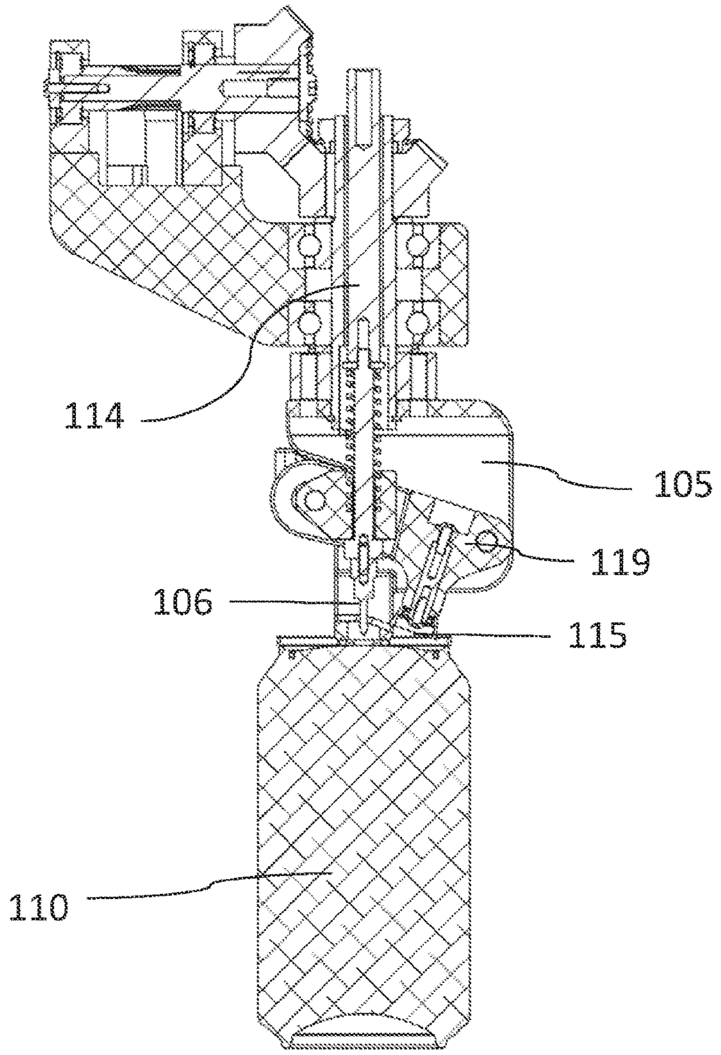
FIG. 14B is a side cross-sectional view along J-J of FIG. 14A.

FIG. 14A is top view of the main carriage 104 and blade assembly 105. FIG. 14B is a side cross-sectional view along J-J of FIG. 14A showing the plunger shaft 114, the barb 106, and blade 115. FIG. 14B is showing a blade arm 119 in its initial unengaged position.

Figure 15A:
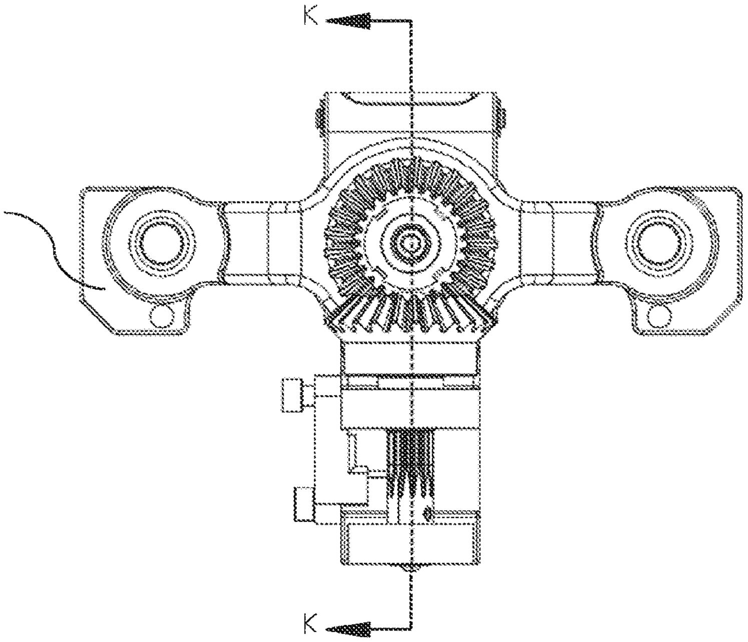
FIG. 15A is top view of a main carriage 104 and a blade assembly.
Figure 15B:
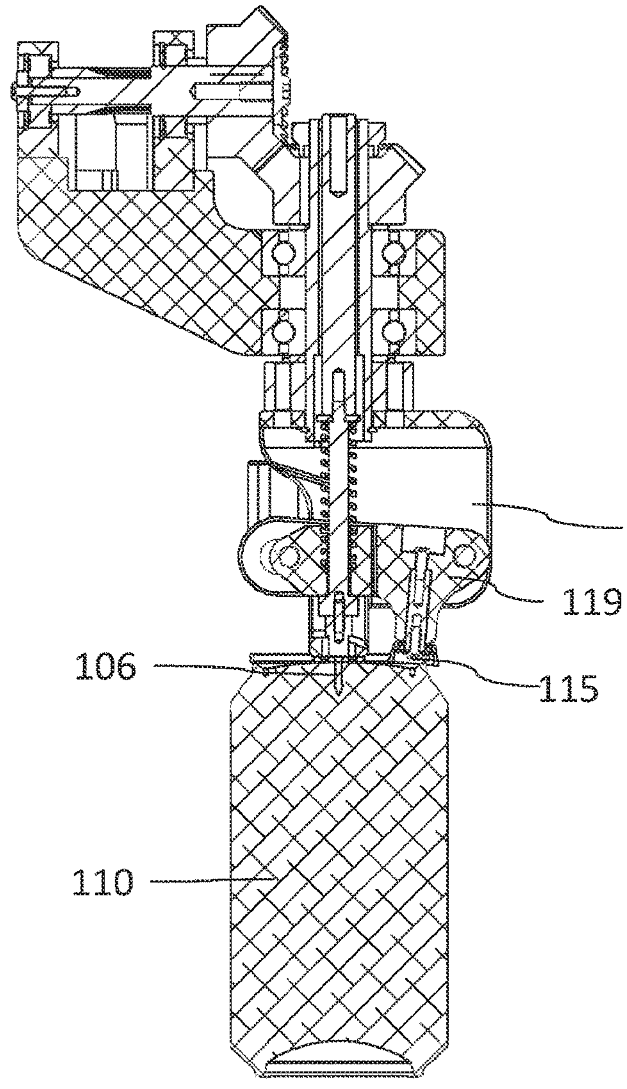
FIG. 15B is a side cross-sectional view along K-K of FIG. 15A.

FIG. 15A is top view of the main carriage 104 and the blade assembly 105. FIG. 15B is a side cross-sectional view along K-K of FIG. 15A. FIG. 15B is showing the blade arm 119 after it has been pressed down to engage the blade 115 into the can 110.

FIGS. 16-19 are used to further describe the operation of the container opener 100. FIG. 16A is a top view of the blade assembly 105 including a can 110 below the blade assembly 105. FIG. 16B is a side cross-sectional view along U-U of FIG. 16A and includes Detail M that is a closer scaled portion. FIG. 16B shows that the plunger shaft 114, which is tied into the plunger carriage 103 pushes down on a blade spring 116 which pushes down a spring block 118 which pushes down a blade arm 119. The blade arm 119 is a lever to rotate the blade 115 counterclockwise to extend the blade 115 into the can 110. The barb 106 is connected directly from the blade spring shaft 117 to the plunger shaft 114. The blade spring 116 does not affect the barb 106. When the plunger shaft 114 is lowered, the blade spring 116 pushes the spring block 118 down in turn rotating the blade arm 119 to extend the blade 115 to contact the inner rim of the can 110. At the same time the barb 106 is forced down in the small circle in the center of the tab of the can 110. The widest diameter of the barb 106 punctures through the wall of the lid of the can 110.

FIG. 17A is a top view of the blade assembly 105 including a can 110 below. FIG. 17B is a side cross-sectional view along Y-Y of FIG. 17A and includes Detail W that is a closer scaled portion. FIG. 17B shows that the plunger shaft 114 is lowered to it final position. This sets the barb 106 to is fully extended position. Once the blade 115 contacts the inner rim of the can 110, as shown in FIG. 16B, the blade arm 119 is now fixed. Forcing the blade 115 outward helps to minimize any exposed sharp edges on the can 110 after the lid is cut off. To permit for the plunger shaft 114 to continue travelling to its final position, the spring block 118 needs to slide relative to the blade spring shaft 117 to define a gap 120 between the spring block 118 and a step on the blade spring shaft 117. The spring block 118 compresses the blade spring 116, preloading the blade arm 119 to ensure a proper amount of blade 115 contact force. The blade 115 hits the edge of the can 100, so the spring block 118 cannot travel any further down. The blade spring shaft 117 then keeps sliding through the spring block 118 to account for any tolerance on the can 110 and its position. Defining the gap 120 and the compression of the blade spring 116 plays a role in the container opener's ability to cut different diameter cans 110. The larger the diameter of the can is, the smaller the gap 160 and vice versa for smaller diameter cans. This is important because it allows the plunger shaft 114/barb 106 to have a fixed stroke regardless of the actual diameter of the can 110. Detail W shows a larger gap 160 defined due to a smaller diameter of can 110.

FIG. 18A is a top view of the blade assembly 105 including a can 110 below. FIG. 18B is a side cross-sectional view along AC-AC of FIG. 18A and includes Detail AB that is a closer scaled portion. FIG. 18B is similar to that of FIG. 17B but is used to show that the container opener 100 can accommodate different diameter cans 110. Detail AB shows that a smaller gap 120 is defined due to a lager can diameter.

Figure 19A:
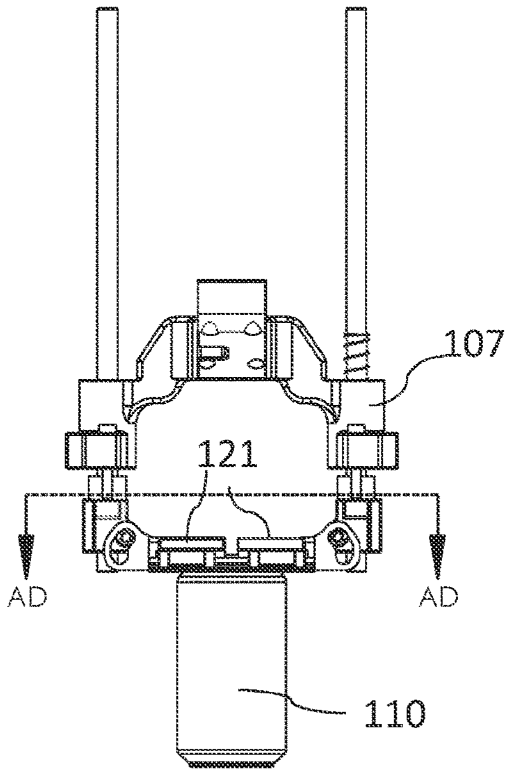
FIG. 19A is a side view of clamp assembly with jaws open.
Figure 19B:
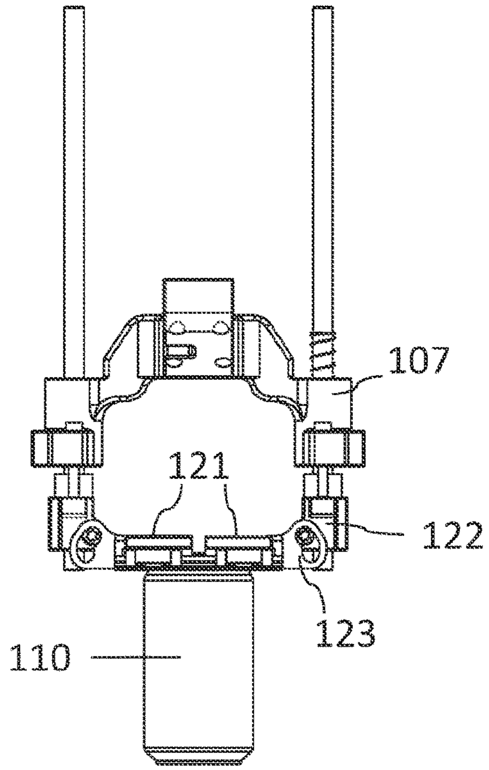
FIG. 19B is a same view as FIG. 19A without the section notation and showing the locations of a can clamp bearing block and a clamp cam slot.
Figure 19C:
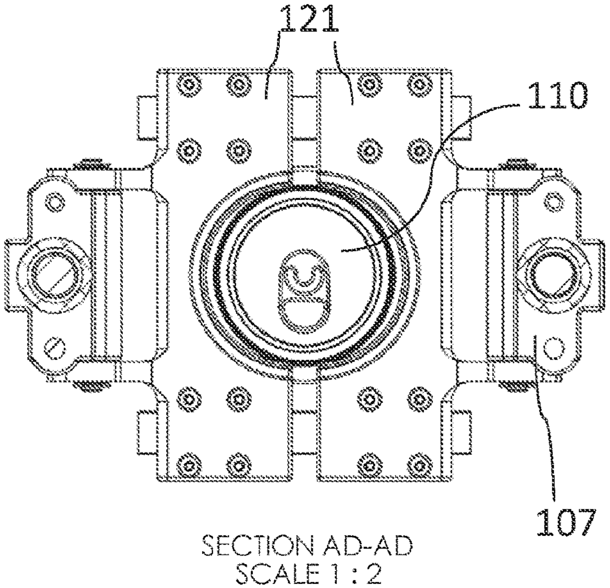
FIG. 19C is a top cross-sectional view along AD-AD of FIG. 19A.
Figure 20B:
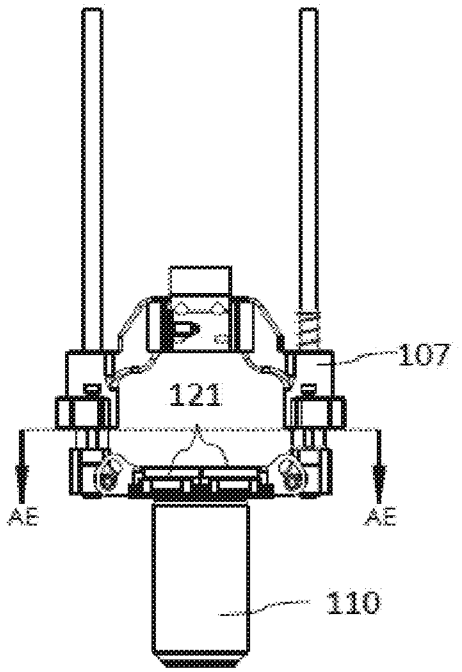
FIG. 20B is a same view as FIG. 20A without the section notation.
Figure 20A:
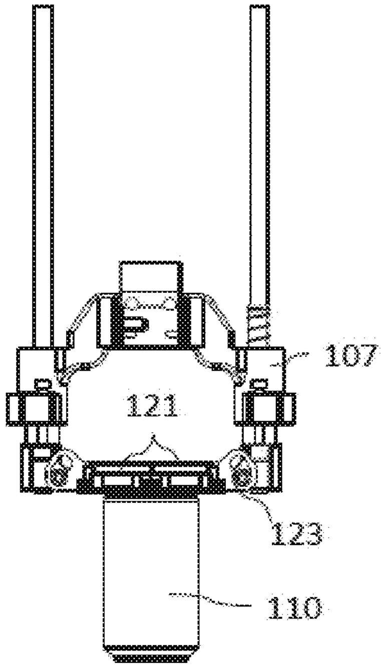
FIG. 20A is a side view of a clamp assembly with jaws closed.
Figure 20C:
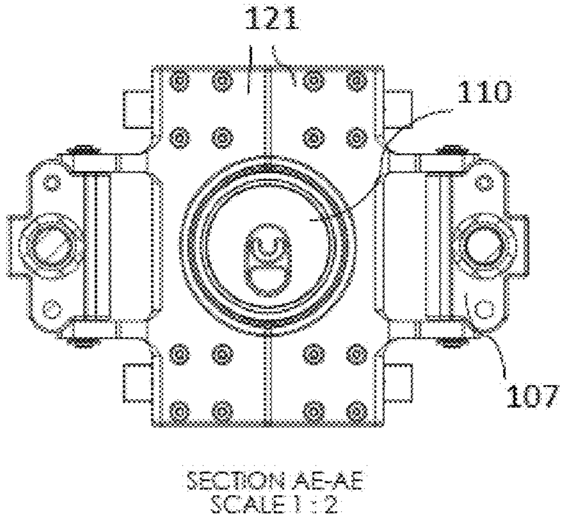
FIG. 20C is a top cross-sectional view along AE-AE of FIG. 20A.
Figure 21A:
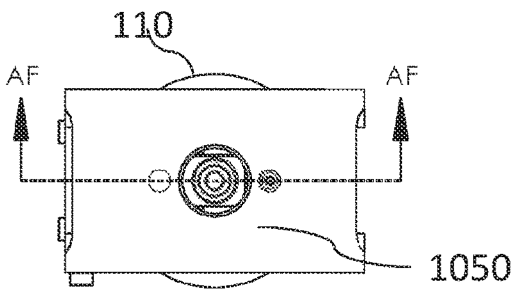
FIG. 21A and FIG. 21B are top views of a blade assembly including a can below.
Figure 21B:
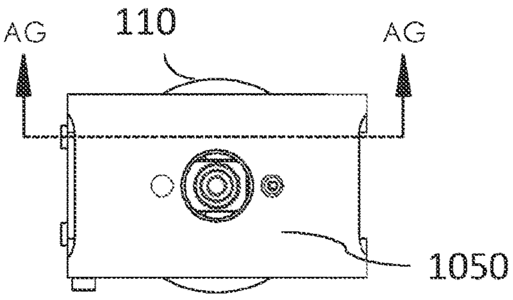
Figure 21C:
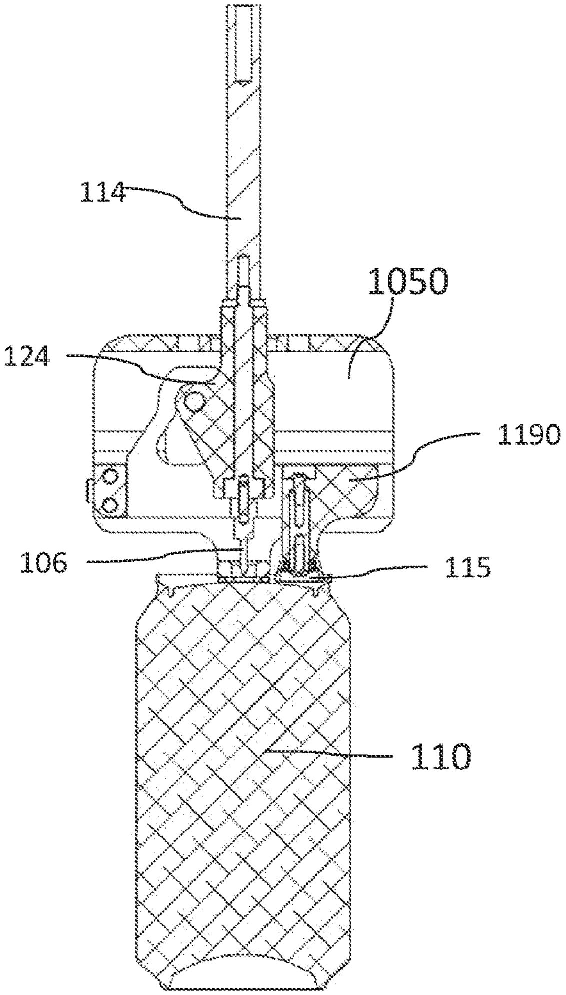
FIG. 21C is a side cross-sectional view along AF-AF of FIG. 21A.
Figure 21D:
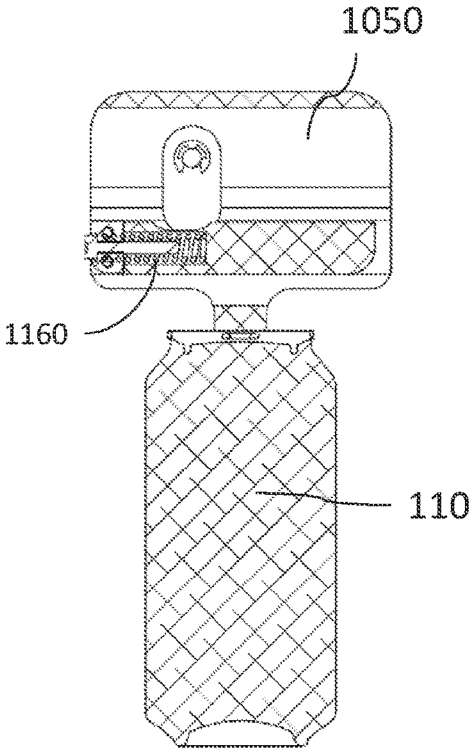
FIG. 21D a top cross-sectional view along AG-AG of FIG. 21B.
Figure 22A:
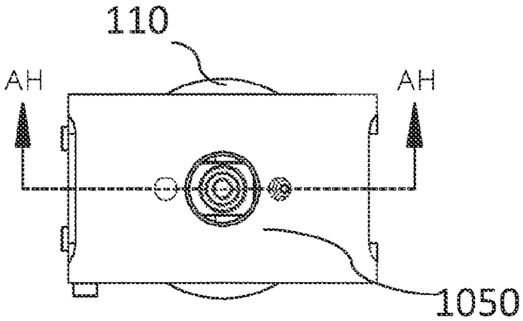
FIG. 22A and FIG. 22B are top views of a blade assembly including a can below.
Figure 22B:
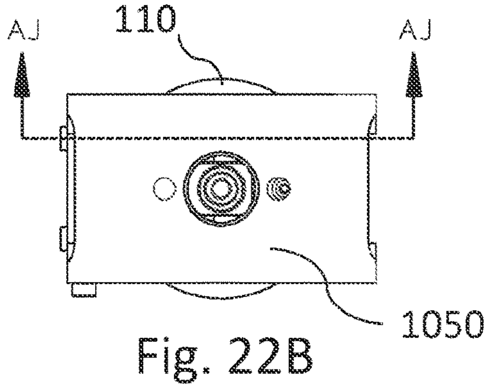
Figure 22C:
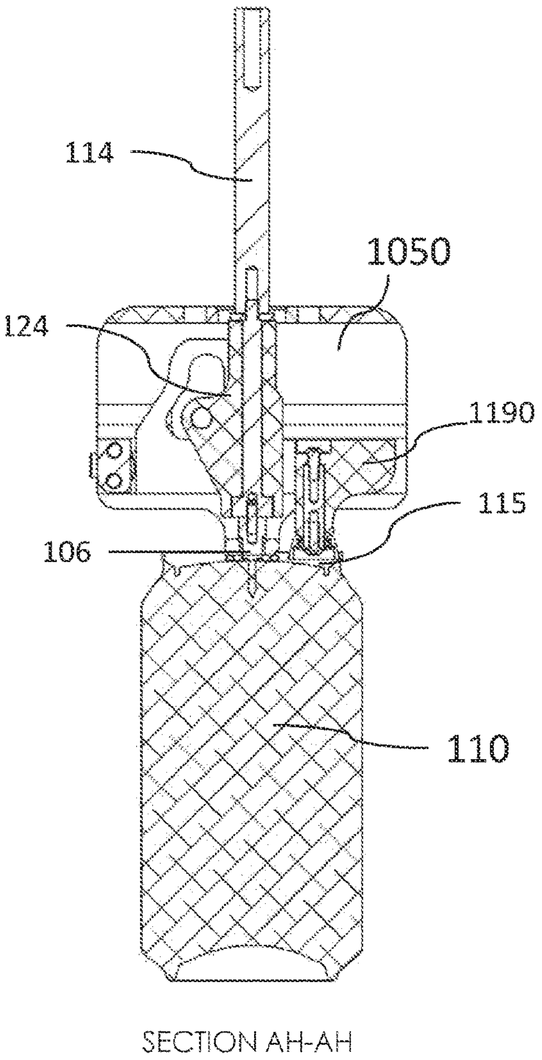
FIG. 22C is a side cross-sectional view along AH-AH of FIG. 22A.
Figure 22D:
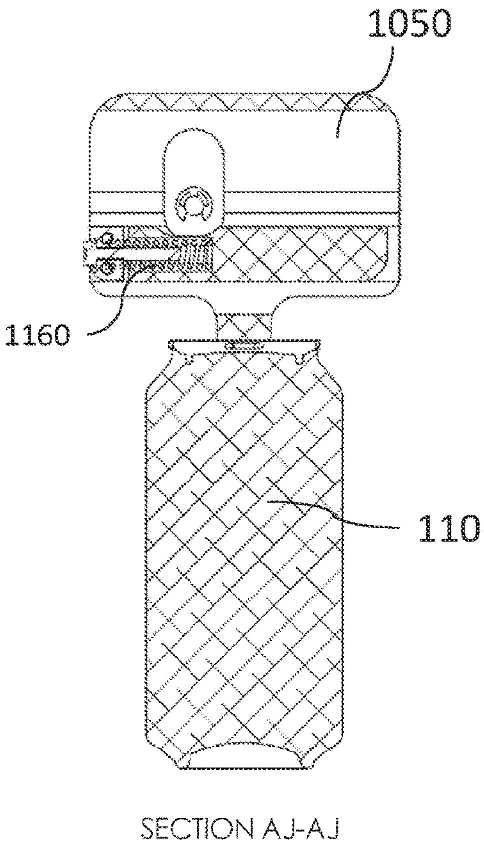
FIG. 22D a top cross-sectional view along AJ-AJ of FIG. 22B.
Figure 23A:
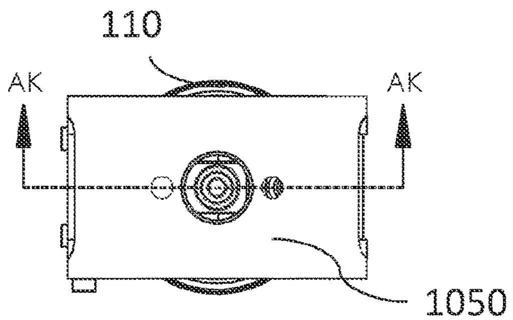
FIG. 23A and FIG. 23B are top views of the blade assembly including a can below.
Figure 23B:
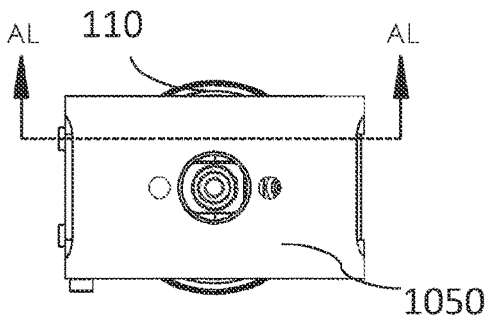
Figure 23C:
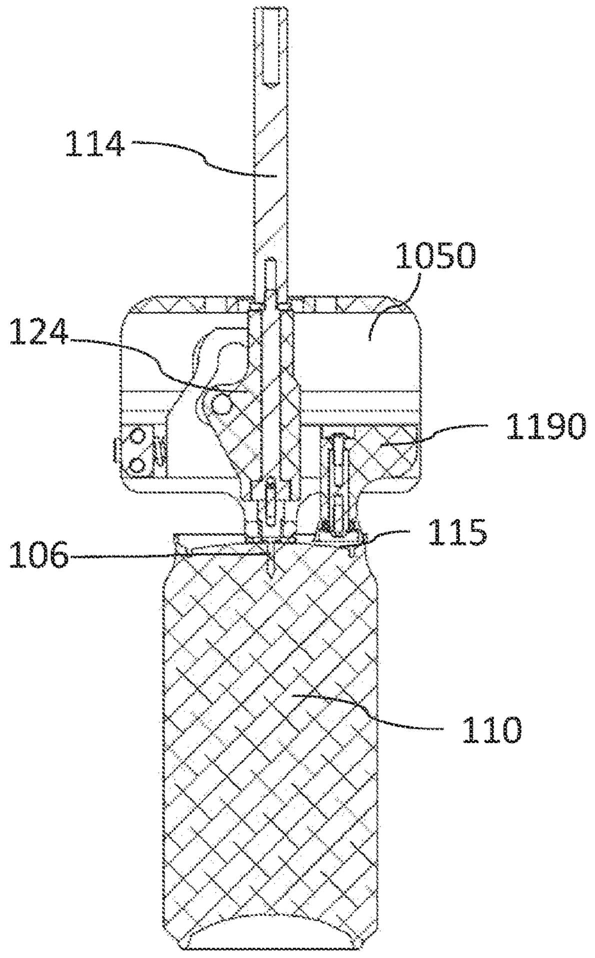
FIG. 23C is a side cross-sectional view along AK-AK of FIG. 23A.
Figure 23D:
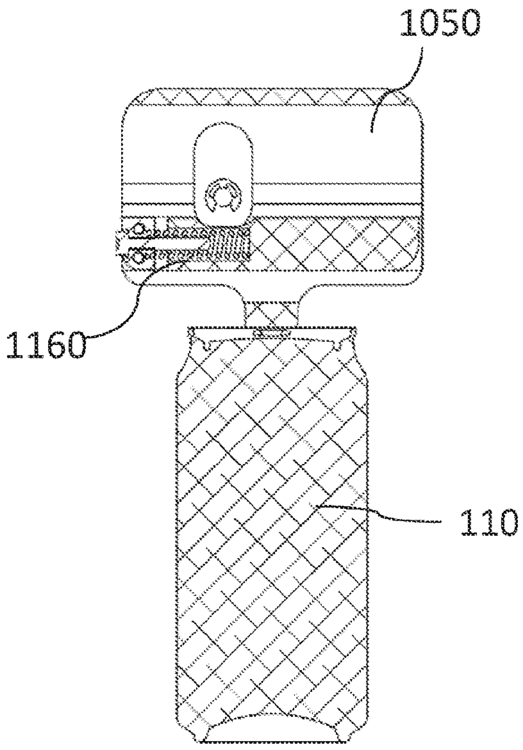
FIG. 23D a top cross-sectional view along AL-AL of FIG. 23B.

FIGS. 19 and 20 are used to show the operation of the clamp assembly 107 as it clamps a can 110. FIG. 19A is a side view of the clamp assembly 107 with the jaws 121 open, a gap between the two jaws 121 is present. FIG. 19B is a same view as FIG. 19A without the section notation and showing the locations of a can clamp bearing block 122 and a clamp cam slot 123. FIG. 19C is a top cross-sectional view along AD-AD of FIG. 19A. FIG. 20A is a side view of the clamp assembly 107 with the jaws 121 closed, there is no gap between the jaws 121. FIG. 20B is a same view as FIG. 20A without the section notation. FIG. 20C is a top cross-sectional view along AE-AE of FIG. 20A. FIGS. 19 and 20 show that as the main carriage 104 is driven down by the handle 101, the vertical motion of the can clamp bearing block 122 drives the clamp cam slot 123 inwards, thus moving the jaws 121 inward and securely clamping the can 110.

FIGS. 21-23 show an alternate blade assembly 1050 according to another aspect of the disclosure. FIGS. 21A, 21B, 22A, 22B, 23A, and 23B are top views of the blade assembly 1050 including the can 110 below. FIG. 21C is a side cross-sectional view along AF-AF of FIG. 21A. FIG. 21D a top cross-sectional view along AG-AG of FIG. 21B. FIG. 22C is a side cross-sectional view along AH-AH of FIG. 22A. FIG. 22D a top cross-sectional view along AJ-AJ of FIG. 22B. FIG. 23C is a side cross-sectional view along AK-AK of FIG. 23A. FIG. 23D a top cross-sectional view along AL-AL of FIG. 23B.

In this aspect, a blade arm 1190 is sprung outward by two blade springs 1160. When the plunger shaft 114 is lowered, it pushes a cam block 124 down, releasing the blade arm 1190 so the blade 115 can contact the can 110. With respect to FIG. 23, once the blade 115 makes contact with the can 110, the blade arm 1190 is now disconnected from the cam block 124 allowing the blade springs 1160 to apply the necessary contact force to the blade 115. This also allows the plunger carriage 103 to continue moving downward so the barb 106 can reach its final position. When the plunger shaft 114 is raised, the cam block 124 pushes on the cam slot on the blade arm 1190 to retract the blade 115, compressing the blade springs 1160, and retracting the barb 106. FIG. 23 shows that because the blade arm 1190 is sprung outward and is independent to the final position of the plunger shaft 114, this configuration also can accommodate different diameters of cans 110.

Figure 24:
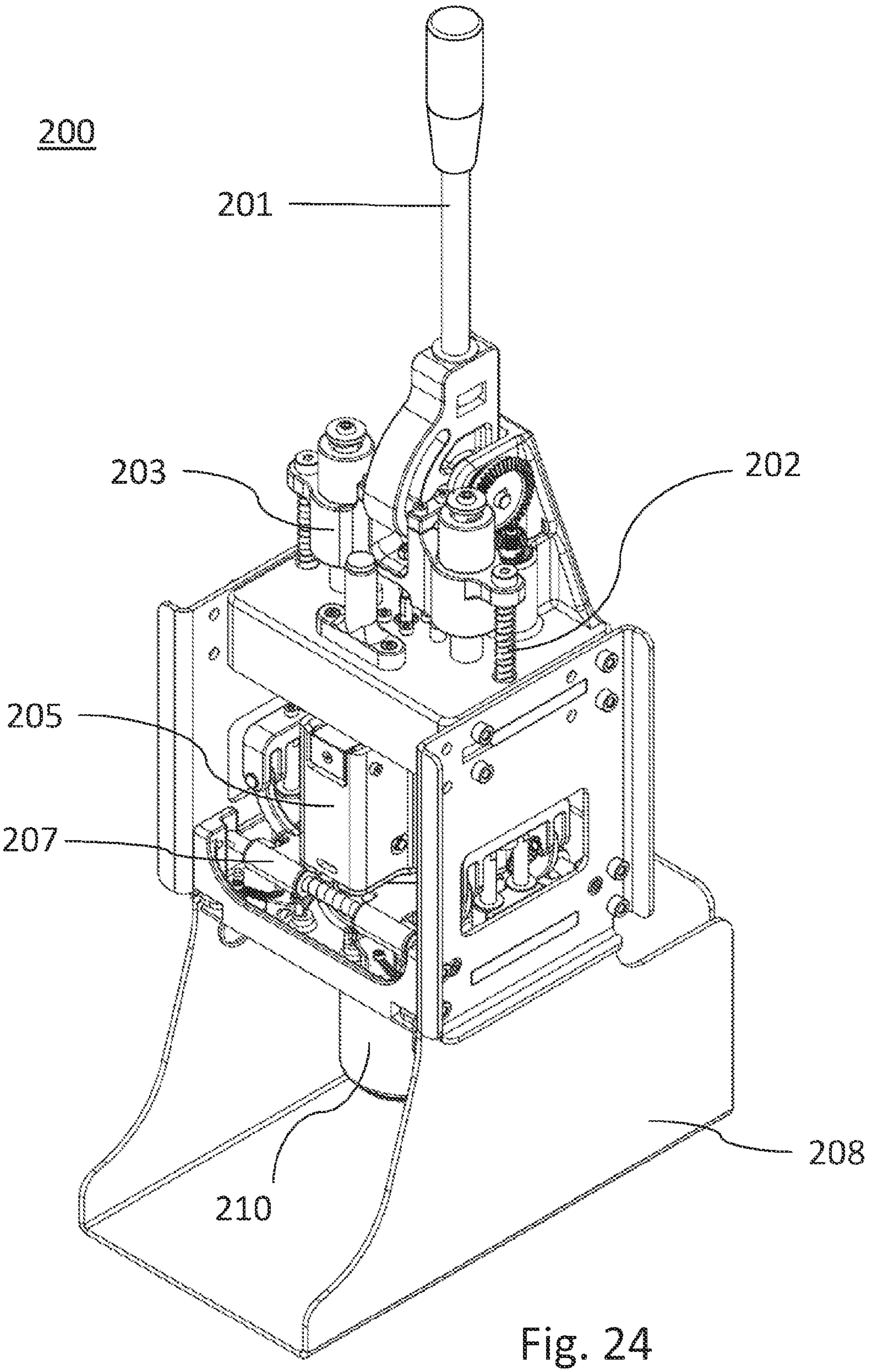
FIG. 24 is a perspective view of a container opener according to a second embodiment of the present disclosure.

FIGS. 24-52 are used to describe a container opener 200 of a second embodiment of the present disclosure. FIG. 24 shows the container opening 200 includes a handle 201, clamp shafts 202, a plunger carriage 203, a blade assembly 205, a clamp assembly 207, and a base 208. In an operation sequence, as the handle 201 is pulled down, the plunger carriage 203 lowers, driving the clamp shafts 202 downward. The clamp shafts 202 actuate to clamp and secure a can 210, a barb 203 punctures the can 210, a blade 215 punctures the can 210, and the blade assembly 205 pins at least 120 degrees to cut the top off the can 210. This sequence is then reversed when the handle 201 is lifted.

Figure 25:
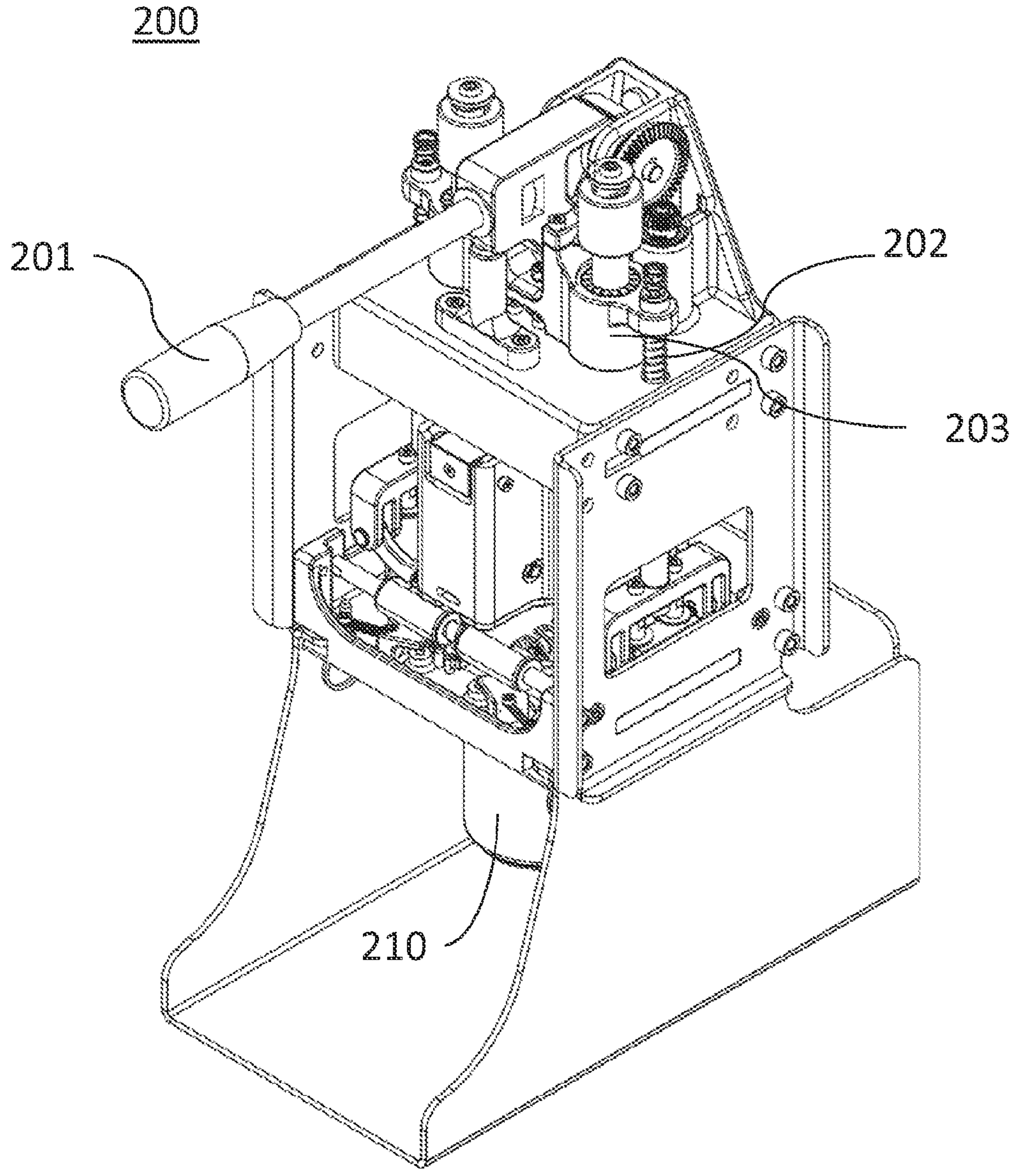
FIG. 25 a perspective view of a container opener of FIG. 24 in an operational state.

FIG. 25 shows the final state as the handle 201 is lowered to is down position. At this stage the can 210 is secured in the clamp assembly 207, the blade 215 and barb 203 have punctured the can 210, and the blade assembly 205 has rotated at least 120 degrees.

Figure 26:
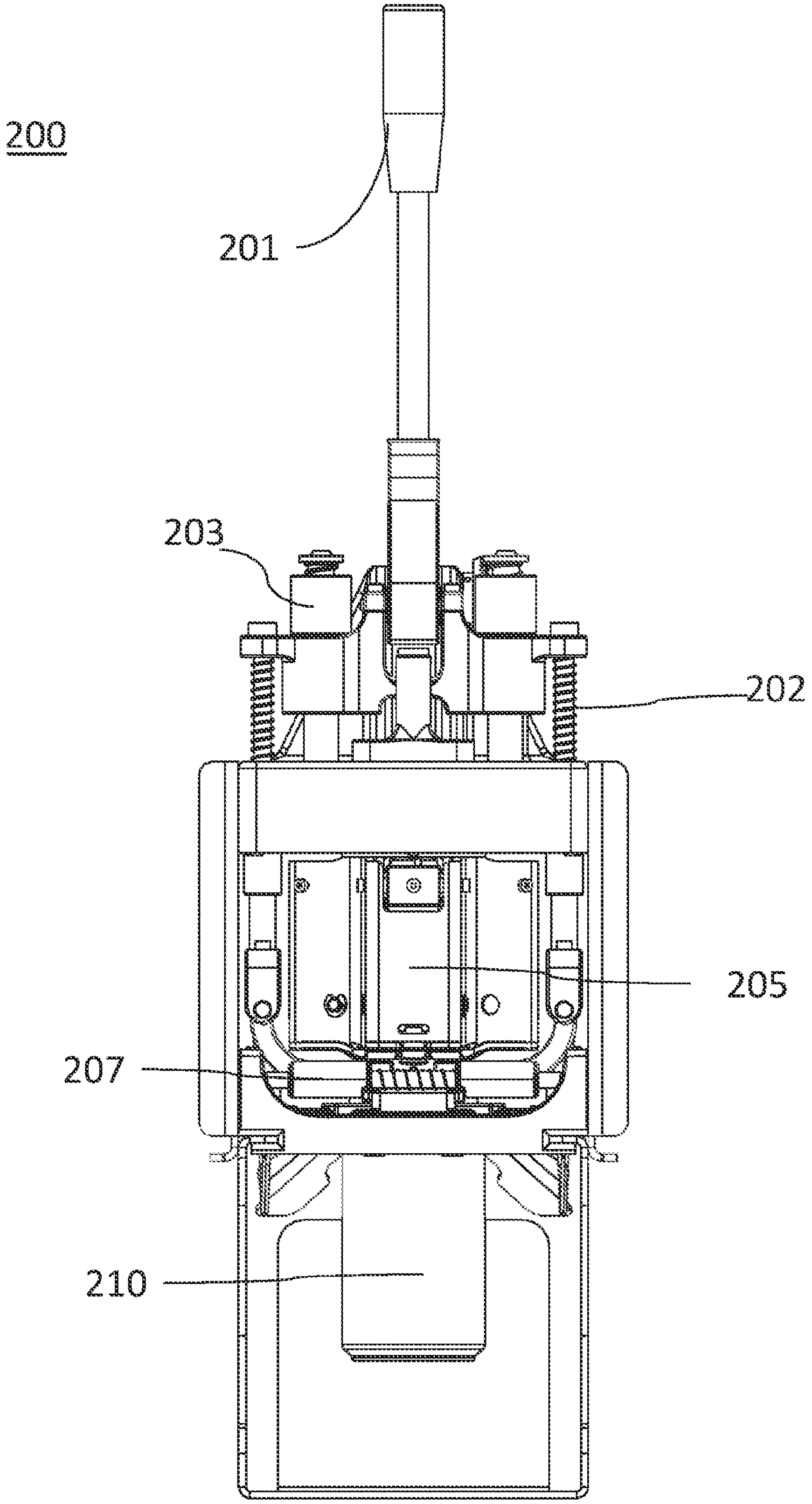
FIG. 26 is a front view of a container opener with a handle in the up position.
Figure 27:
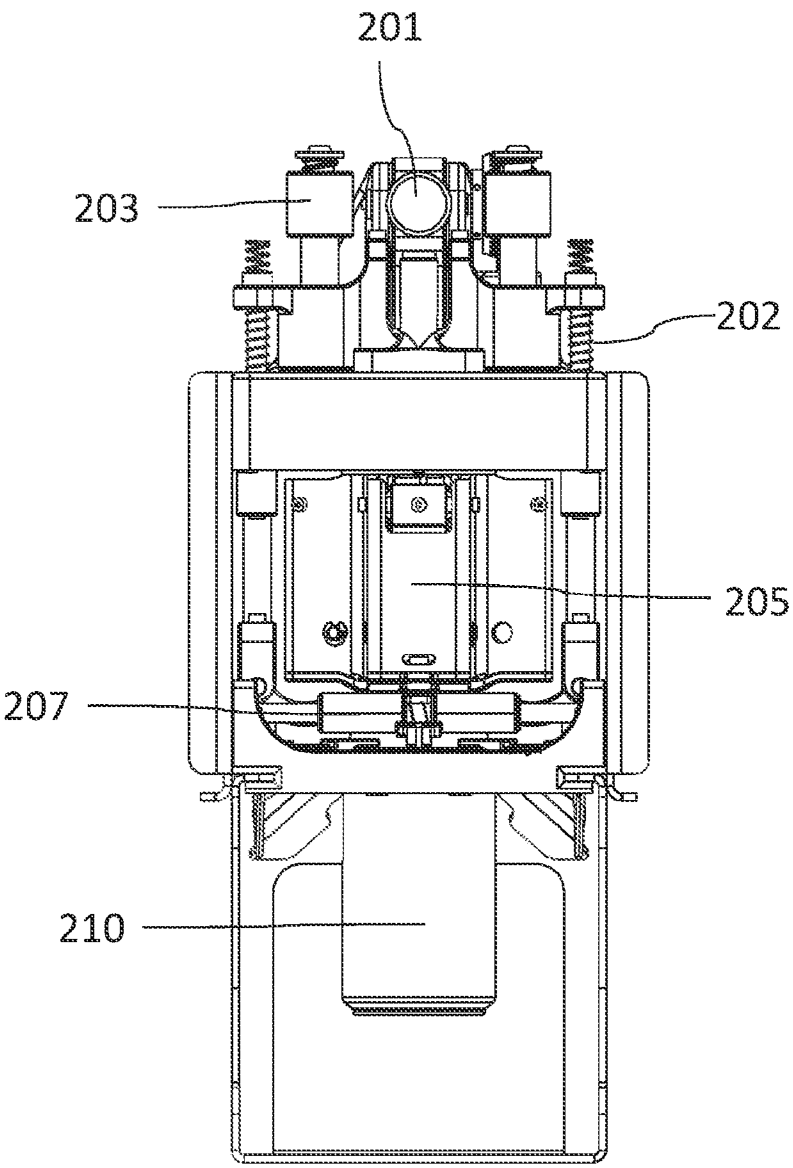
FIG. 27 is a front view of a container opener with a handle in the down position.

FIG. 26 is a front view of the container opener 200 with the handle 201 in the up position. FIG. 27 is a front view of the container opener 200 with the handle 201 in the down position. Here, the clamp assembly 207 is closed and tightly holds the can 210.

Figure 28:
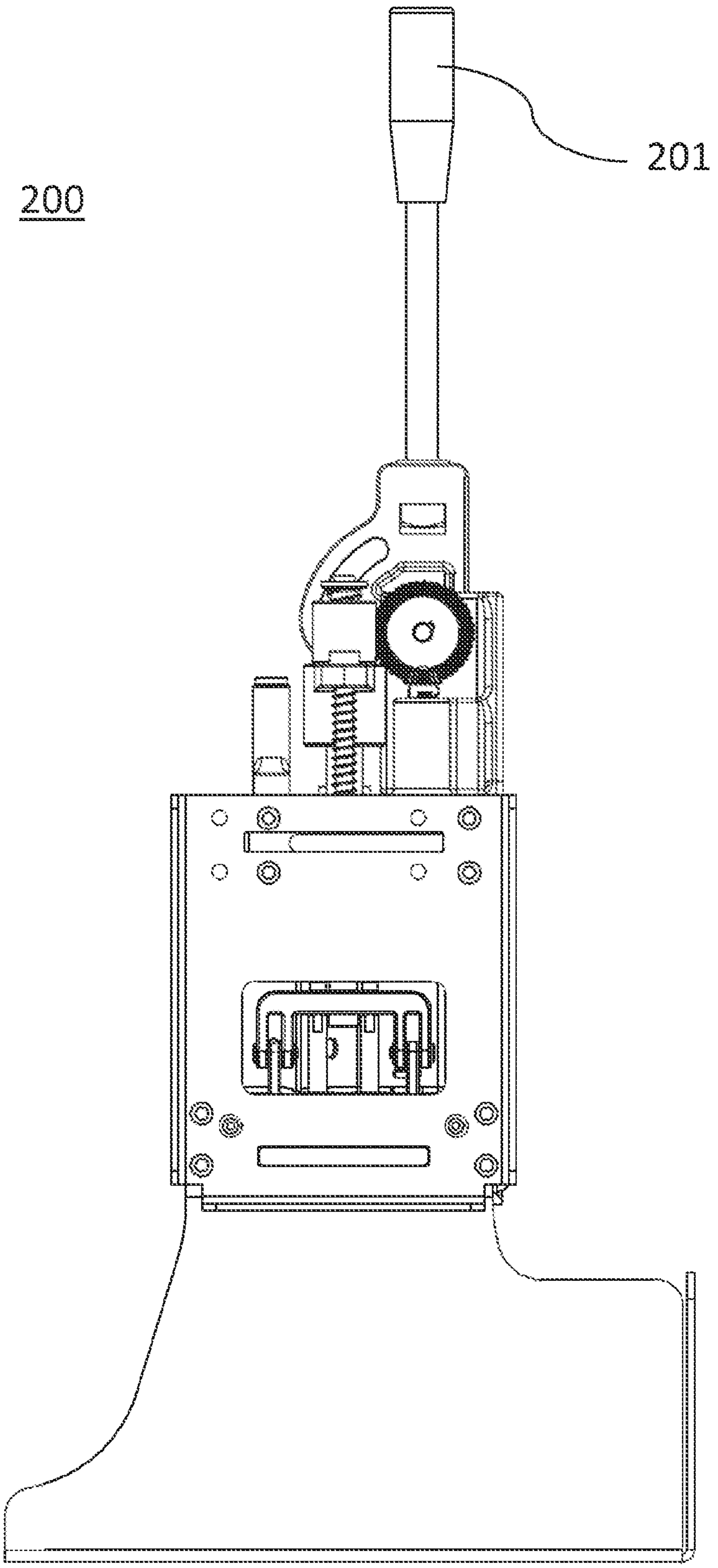
FIG. 28 is a right side view of a container opener with a handle in the up position.
Figure 29:
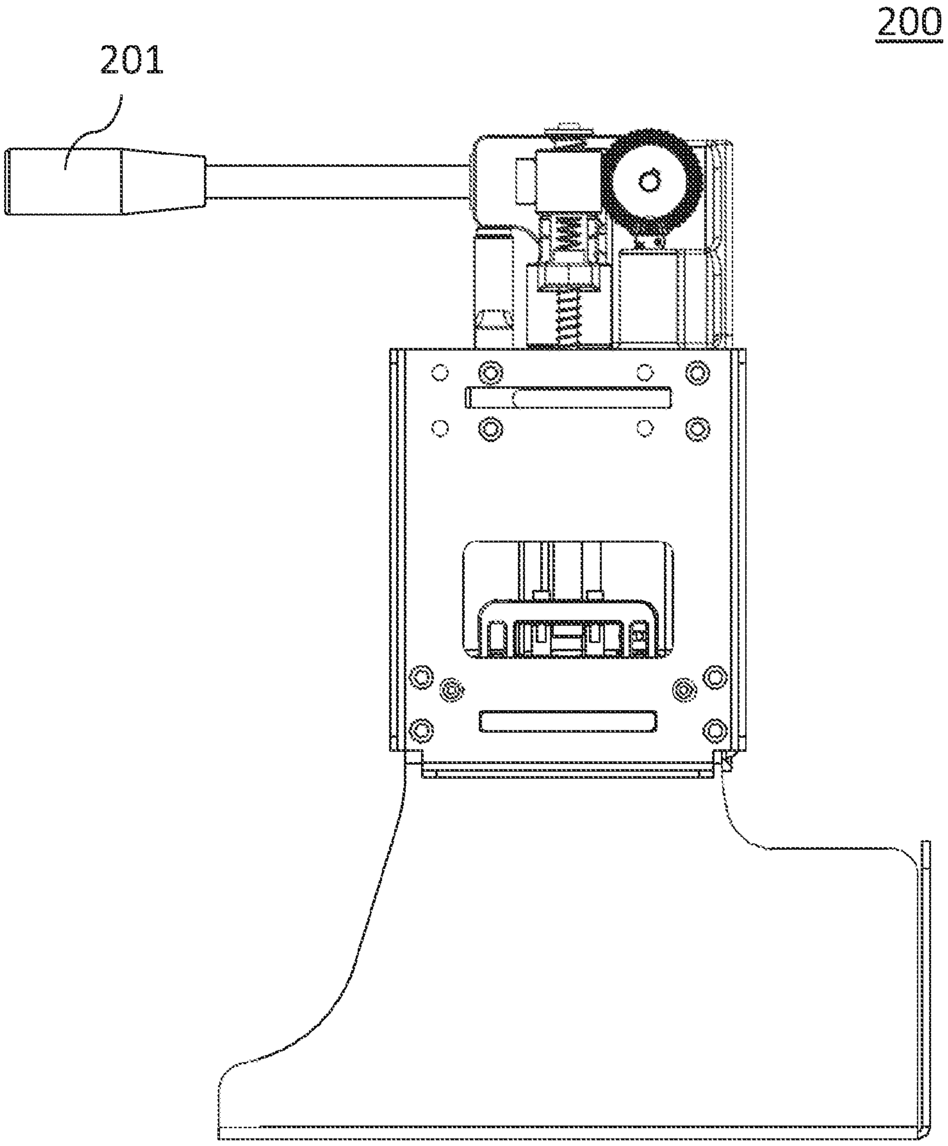
FIG. 29 is a right side view of a container opener with a handle 201 in the down position.

FIG. 28 is a right side view of the container opener 200 with the handle 201 in the up position. FIG. 29 is a right side view of the container opener 200 with the handle 201 in the down position.

Figure 30A:
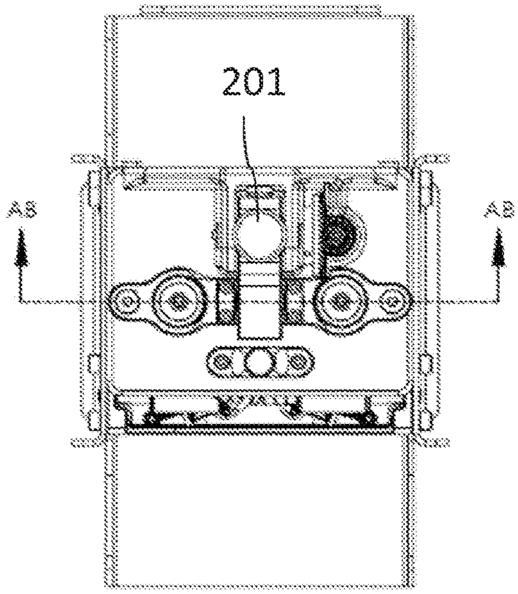
FIG. 30A is a top view of container opener with a handle in the up position.
Figure 30B:
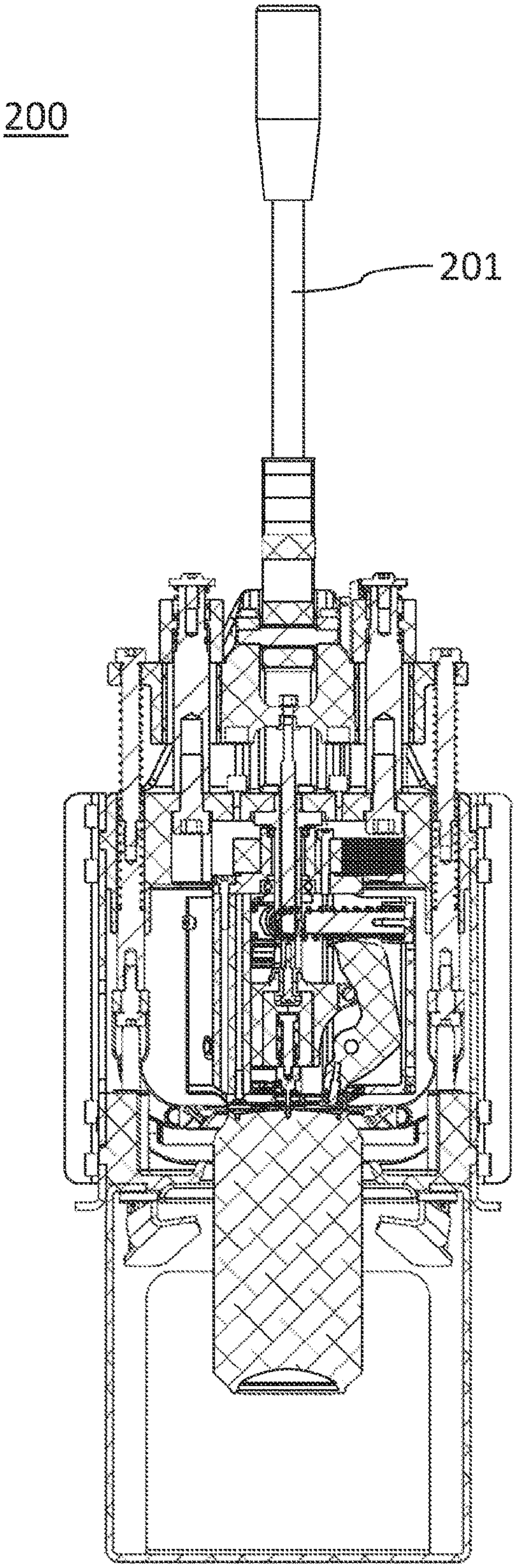
FIG. 30B is front cross-section view along section AB-AB of FIG. 30A.
Figure 31A:
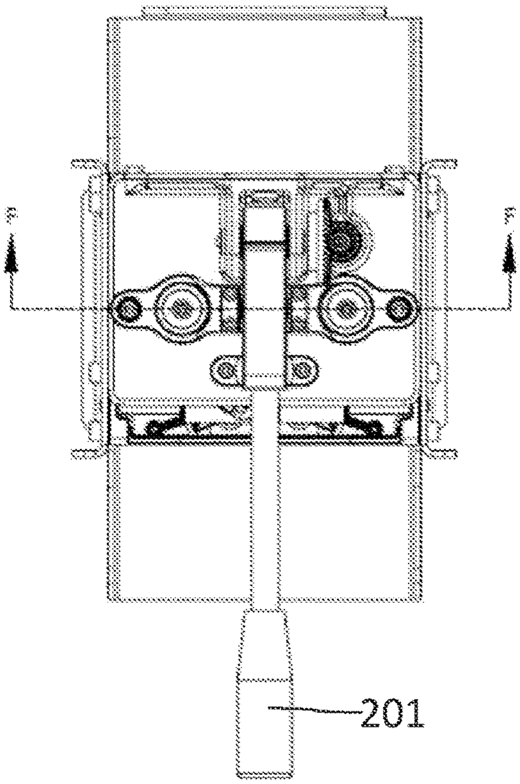
FIG. 31A is a top view of a container opener with a handle in the down position.
Figure 31B:
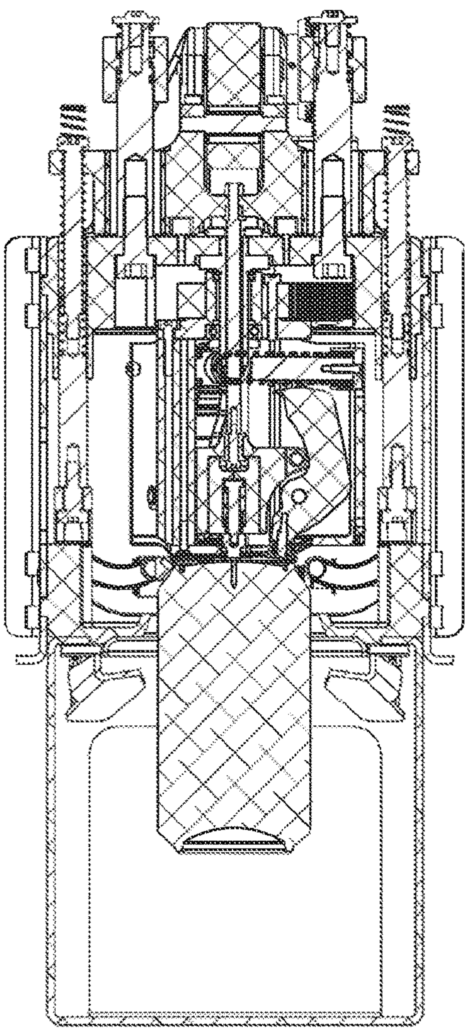
FIG. 31B is a front cross-section view along section F-F of FIG. 31A.

FIG. 30A is a top view of the container opener 200 with the handle 201 in the up position. FIG. 30B is front cross-section view along section AB-AB of FIG. 30A. FIG. 31A is a top view of the container opener 200 with the handle 201 in the down position. FIG. 31B is front cross-section view along section F-F of FIG. 31A.

Figure 32A:
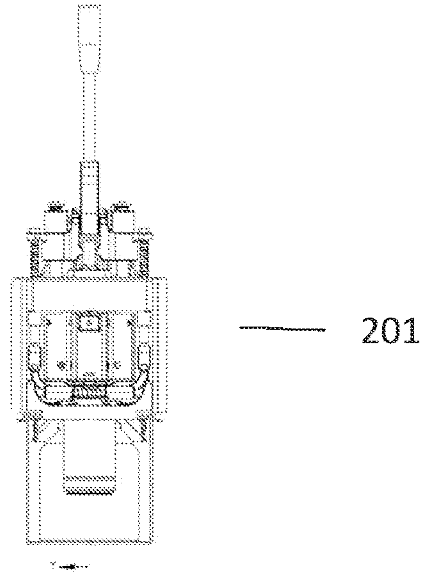
FIG. 32A is a front view of a container opener with a handle in the up position.
Figure 32B:
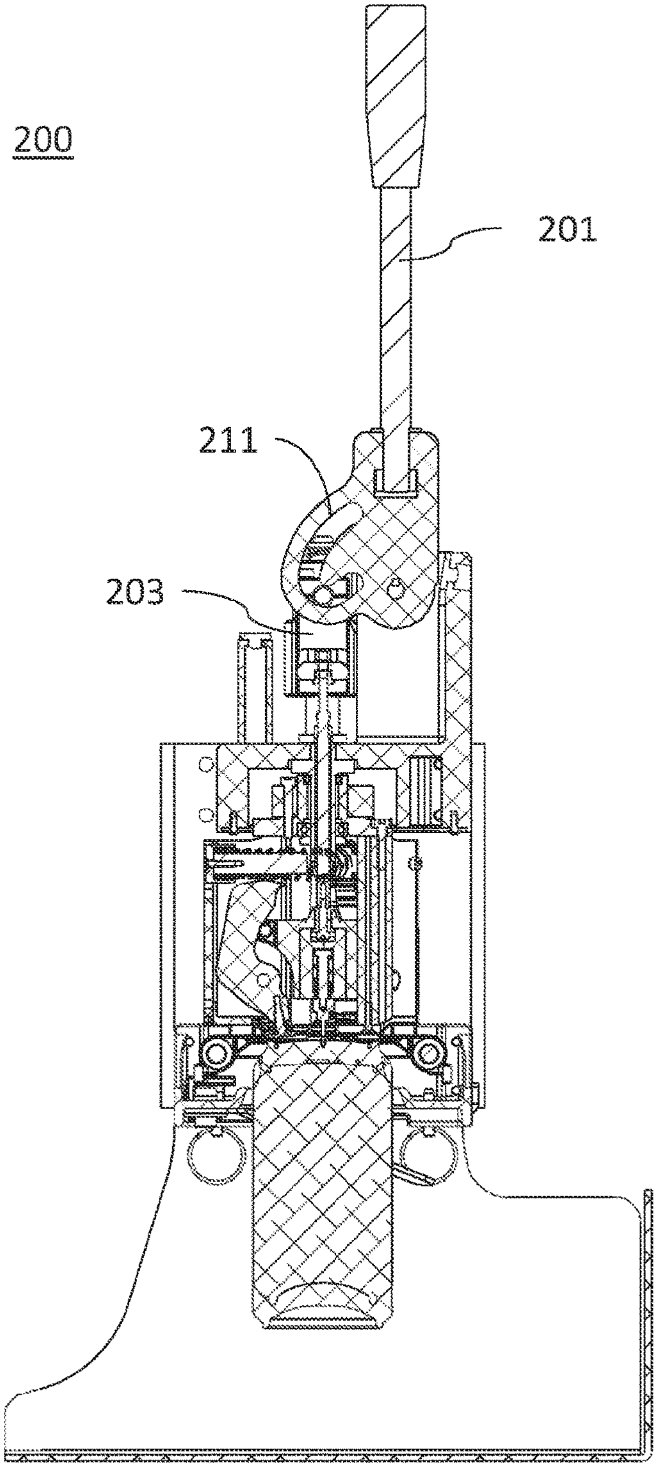
FIG. 32B is a side cross-section view along section Y-Y of FIG. 32A.
Figure 33A:
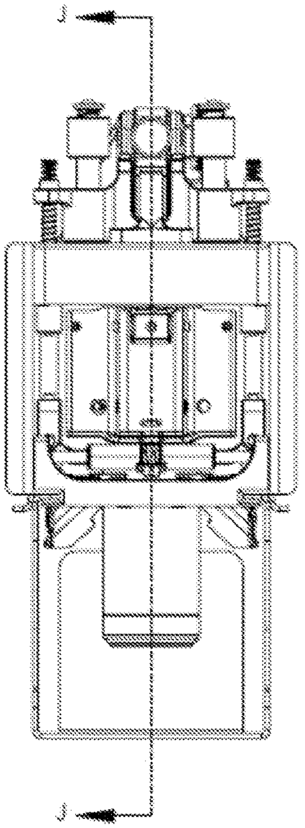
FIG. 33A is a front view of a container opener with a handle in the down position.
Figure 33B:
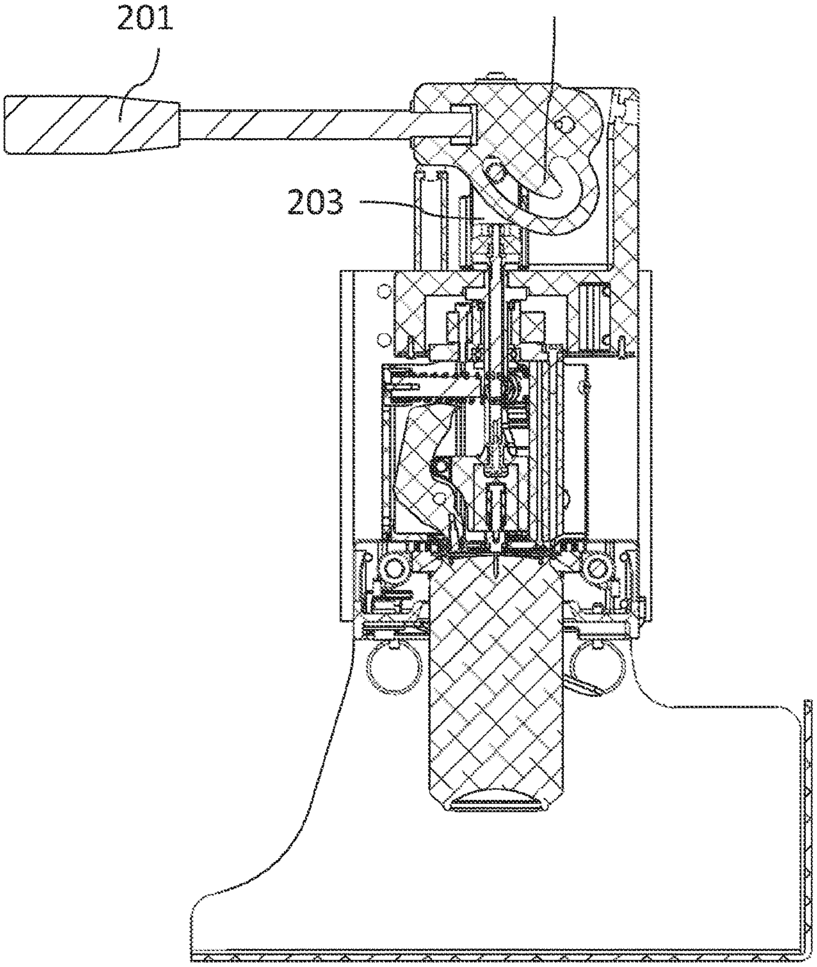
FIG. 33B is a side cross-section view along section J-J of FIG. 33A.

FIG. 32A is a front view of the container opener 200 with the handle 201 in the up position. FIG. 32B is side cross-section view along section Y-Y of FIG. 32A. FIG. 33A is a front view of the container opener with the handle 201 in the down position. FIG. 33B is side cross-section view along section J-J of FIG. 33A. FIG. 32 shows a cam slot 211 in the handle 201 can include two sections: a vertical motion portion pushes the plunger carriage 203 down to a set distance; and during rotary motion the position of the cam slot 211 is concentric with the pivot of the handle 201 which locks the plunger carriage 203 in its lower position and allows the handle 201 to continue to rotate, without moving the plunger carriage 203, to drive a gear train, in turn spinning the blade assembly 205, as described in more detail below.

Figure 34:
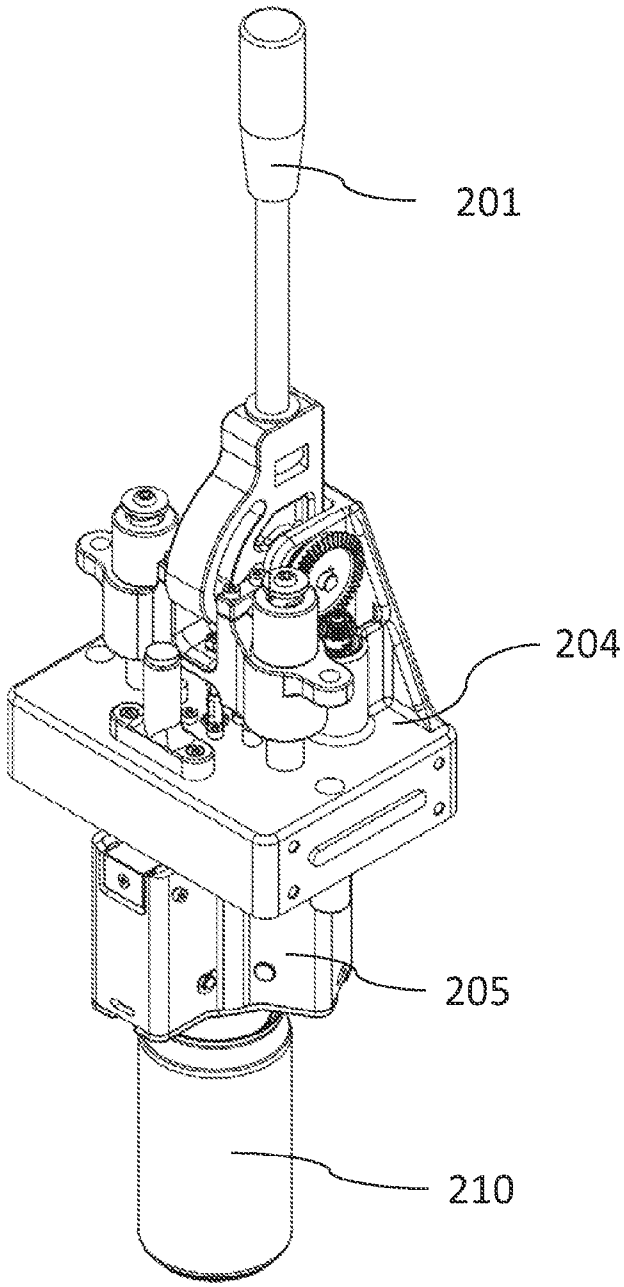
FIG. 34 is a perspective view of a gearbox assembly and a blade assembly.
Figure 35:
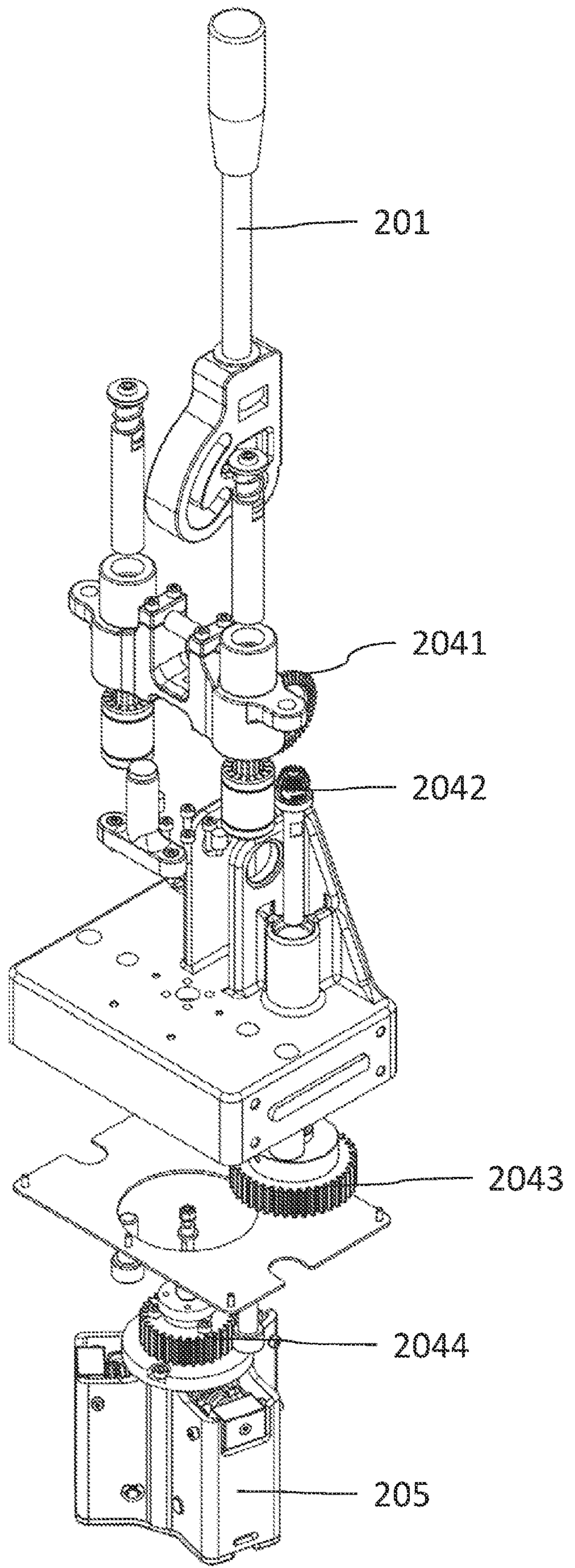
FIG. 35 is an exploded view of a gearbox assembly.
Figure 36:
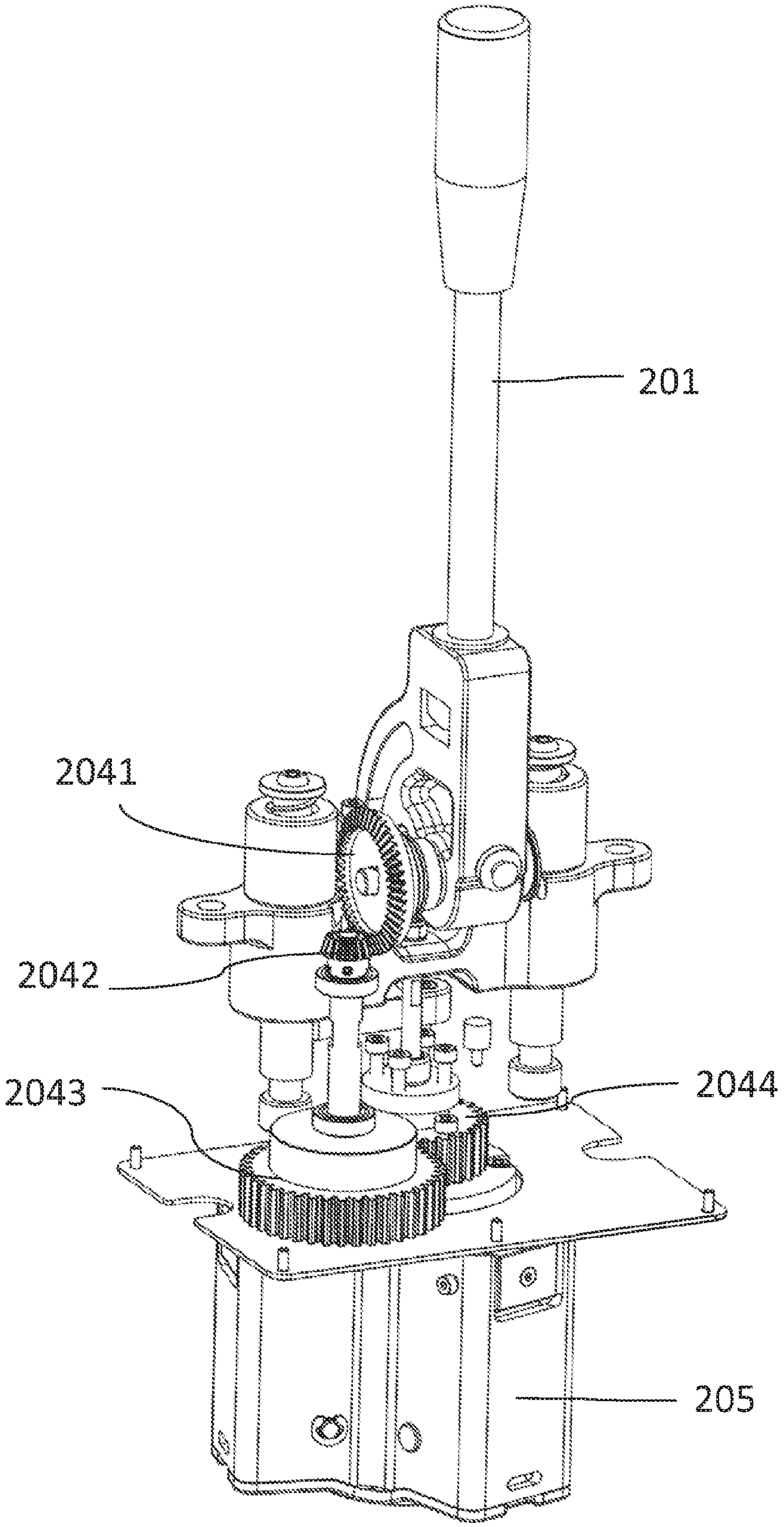
FIG. 36 shows a larger bevel gear attached to a handle.

FIG. 34 is a perspective view of a gearbox assembly 204 and the blade assembly 205. FIG. 35 is an exploded view of the gearbox assembly 204. FIG. 36 shows a larger bevel gear 2041 attached to the handle 201, so when the handle 201 is pulled downward, the larger bevel gear 2041 rotates a smaller bevel gear 2042, which then rotates a larger spur gear 2043, which then rotates a smaller spur gear 2044. This gear train causes the blade assembly 205 to rotate with the motion of the handle 201. The rotating blades will cut the lid off the can 210.

Figure 37A:
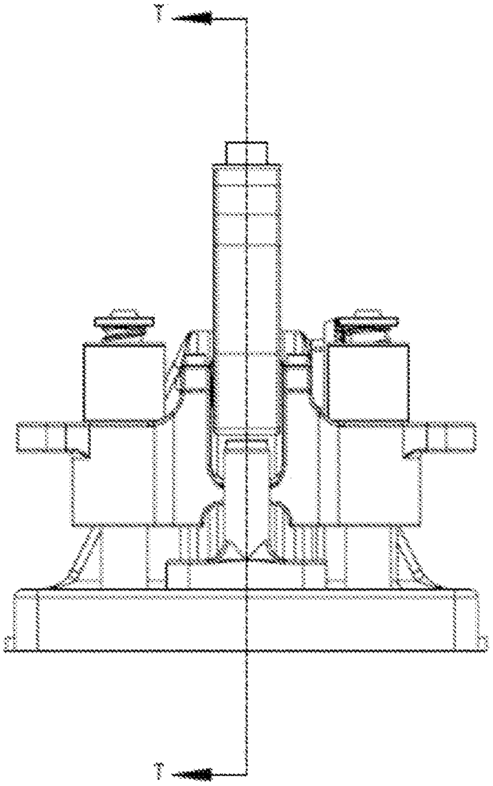
FIG. 37A is a view of a gearbox assembly with the handle in the up position.
Figure 37B:
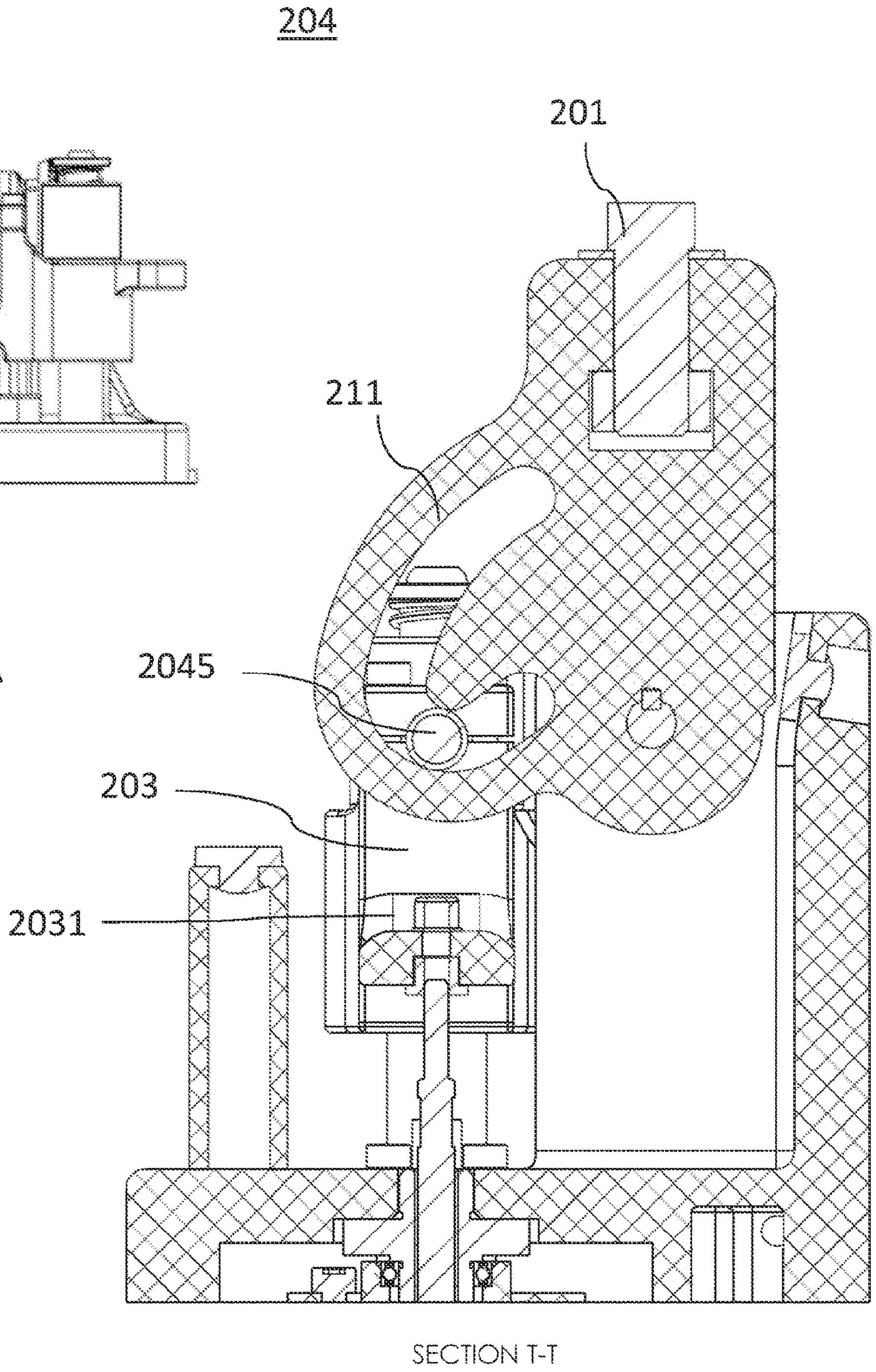
FIG. 37B is a side cross-section view of a gearbox assembly taken along section T-T of FIG. 37A.
Figure 38A:
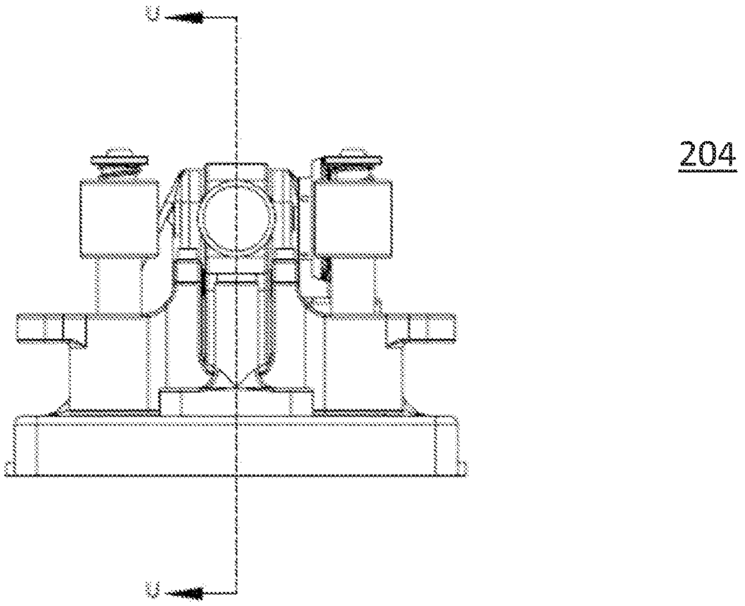
FIG. 38A is a front view of a gearbox assembly with a handle in the down position.
Figure 38B:
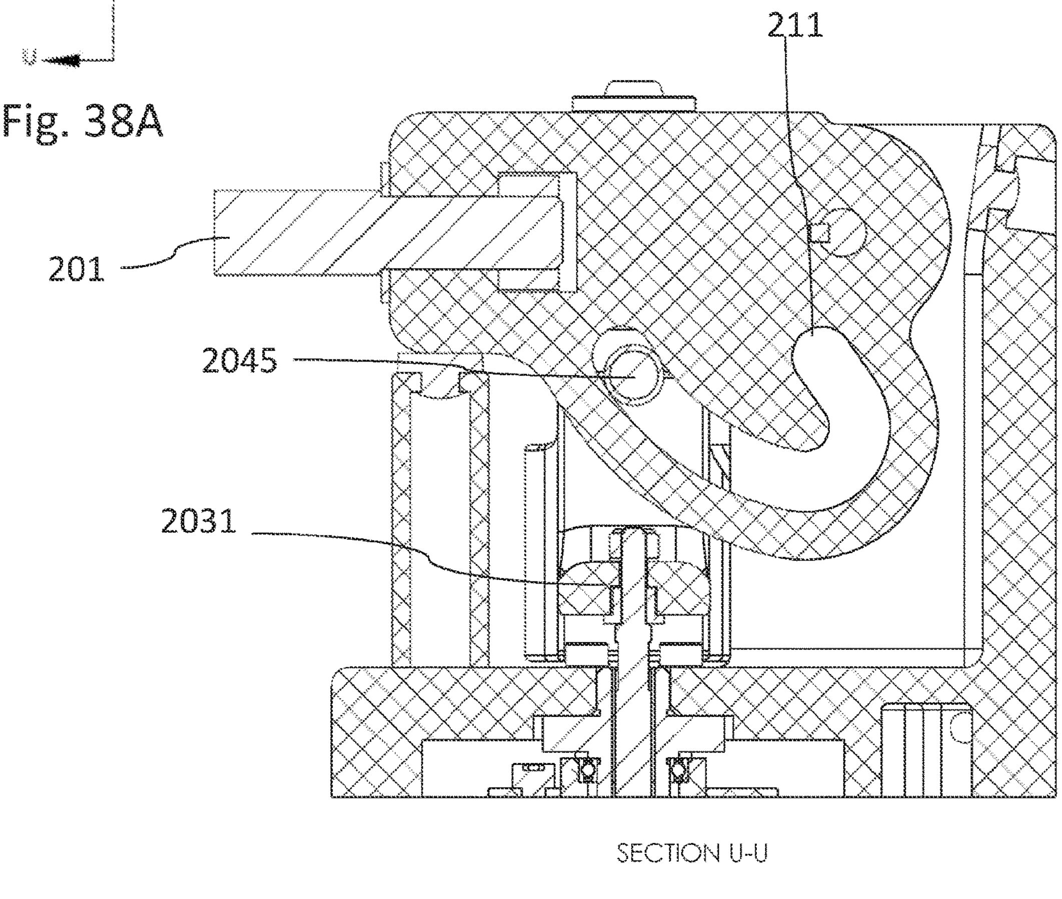
FIG. 38B is a side cross-section view of the gearbox assembly taken along section U-U of FIG. 38A.

FIG. 37A is a view of the gearbox assembly 204 with the handle 201 in the up position. FIG. 37B is a side cross-section view of the gearbox assembly 204 taken along section T-T of FIG. 37A. As the handle 201 is pulled down, a roller 2045 slides in the cam slot 211. The first part of the motion causes a downward motion of a plunger block 2031 of the plunger carriage 203, then the cam slot 211 is concentric with the pivot, so the blade assembly 205 keeps rotating without any more downward motion. FIG. 38A is a front view of the gearbox assembly 204 with the handle 201 in the down position. FIG. 38B is a side cross-section view of the gearbox assembly 204 taken along section U-U of FIG. 38A. As shown, when the handle 201 is at horizontal, the roller 2045 has travelled its full distance in the cam slot 211.

Figure 39:
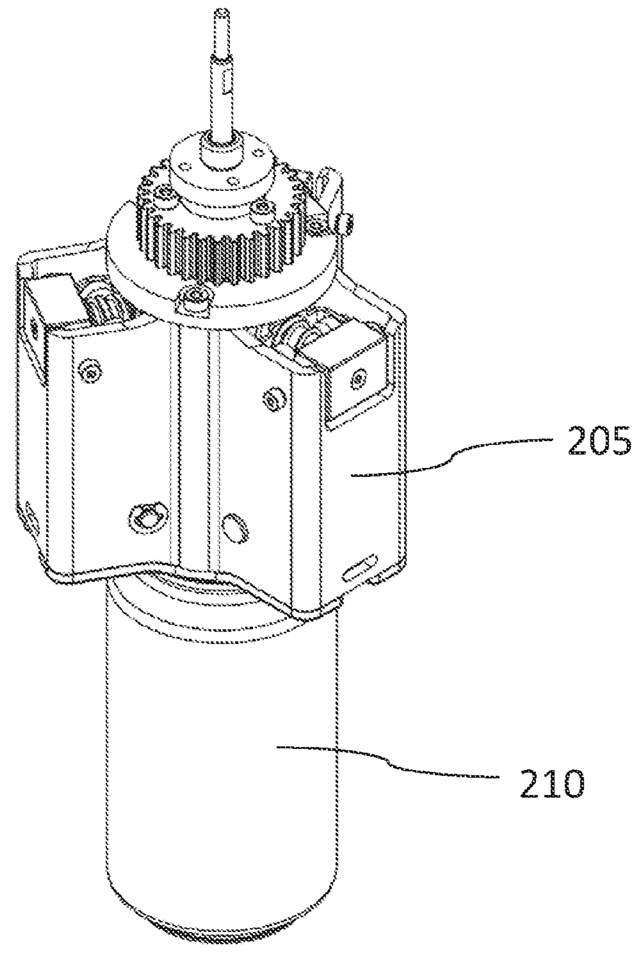
FIG. 39 is a perspective view of a blade assembly with a can.
Figure 40:
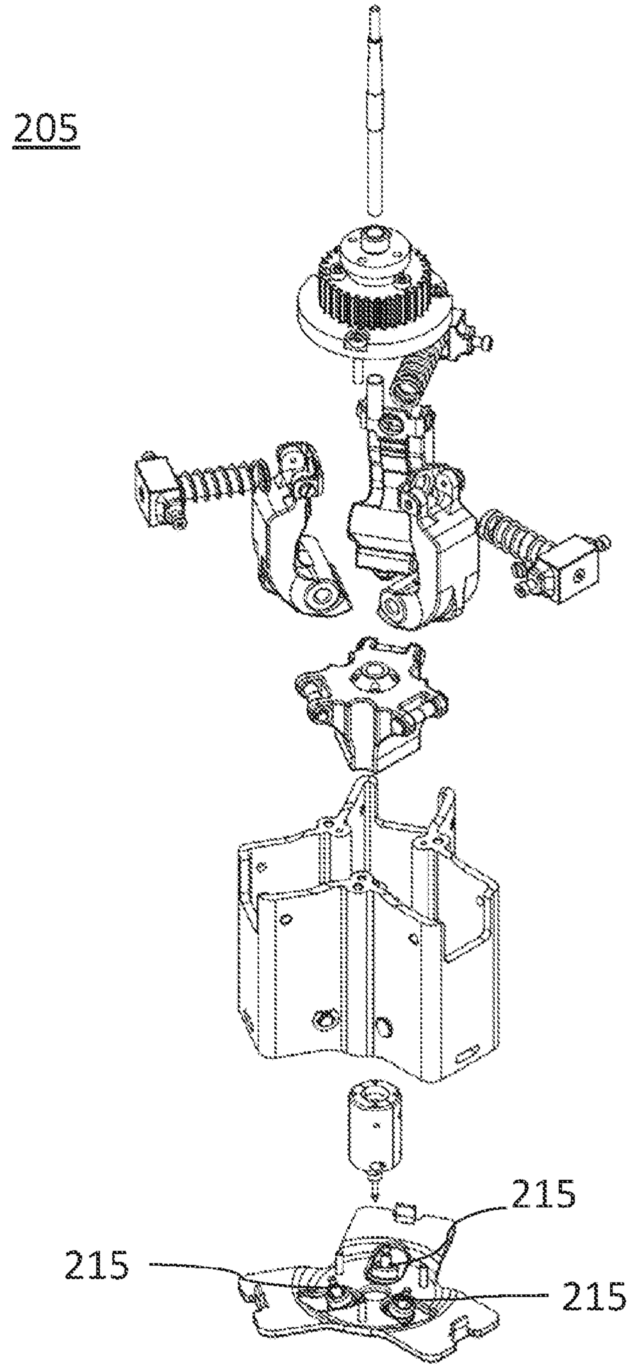
FIG. 40 is an exploded view of a blade assembly

FIG. 39 is a perspective view of the blade assembly 205 with a can 210. FIG. 40 is an exploded view of the blade assembly 205 showing that three blades 215 rotate out to make contact with the can 210 and cut the lid off.

Figure 41A:
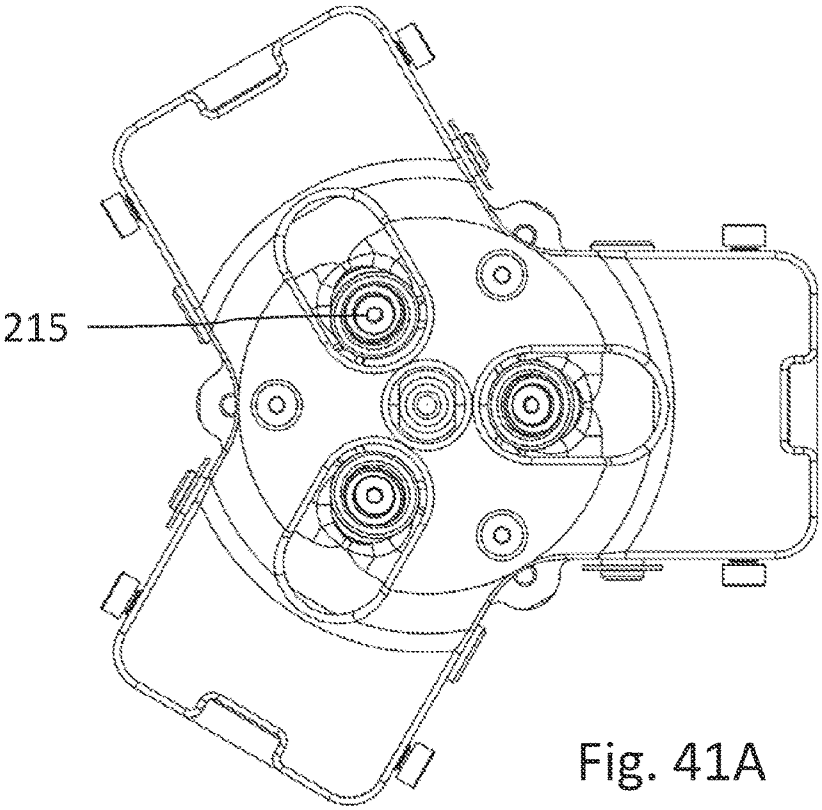
FIG. 41A and FIG. 41B are underside views showing blades in different positions.
Figure 41B:
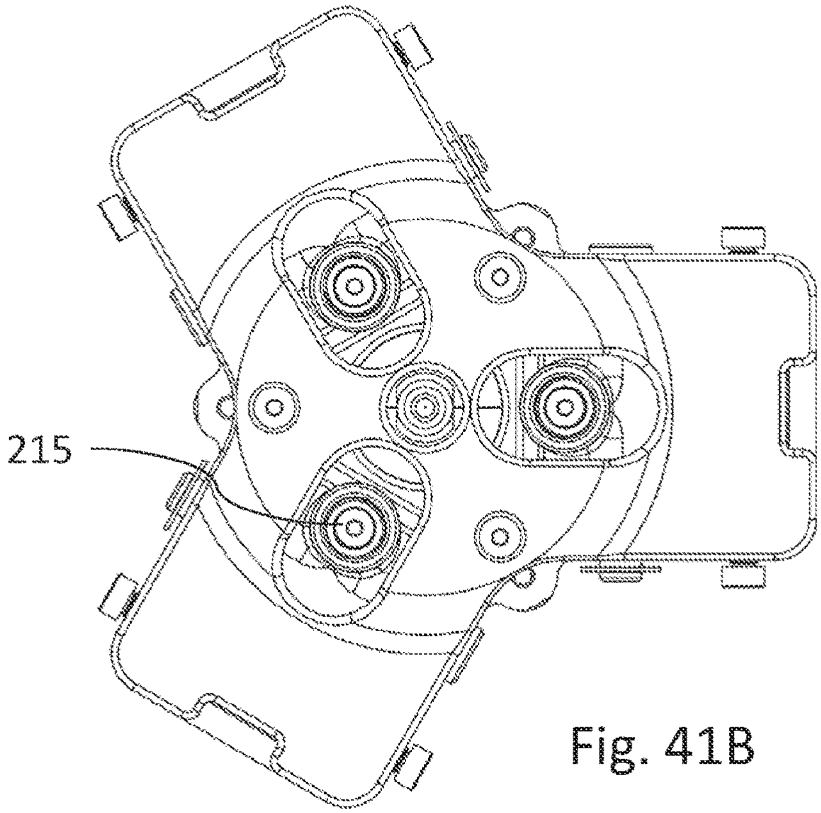

FIGS. 41A and 41B are underside views showing the blades 215 in different positions. When the handle 201 is in the up position, the blades 215 are retracted and inboard as shown in FIG. 41A. As the handle 201 is pulled, the blades 215 travel radially outwards (see FIG. 41B) to contact the can 210. The retracted blades 215 provide enough space that the can 210 can be inserted into the clamp assembly 207 before the blades 215 move outwardly and cut into the sidewall of the can 210.

Figure 42A:
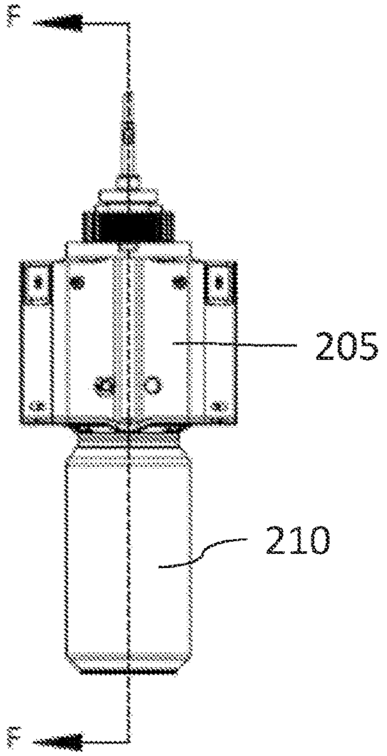
FIG. 42A is a side view of a blade assembly with a can below.
Figure 42B:
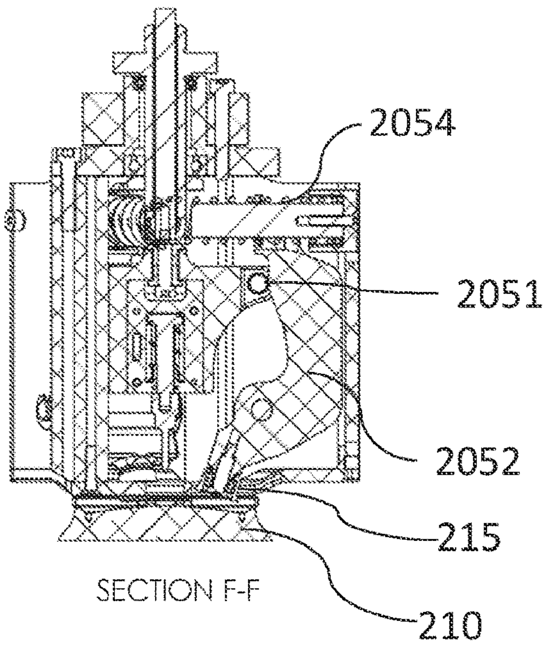
FIG. 42B is a cross-section view taken along section F-F of FIG. 42A.
Figure 42C:
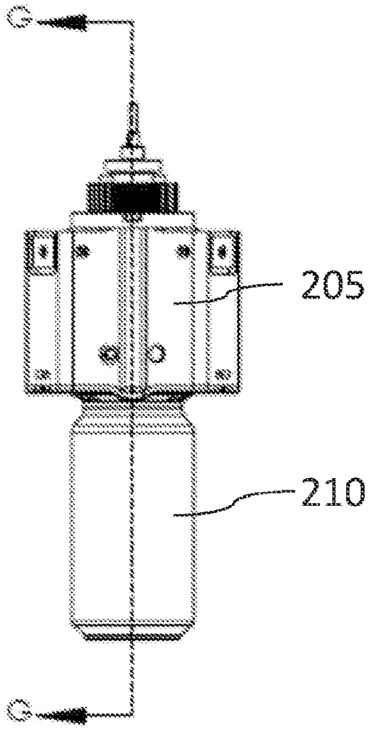
FIG. 42C is a side view of a blade assembly with a can below.
Figure 42D:
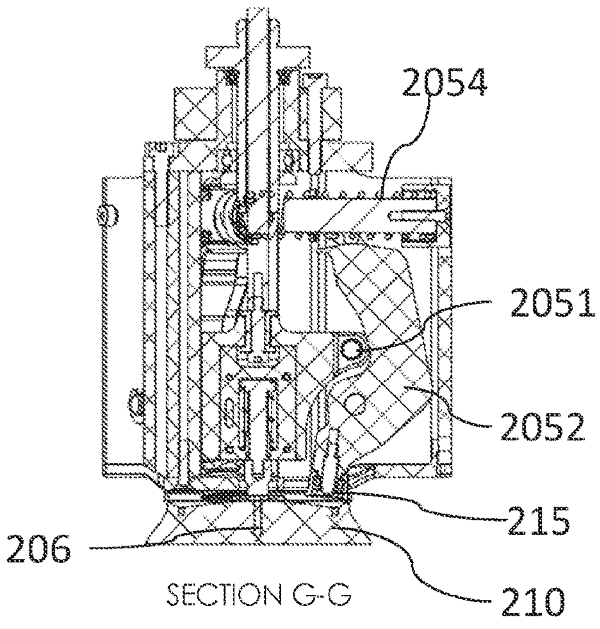
FIG. 42D is a cross-section view taken along section G-G of FIG. 42C.
Figure 42E:
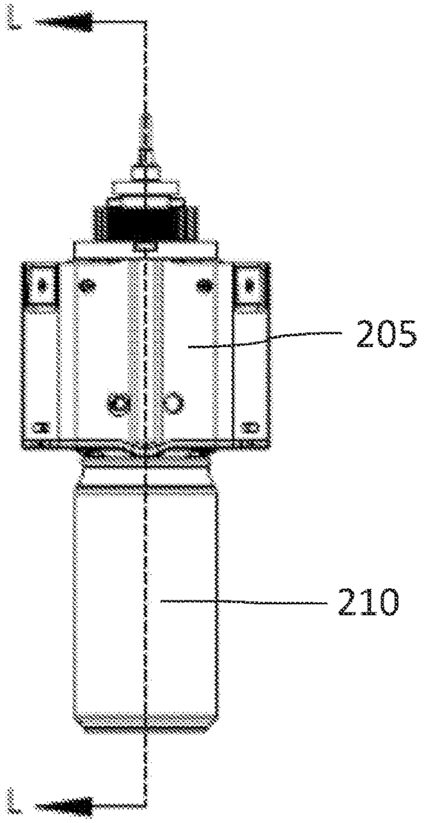
FIG. 42E is a side view of a blade assembly with a can below.
Figure 42F:
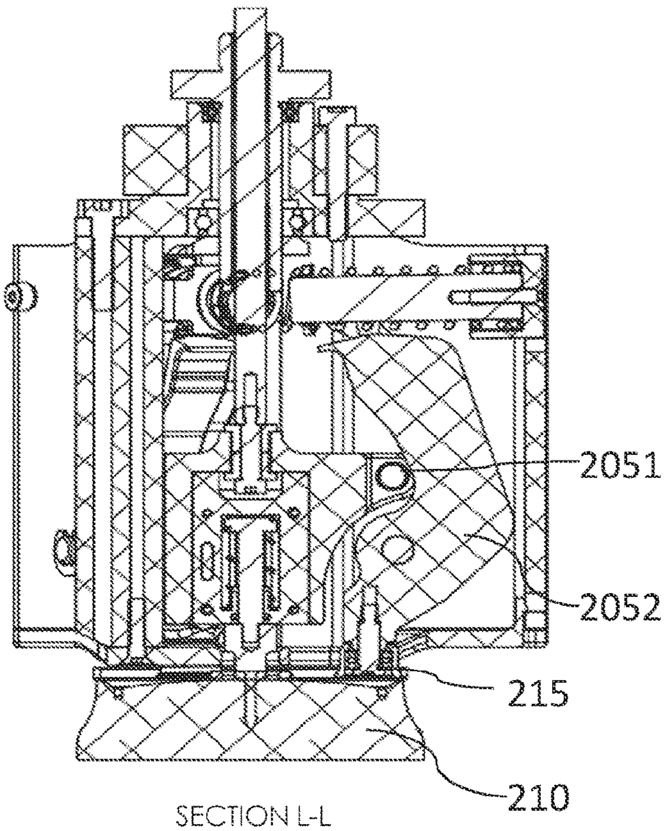
FIG. 42F is a cross-section view taken along section L-L of FIG. 42E.

FIGS. 42A-42F are used to show a cycle operation of one representative blade 215. All blades 215 operate in the same manner. FIGS. 42A, 42C, and 42E are side views of the blade assembly 205 with a can 210 below. FIG. 42B, taken along section F-F of FIG. 42A shows that a blade roller 2051 starts in a detent of a cam surface of a blade cam 2052, as the handle 201 is pulled down the blade roller 2051 rolls down the cam surface of the blade arm 2052 until the blade 215 makes contact with the can 210. FIG. 42D, taken along section G-G of FIG. 42C shows that the blade 215 is forced outwards by a blade spring 2054, so when the blade 215 touches the can 210, the blade roller 2051 leaves the surface of the blade arm 2052 and can continue traveling downwards. The blade spring 2054 provides enough force for the blade 215 to penetrate the can 210 and cut off the lid of the can 210 as the blade assembly 205 rotates. Forcing the blade 215 outward helps to minimize any exposed sharp edges on the can 210 after the lid is cut off. FIG. 42F, taken along section L-L of FIG. 42E shows that by allowing the blade roller 2051 to leave the surface of the blade cam 2052, the blades 215 can cut different diameter cans 210. The blades 215 will rotate further outwards before reaching the inner diameter (ID) of a larger can 210). Note, that there are three sets of blades 215 that simultaneously follow the sequence described above. FIG. 42D includes a can 210 with a smaller diameter can rim than that shown in FIG. 42F. These figures show that container opener 200 can cut different diameters of cans. The blade 215 travels out to different positions for the different can sizes, but the blade roller 2051 travels to the same location.

Figure 43:
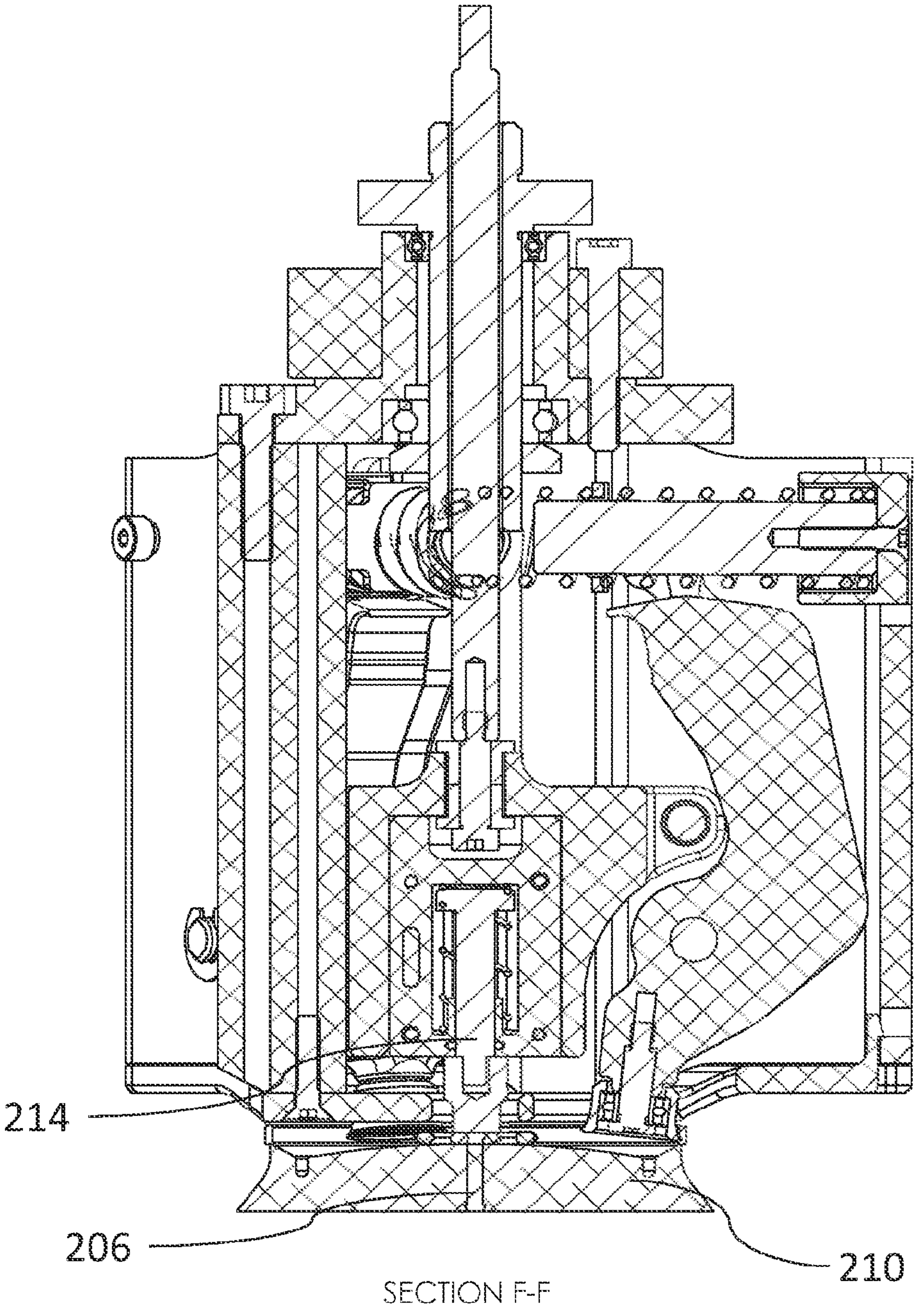
FIG. 43 is a magnified version of the section shown in FIG. 42B.

FIG. 43 is a magnified version of the section shown in FIG. 42B. FIG. 43 shows that the downward motion of the plunger shaft 214 of the plunger carriage 203 also extends the barb 206 towards the can 210 to puncture in the small circle in the middle of the tab on the lid of the can 210. Because the blade roller 2051 can separate from the surface of the blade cam 2052, the plunger shaft 214 and barb 206 can extend a set distance no matter the diameter of the can 210.

Figure 44:
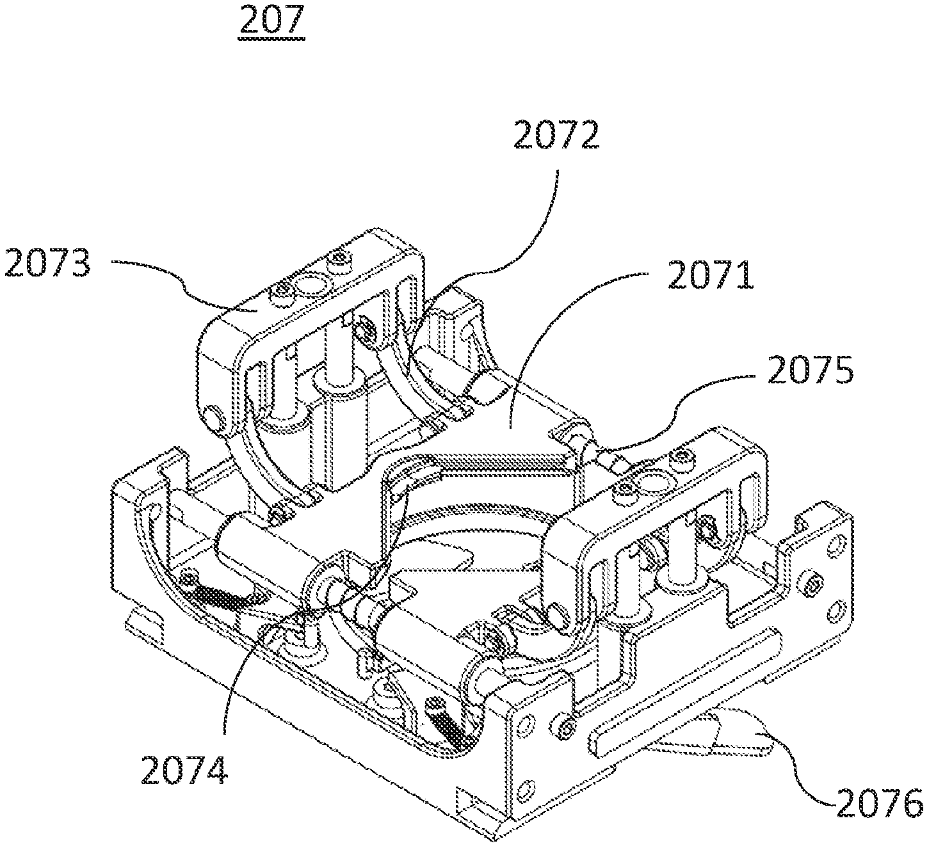
FIG. 44 is a top perspective view of a clamp assembly.
Figure 45A:
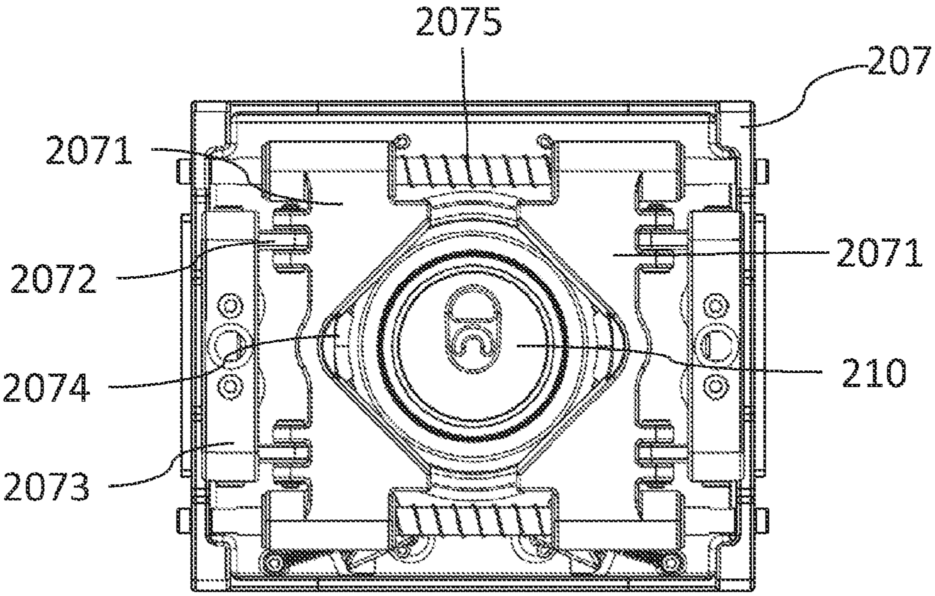
FIG. 45A and FIG. 45B are top views of a clamp assembly with a can.
Figure 45B:
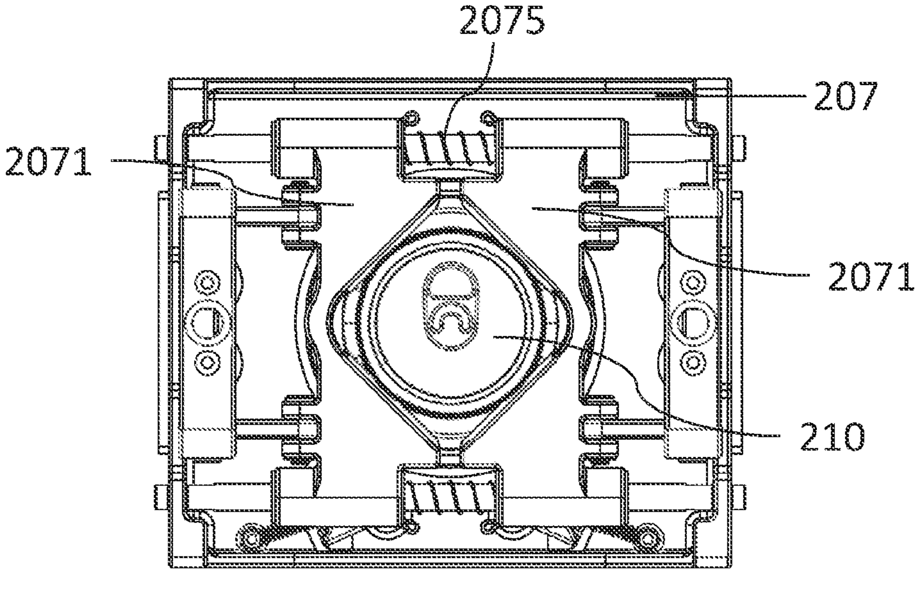
Figure 46:
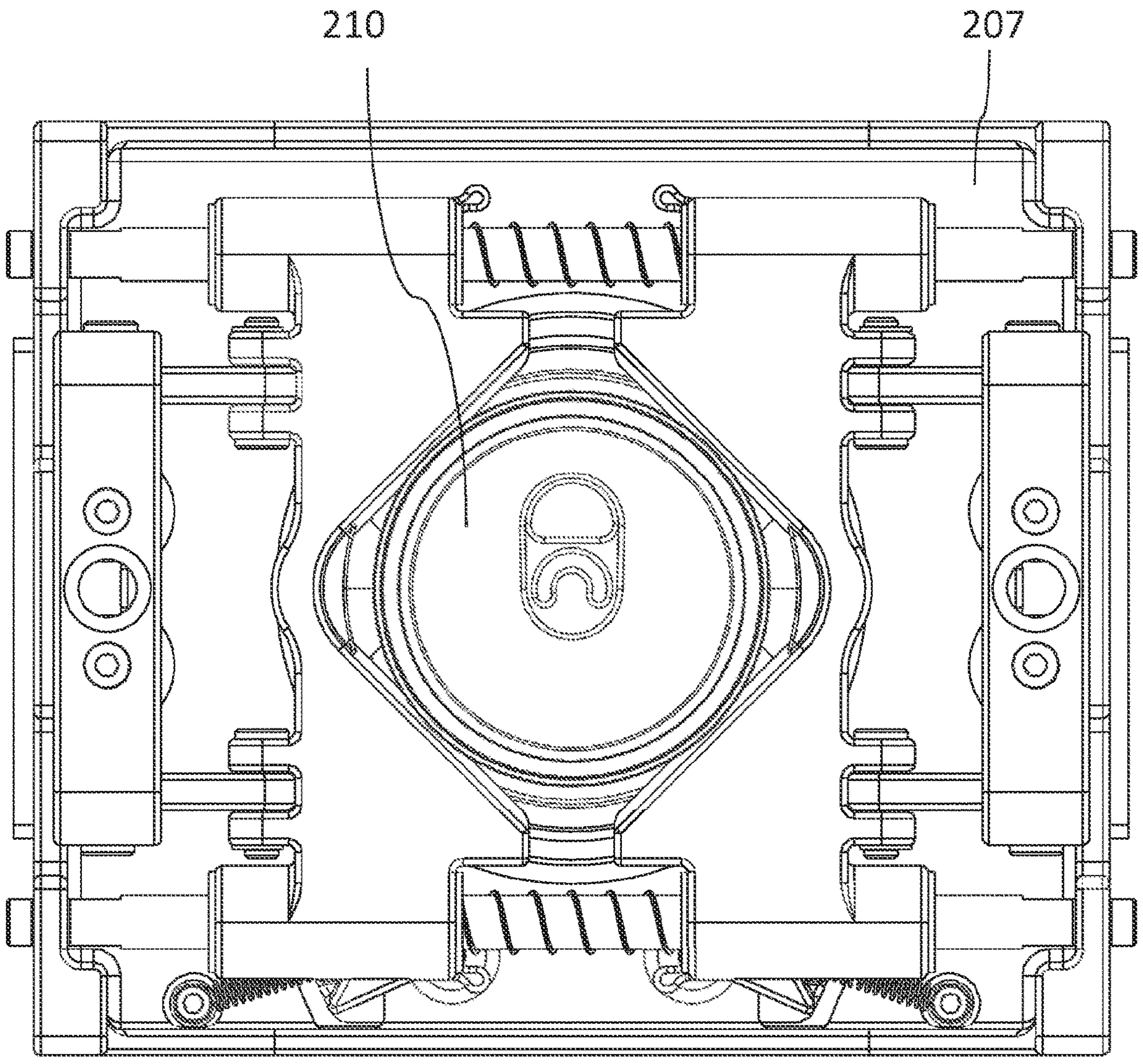
FIG. 46 is a top view of a clamp assembly with a can.

FIGS. 44-46 are used to describe the clamp assembly 207. FIG. 44 is a top perspective view of the clamp assembly 207. FIG. 44 shows that the clamp assembly 207 can include a clamp 2071, a link 2072, a link attachment block 2073, a urethane block 2074, a clamp spring 2075, and a lid flap 2076. Two clamps 2071 are shown. In operation, the clamps 2071 start forced outwards by the clamp spring 2075 (see FIG. 45A), then, after a can 210 is inserted and when the handle 201 is pulled downward, the vertical motion of the plunger shaft 214 causes the link attachment blocks 2073 to move downward. This drives the links 2072 down, which causes the clamps 2071 to move inward to clamp the can 210 (see FIG. 45B). The clamps 2071 have a V-shape to be able to clamp and center a variety of can diameters. This is important so that the center of the can 210 is always in the same location within the container opener 200 regardless of its diameter. The urethane blocks 2074 on the inside of the clamps 2071 provide additional friction to prevent the can 210 from rotating when the blade assembly 205 is cutting the can 210. FIG. 46 shows the clamp assembly 207 clamping a larger diameter can 210.

Figure 47A:
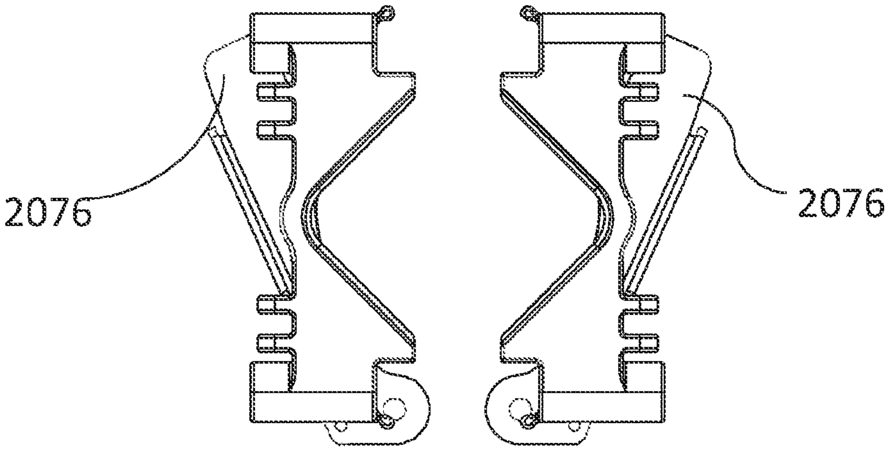
FIG. 47A and FIG. 47B are top views of clamps.
Figure 47B:
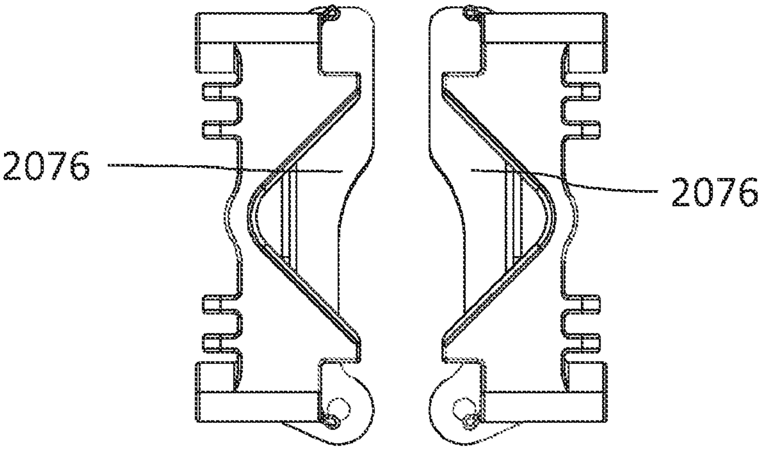

FIGS. 47A and 47B show the lid flaps 2076 as a portion of the clamp assembly 207. The lid flaps 2076 are located on a lower portion of the clamp assembly 207 and are angled to direct a cutoff lid to slide in a different direction. During the reject (upward) stroke of the handle 201, the can 210 has already been removed (without its lid), but the lid is still stuck on the barb 206. When the handle 201 travels back up for the reject, the lid flaps 2076 close, so when the barb 206 is pulled through the lid, the lid hits the closed lid flaps 2076 and slides into a collection bin at the rear of the container opener 200. Before the reject, the lid flaps 2076 are open (see FIG. 47A) so that the can 210 is able to be removed. During the reject, the lid flaps 2076 close (see FIG. 47B) so the lid will slide back to the collection bin. This operation is shown in greater detail with respect to FIGS. 48-51.

Figure 48A:
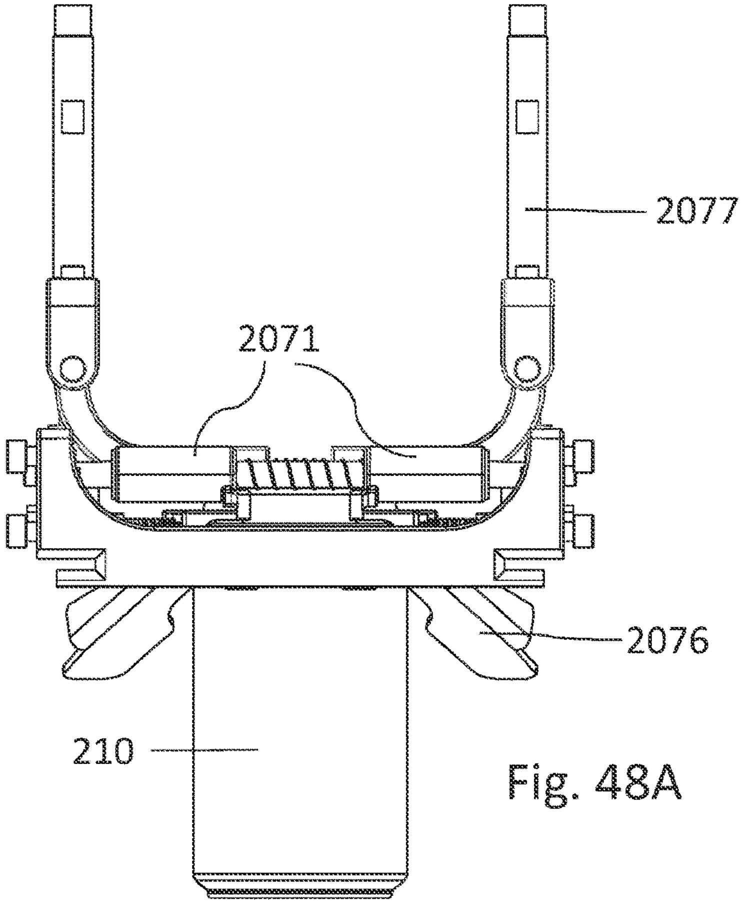
FIG. 48A is a side view showing clamps open for loading a can.
Figure 48B:
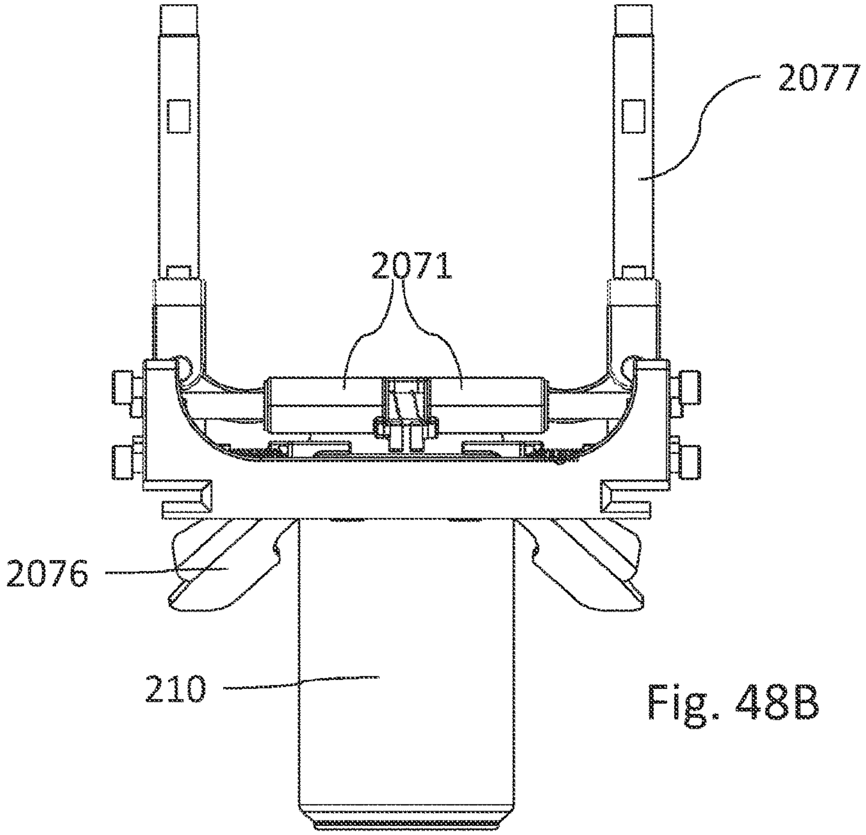
FIG. 48B is a side view showing clamps closed securing a can.

FIG. 48A is a side view showing the clamps 2071 open for loading the can 210. FIG. 48B is a side view showing the clamps 2071 closed securing the can 210. Vertical shafts 2077 are driven down by the plunger block to provide motion to close the clamps 2071.

Figure 49A:
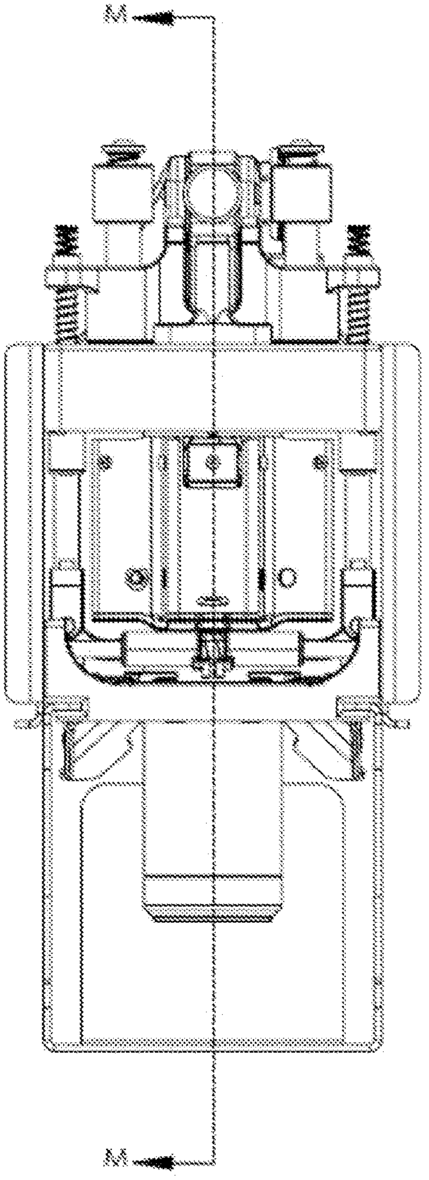
FIG. 49A is a front view of a container opener with the handle in the down position.
Figure 49B:
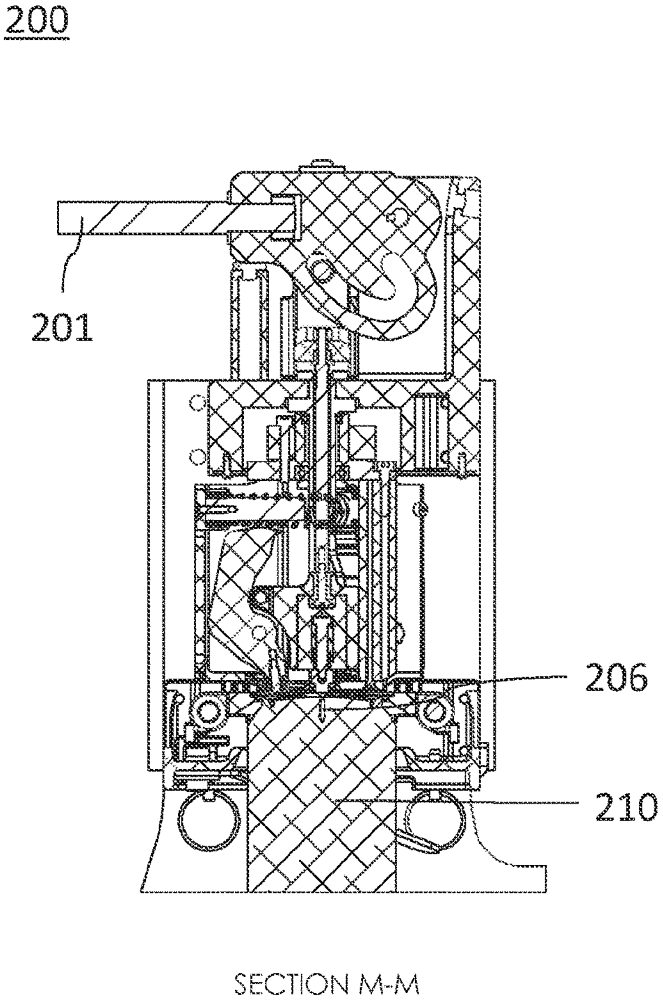
FIG. 49B is a cross-section view taken along section M-M of FIG. 49A.

FIG. 49A is a front view of the container opener 200 with the handle 201 in the down position. FIG. 49B is taken along section M-M of FIG. 49A. With the handle 201 in the up position, the barb 206 begins above the top of the can 210, and during the down stroke, the barb 206 punctures the lid of the can 210. After the can 210 is cut, the lid stays on the barb 206 and gets pulled out of the can 210. After the can 210 is removed, the lid is rejected from the barb 206 during the reject (upward) stroke of the handle 201.

Figure 50A:
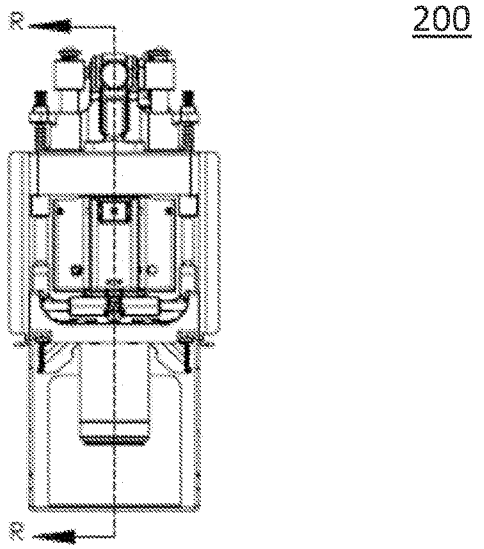
FIG. 50A is a front view of a container opener with the handle in the down position.
Figure 50C:
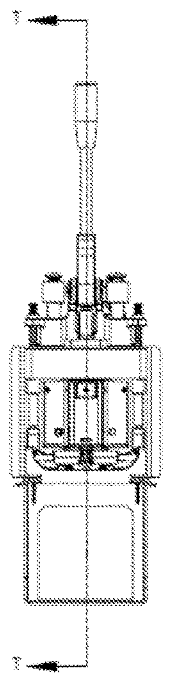
FIG. 50C is a front view of a container opener with the handle in the up position.
Figure 50B:
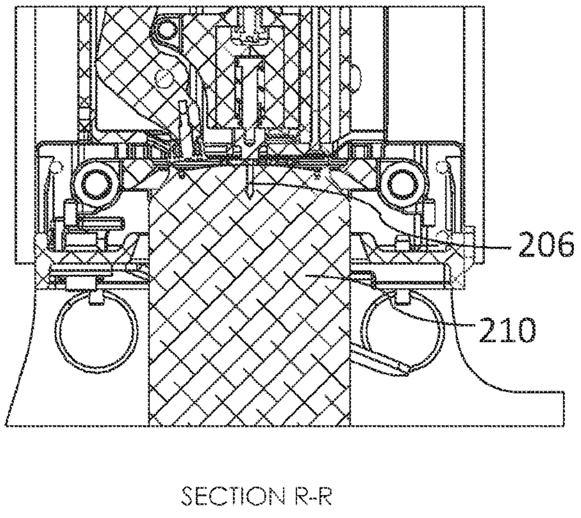
FIG. 50B is a cross-section view taken along section R-R of FIG. 50A.
Figure 50D:
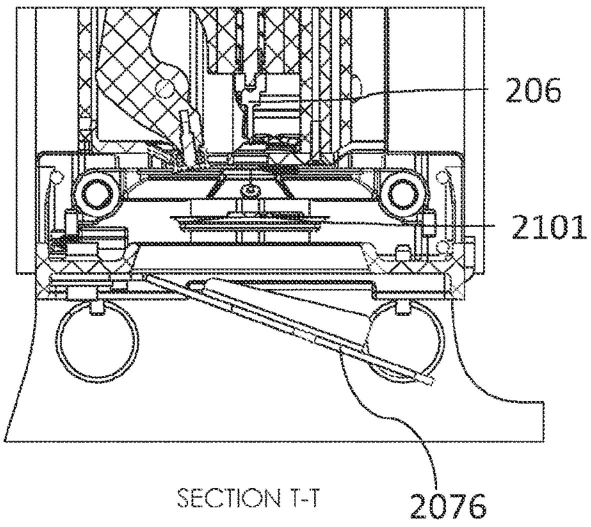
FIG. 50D is a cross-section view taken along section T-T of FIG. 50C.
Figure 51A:
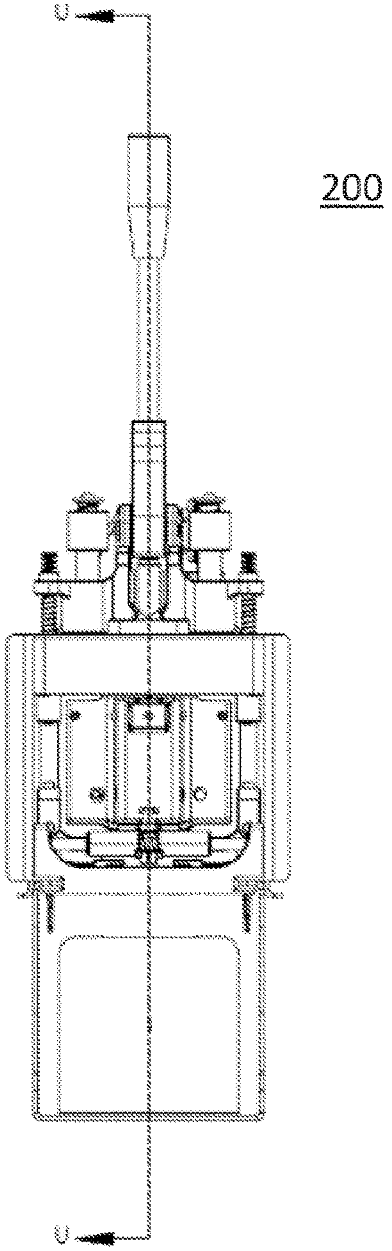
FIG. 51A is a front view of a container opener with the handle in the up position.
Figure 51B:
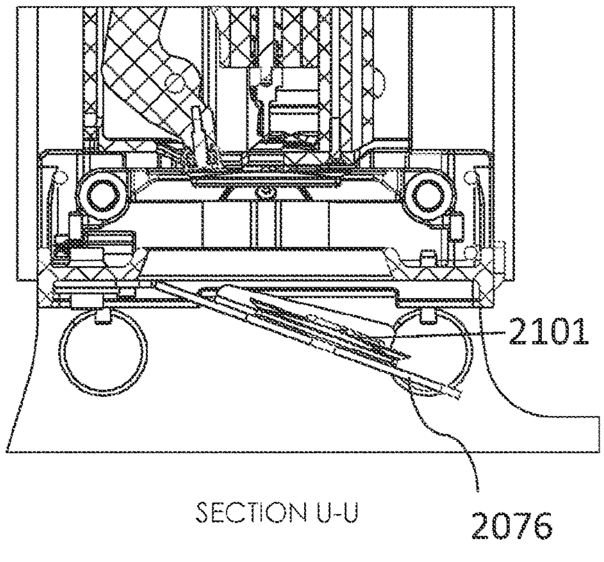
FIG. 51B is a cross-section view taken along section U-U of FIG. 51A.

FIG. 50B, taken along section R-R of FIG. 50A of the container opener 200 with the handle 201 in the down position, shows the barb 206 inside of the can 210. FIG. 50D, taken along section T-T of FIG. 50C with the handle 201 in the up position, shows that the barb 206 has retracted and the lid 2101 is falling onto closed lid flaps 2076. FIG. 51B, taken along section U-U of FIG. 51A shows that the lid 2101 has hit the lid flaps 2076 and is sliding toward the back of the container opener 200 to be collected.

Figure 52:
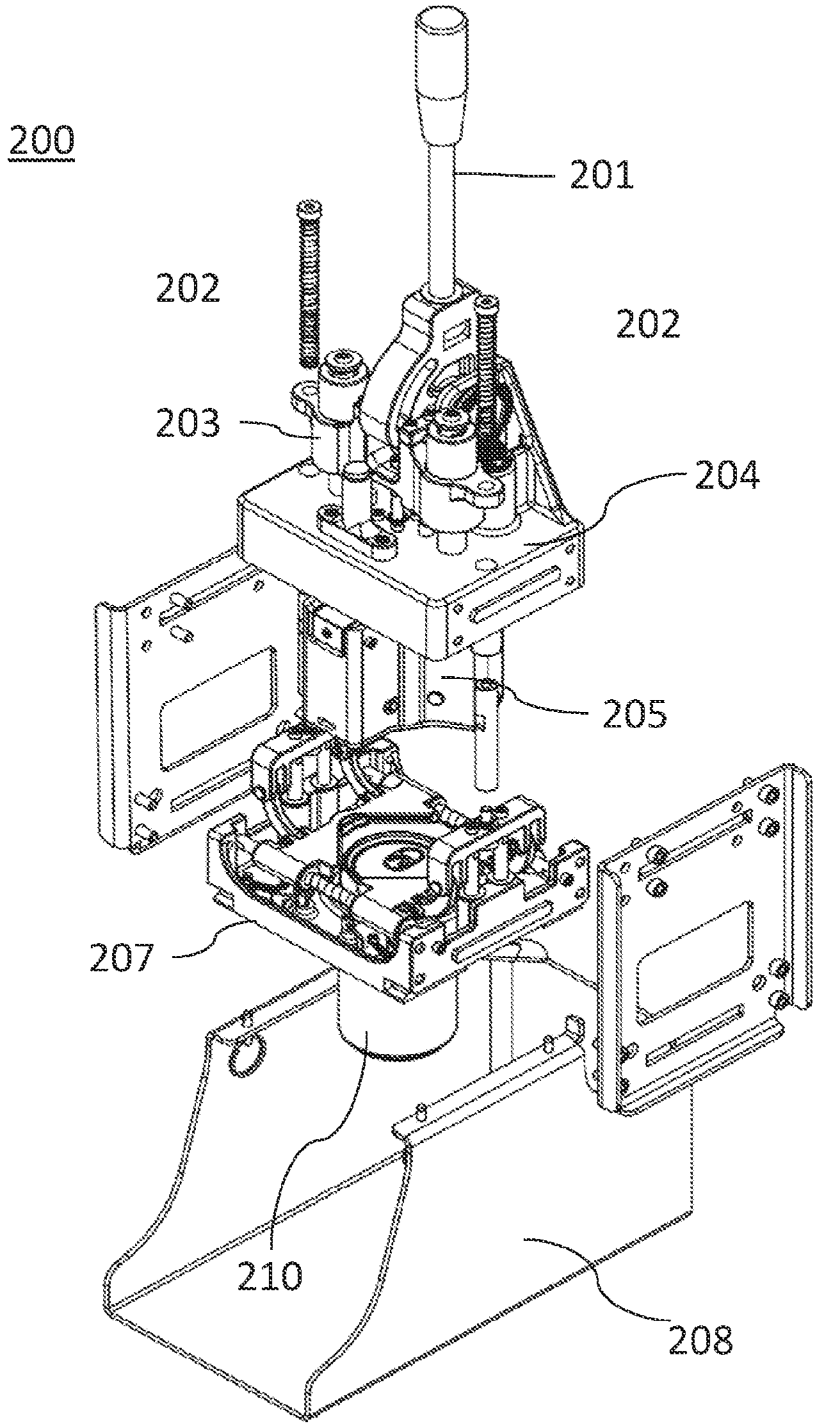
FIG. 52 is an exploded view of the container opener according to the second embodiment of the disclosure.

FIG. 52 is an exploded view of the container opener 200 according to the second embodiment of the disclosure showing the handle 201, the clamp shafts 202, the plunger carriage 203, the gear assembly 204, the blade assembly 205, the clamp assembly 207, and the base 208 along with a can 210.

Figure 53:
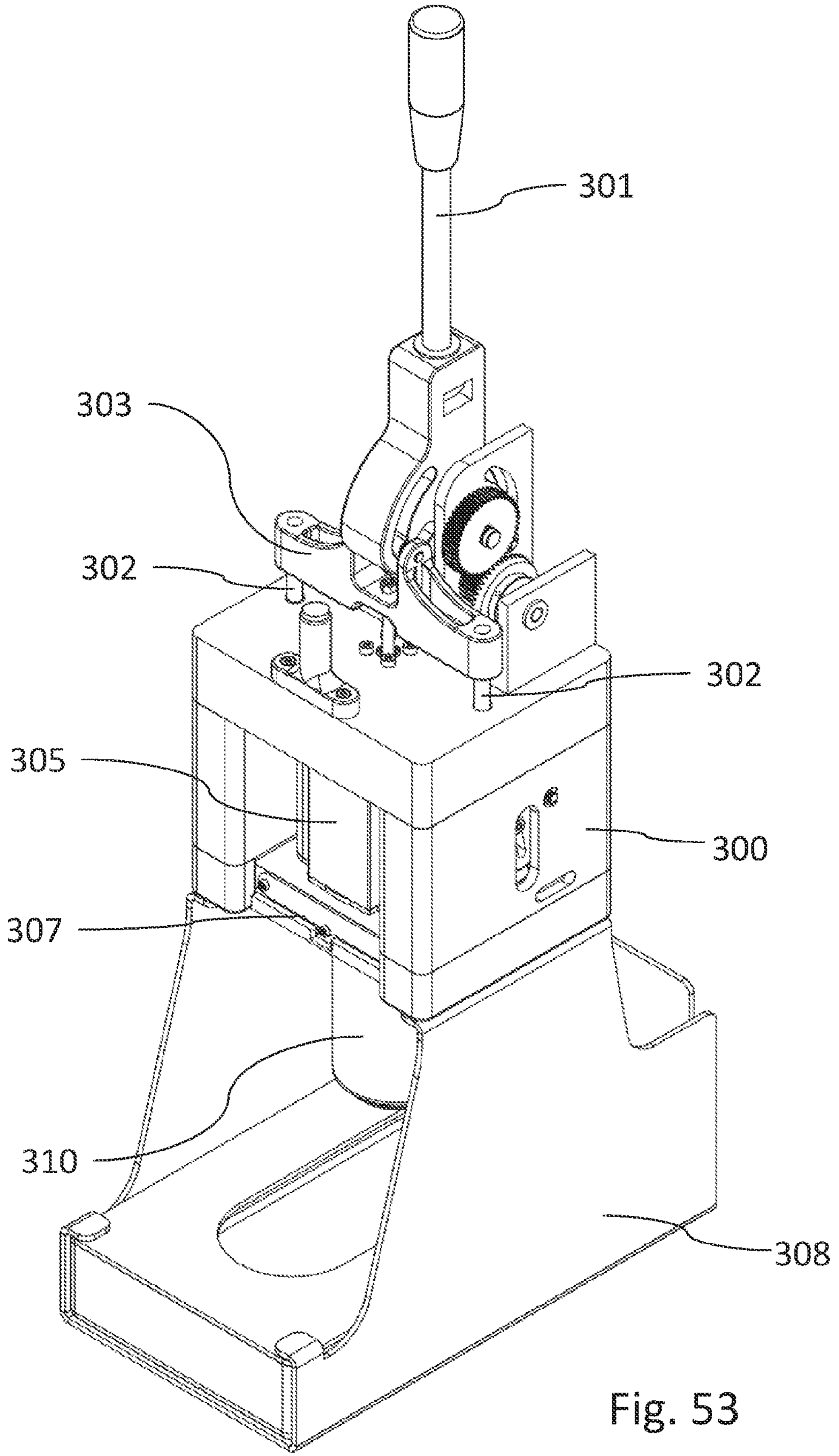
FIG. 53 is a top perspective view of a container opener according to a third embodiment of the present disclosure.

FIGS. 53-86 are used to describe a container opener 300 of a third embodiment of the present disclosure. FIG. 53 shows the container opener 300 can include a handle 301, a plunger carriage 303, clamp shafts 302, a blade assembly 305, a clamp assembly 307, and a stand 308. A can 310 is also shown. In an operation sequence, as the handle 301 is pulled down, the plunger carriage 303 lowers, driving the clamp shafts 302 downward. The clamp shafts 302 actuate to clamp and secure the can 310, a barb 306 punctures a lid of the can 310, a blade 315 punctures the can 310, and the blade assembly 305 spins at least 360 degrees to cut the top off the can 310. This sequence is then reversed when the handle 301 is lifted.

Figure 54:
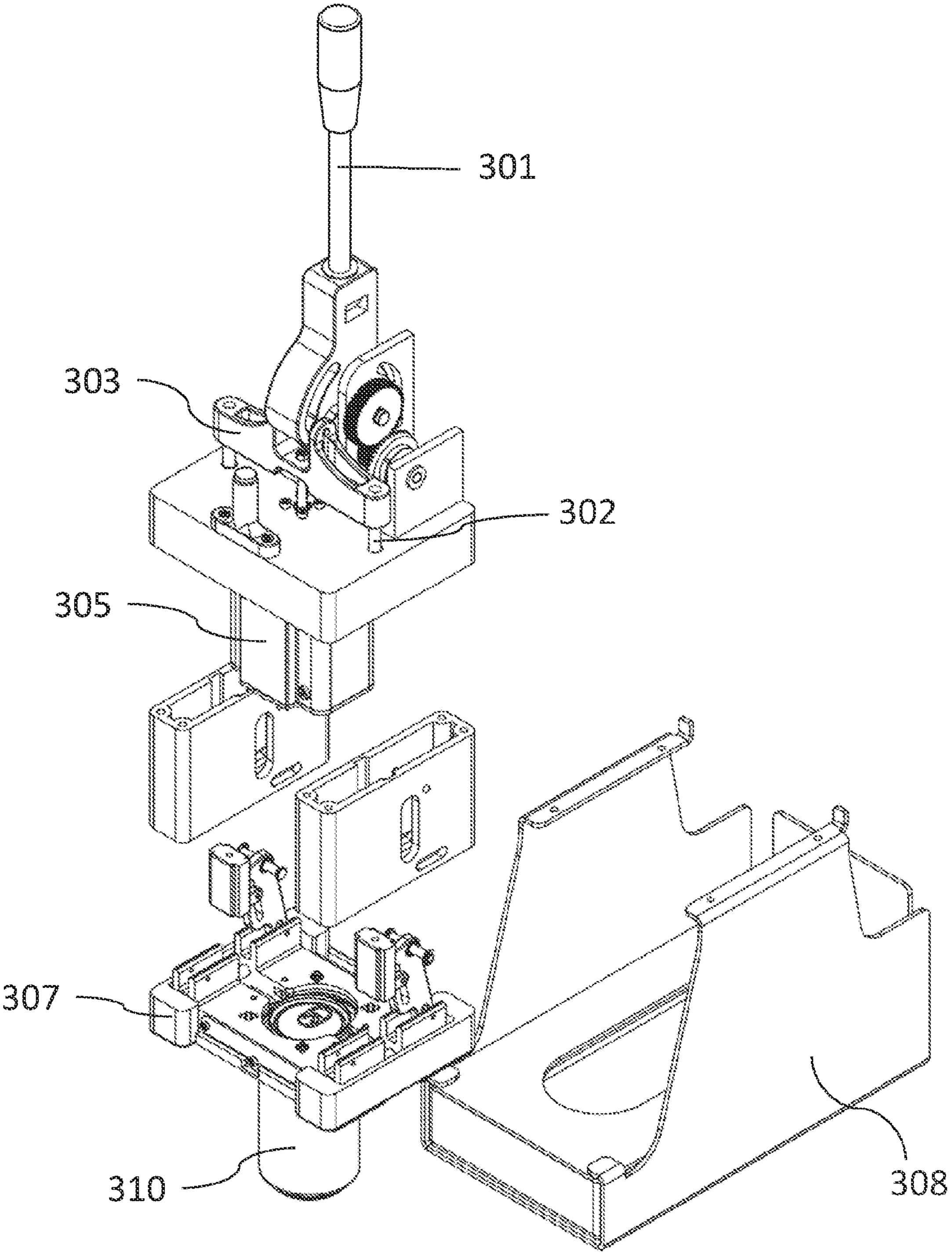
FIG. 54 is a perspective exploded view of the container opener of FIG. 53.

FIG. 54 is a perspective exploded view of the container opener 300 of FIG. 53. The container opener 300 can be mounted on a table/bar top, on the floor, or on the wall. The stand 308 shown allows for the container opener 300 to sit on a bar top. The container opener 300 has a universal mounting method for any type of base or stand needed.

Figure 55:
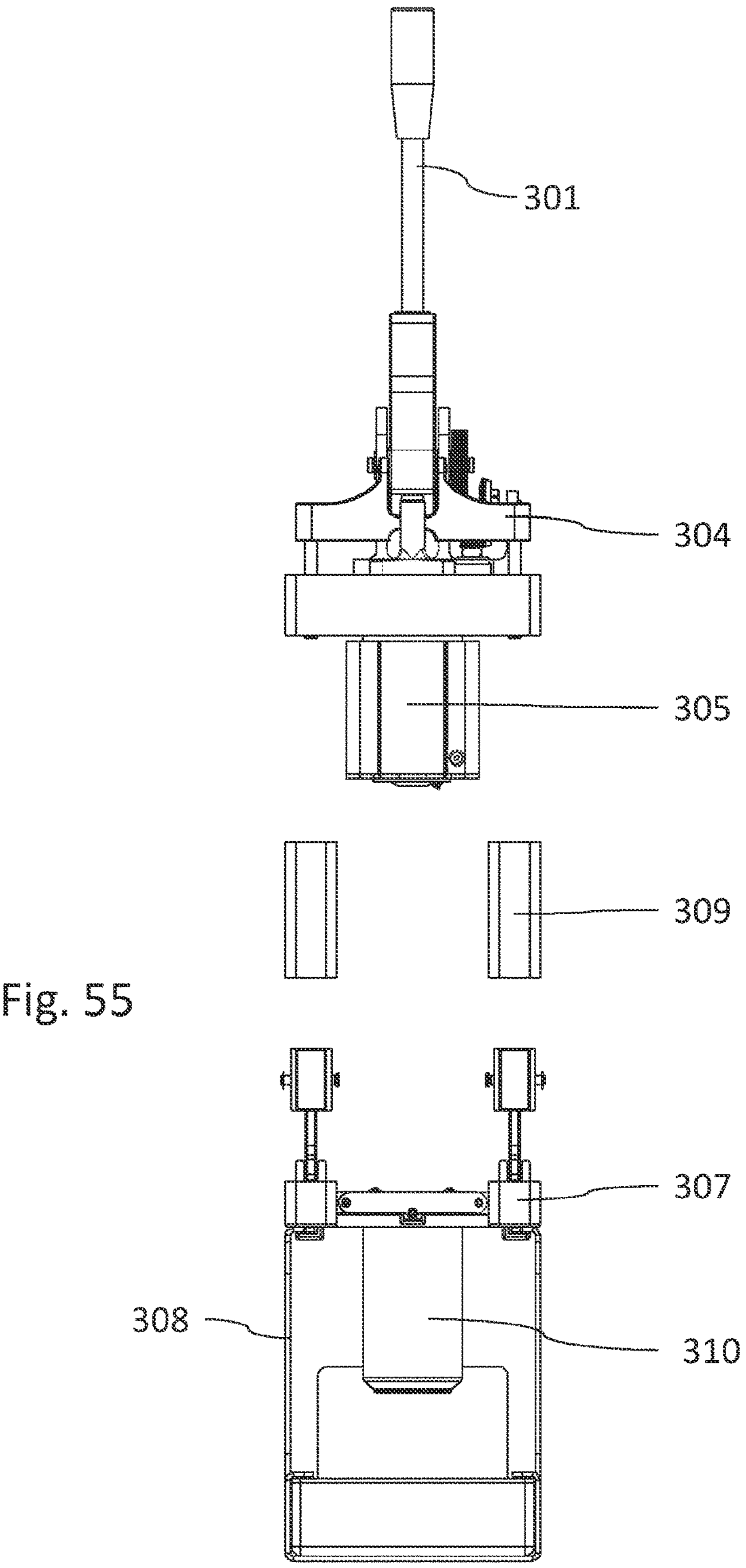
FIG. 55 is a front exploded view of a container opener.

FIG. 55 is a front exploded view of the container opener 300 including a gearbox assembly 304, a blade assembly 305, sidewall extrusions 309, and a clamp assembly 307. A clamped can 310 is also shown.

Figure 56:
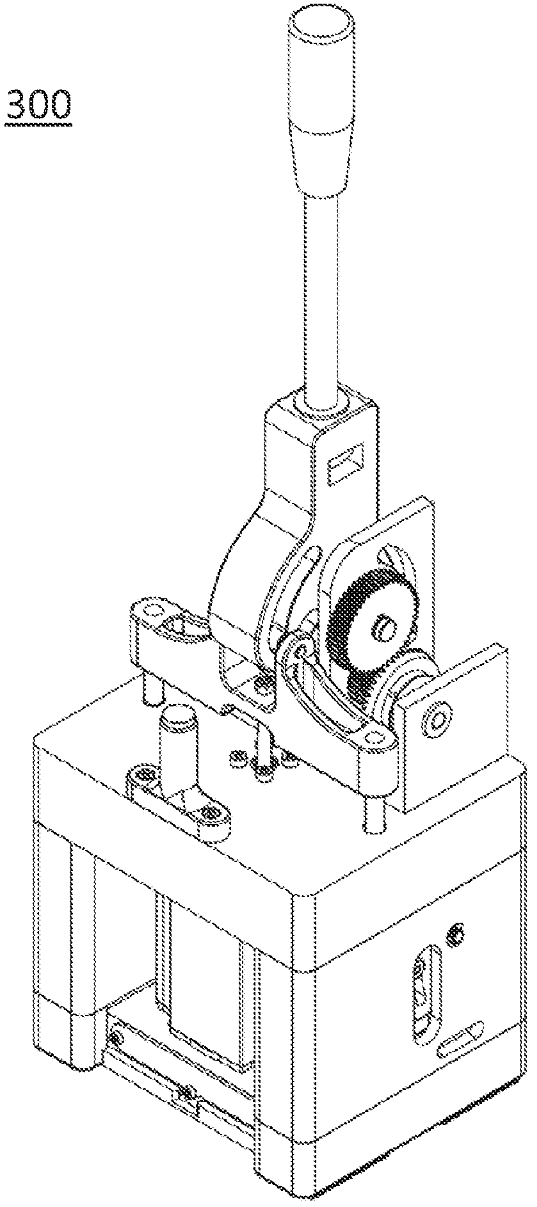
FIG. 56 is a perspective view of a container opener without a stand.
Figure 57:
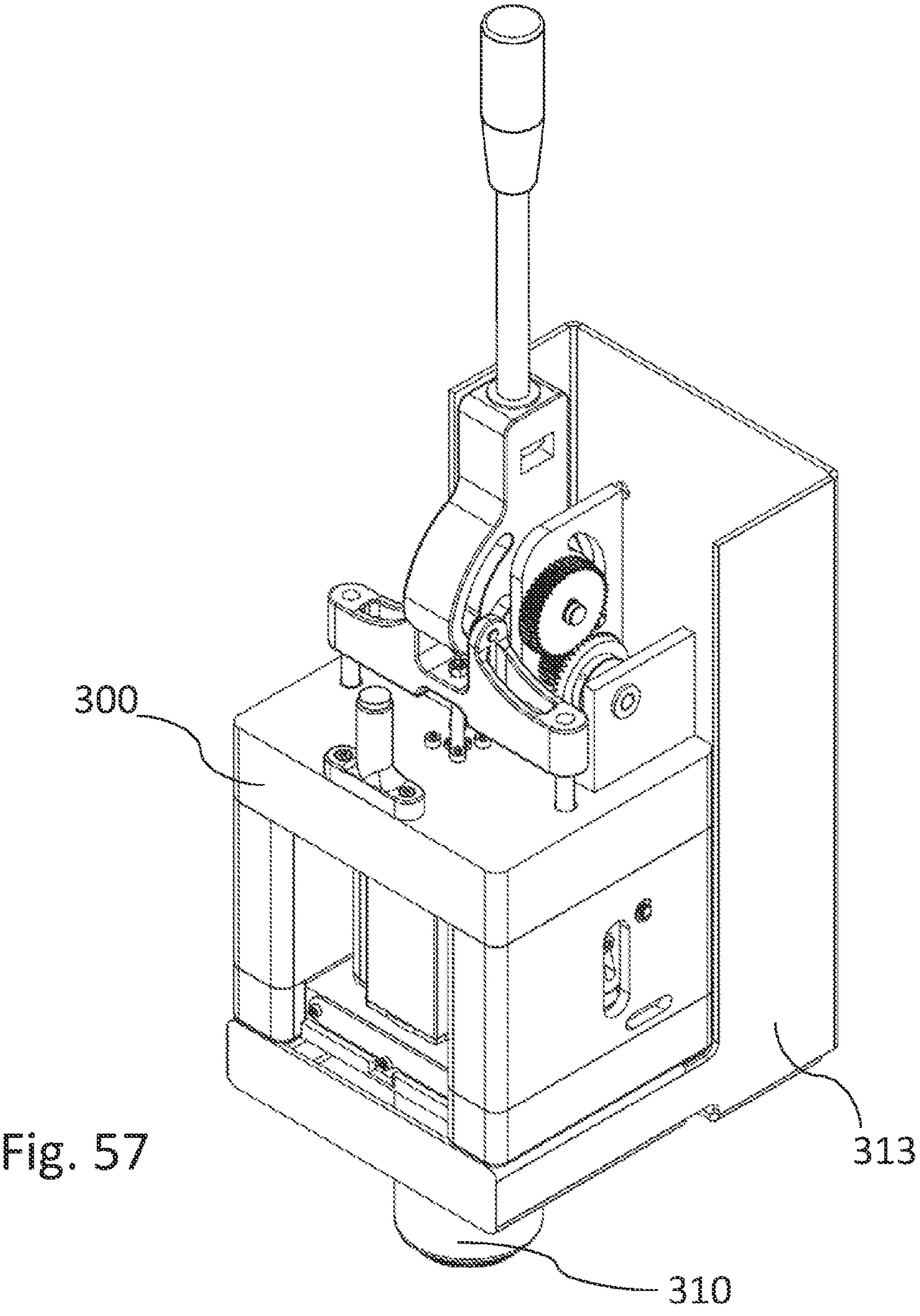
FIG. 57 is a perspective view of a container opener including a wall stand.
Figure 58:
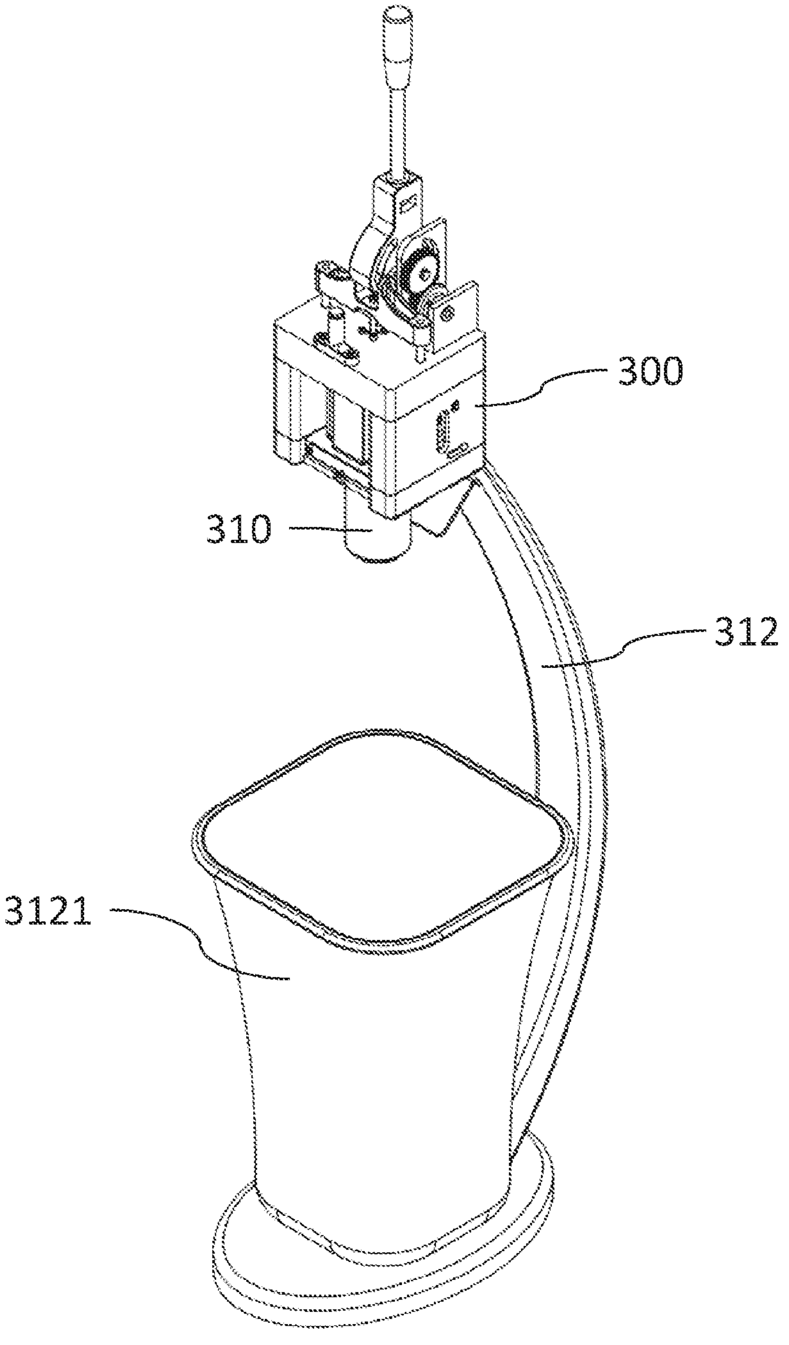
FIG. 58 is a perspective view of a container opener in a floor stand.

FIG. 56 is a perspective view of the container opener 300 without the stand 308. FIG. 57 is a perspective view of the container opener 300 including a wall stand 313 for mounting the container opener 311 to a wall. As mentioned, the container opener 300 can be mounted in a variety of ways. The same mounting features are used on the container opener 300 so it can be mounted to different stands or using different methods to permit the container opener 300 to be easily switched between mounting techniques. FIG. 58 is a perspective view of the container opener 300 in a floor stand 312. A bin 3121 can be placed under the container opener 300 to collect the lids as they are removed from the cans 310.

Figure 59:
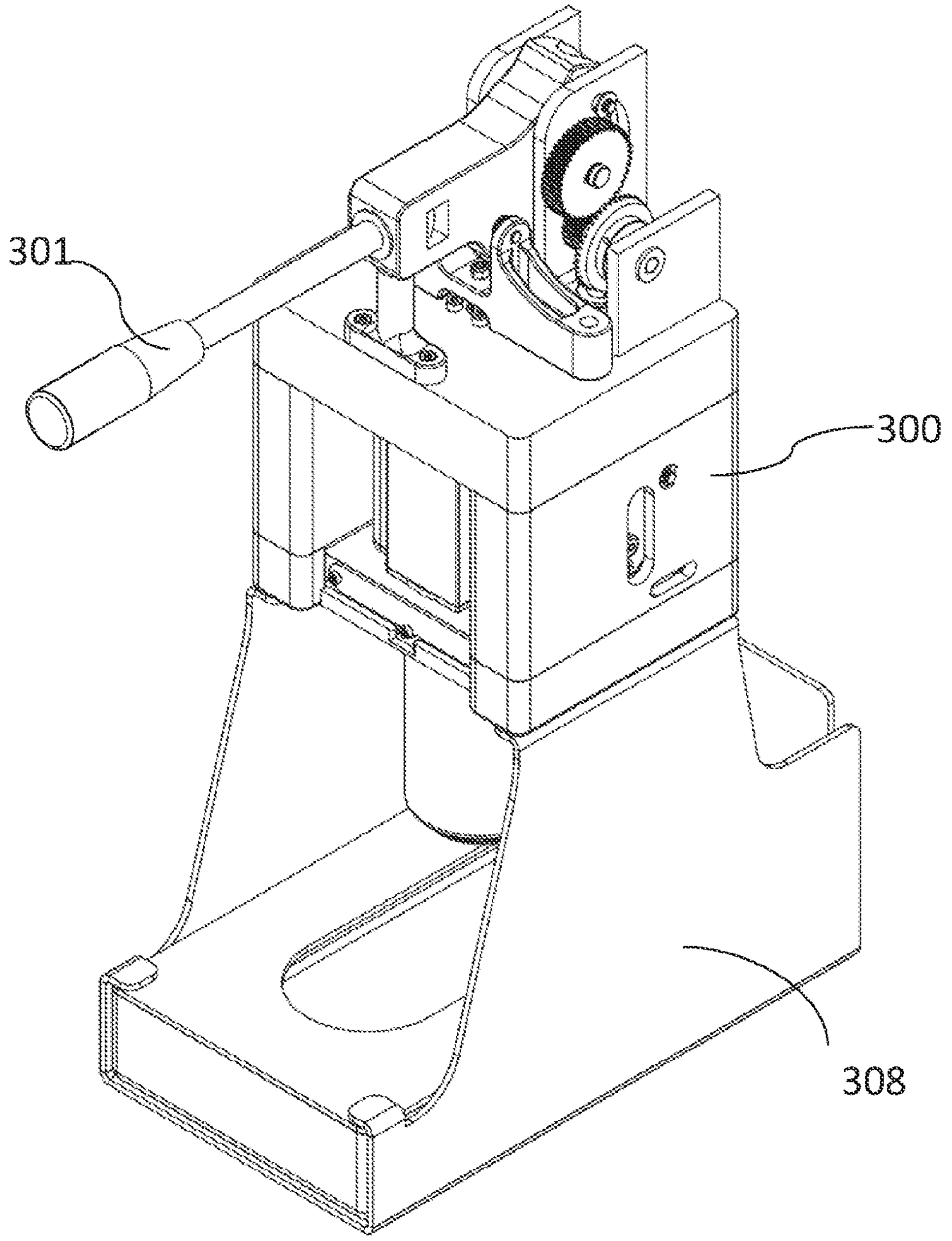
FIG. 59 is a perspective view of a container opener with a handle 301 in the down position.
Figure 60:
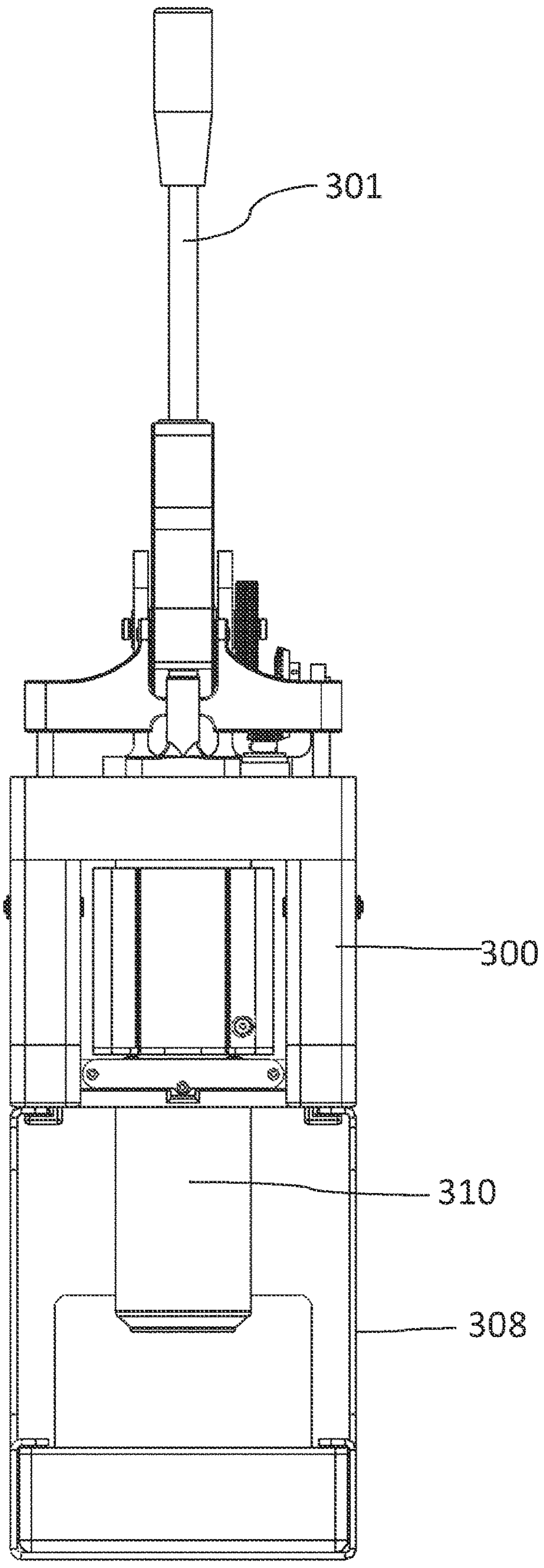
FIG. 60 is a front view of container opener with a handle in the up position.
Figure 61:
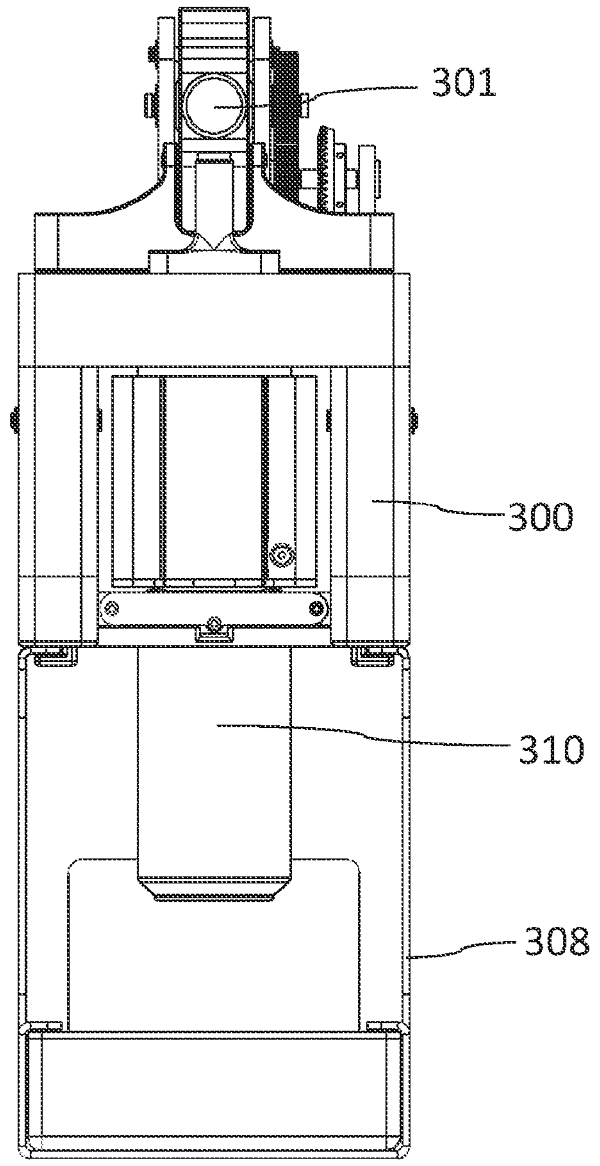
FIG. 61 is a front view of a container opener with a handle in the down position.
Figure 62:
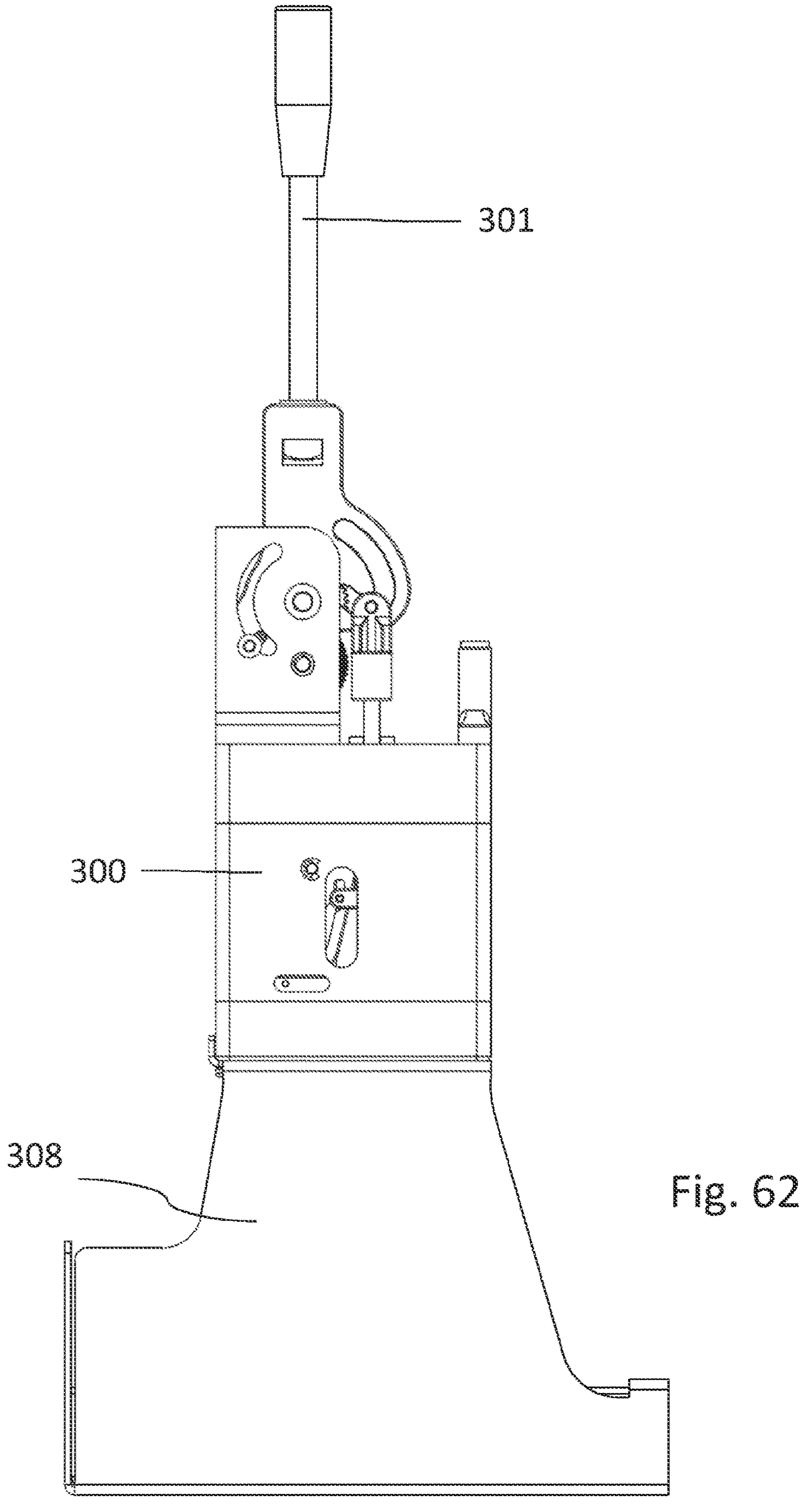
FIG. 62 is a left side view of a container opener with a handle in the up position.
Figure 63:
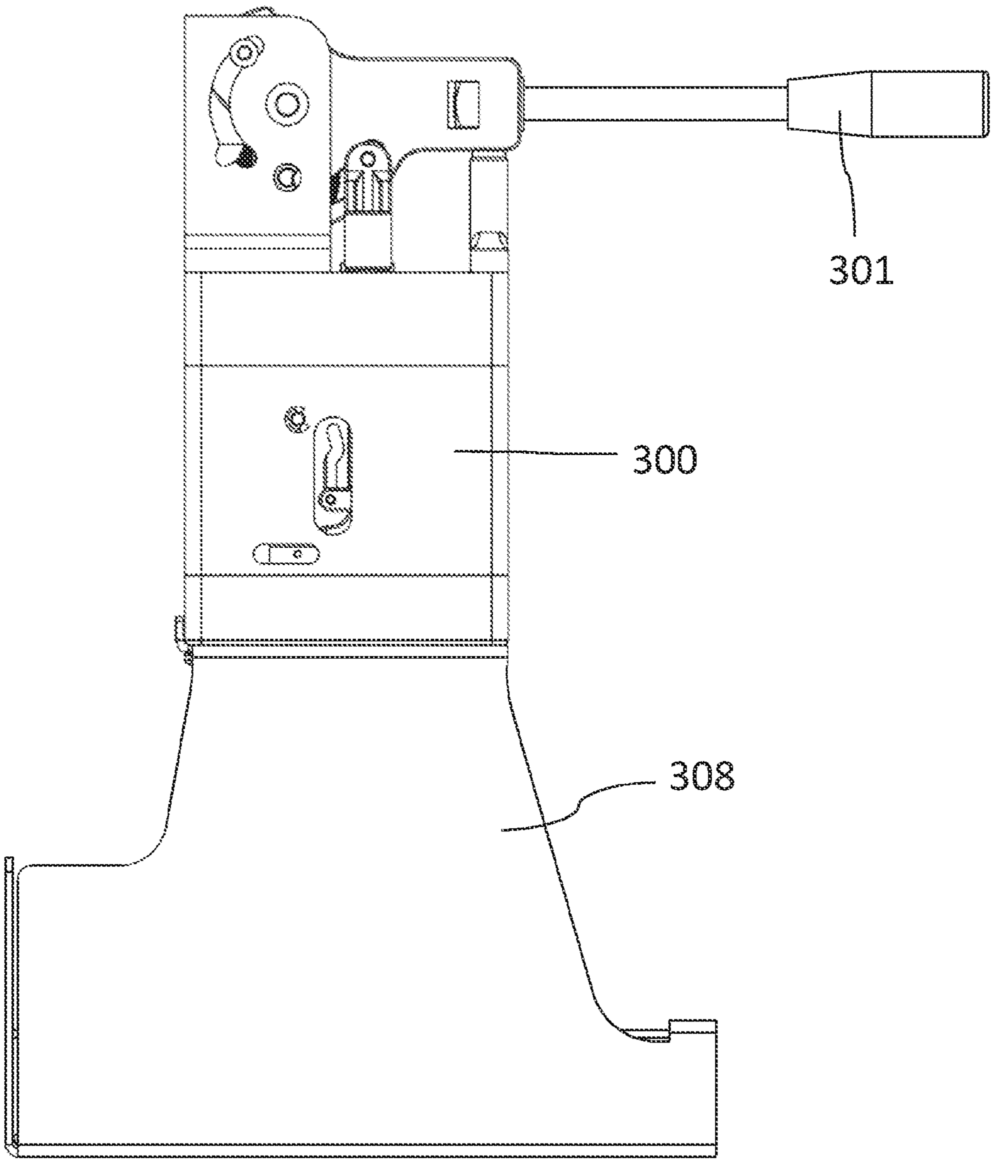
FIG. 63 is a left side view of a container opener with a handle in the down position.

FIG. 59 is a perspective view of the container opener 300 with the handle 301 in the down position. FIG. 60 is a front view of the container opener 300 with the handle 301 in the up position. FIG. 61 is a front view of the container opener 300 with the handle 301 in the down position. FIG. 62 is a left side view of the container opener 300 with the handle 301 in the up position. FIG. 63 is a left side view of the container opener 300 with the handle 301 in the down position.

Figure 64A:
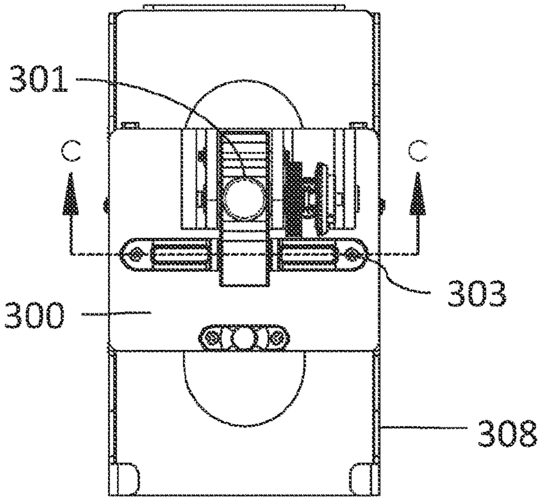
FIG. 64A is a top view of a container opener with a handle in the up position.
Figure 64B:
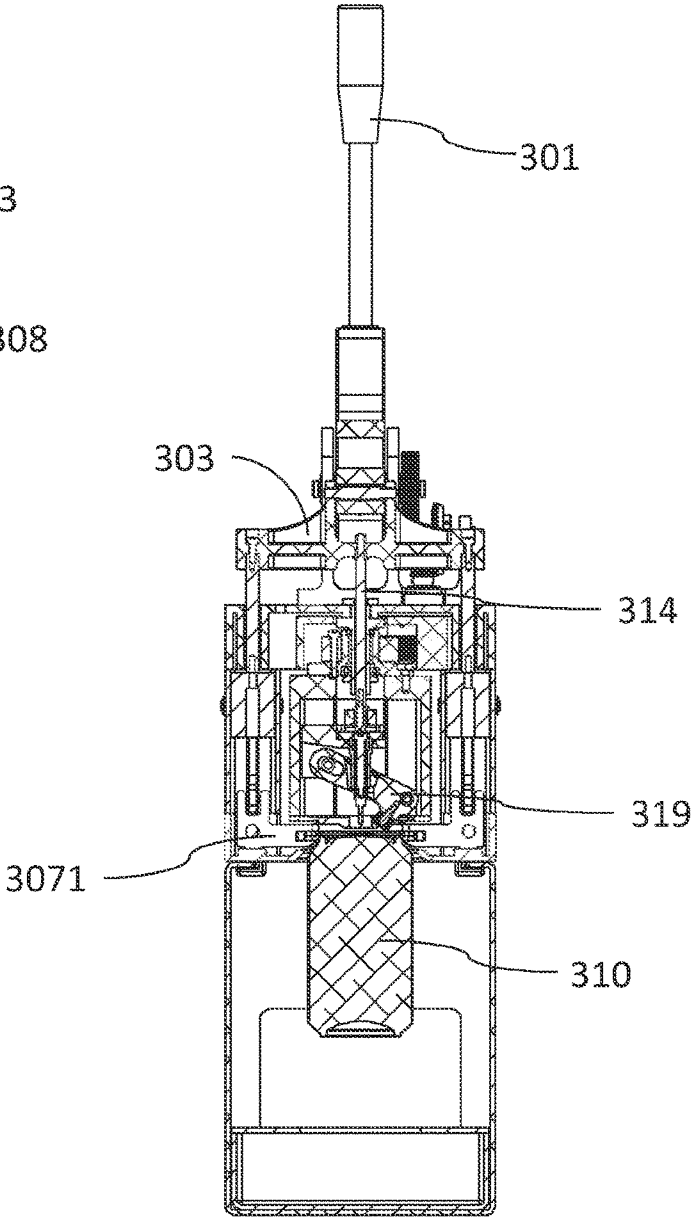
FIG. 64B is a front cross-section view taken along C-C of FIG. 64A.

FIGS. 64-85 are used to describe the operation of the container opener 300. FIG. 64A is a top view of the container opener 300 with the handle 301 in the up position. FIG. 64B is a front cross-section view taken along C-C of FIG. 64A. As the handle 301 rotates, the plunger carriage 303 moves vertically downwards and pushes clamps 3071 of the clamp assembly 307 inward to tightly clamp the can 310. The plunger carriage 303 pushes on a plunger shaft 314 which pushes a barb 306 into the lid of the can 310. This allows for removal of the lid after the lid is cut away from the can 310. A plunger shaft housing 3141 pushes on a slot in a blade arm 319 which rotates the blades into the wall of the can 310.

Figure 65A:
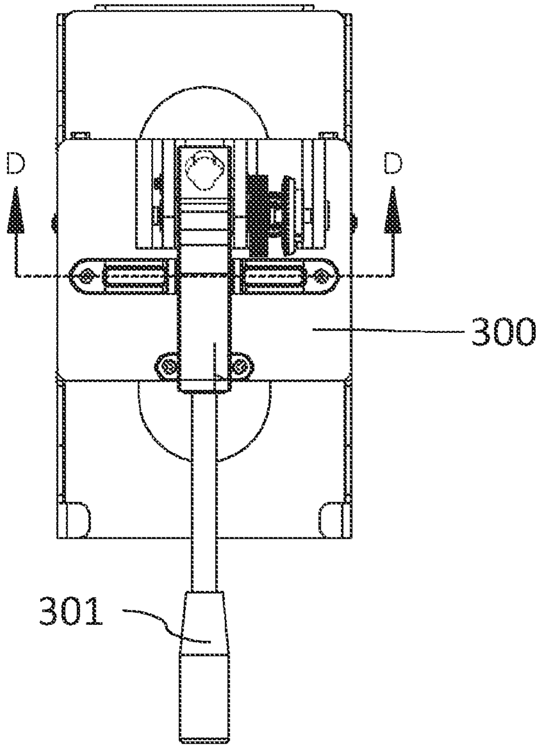
FIG. 65A is a top view of a container opener with a handle in the down position.
Figure 65B:
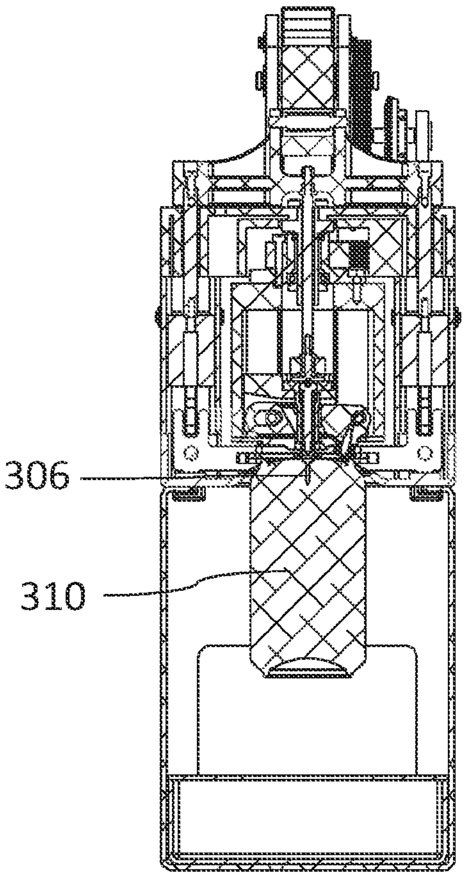
FIG. 65B is a front cross-section view taken along D-D of FIG. 65A.

FIG. 65A is a top view of the container opener 300 with the handle 301 in the down position. FIG. 65B is a front cross-section view taken along D-D of FIG. 65A. The plunger carriage 303 also provides vertical motion for the barb 306 to puncture the lid top before the cutting begins. After the cutting has completed and the lid is separated from the can body, the barb 306 retracts and removes the lid from the can 310. The open can 310 is then removed. Then, during the reject (upward) stroke when the handle 301 goes upwards past vertical, the lid drops below.

Figure 66A:
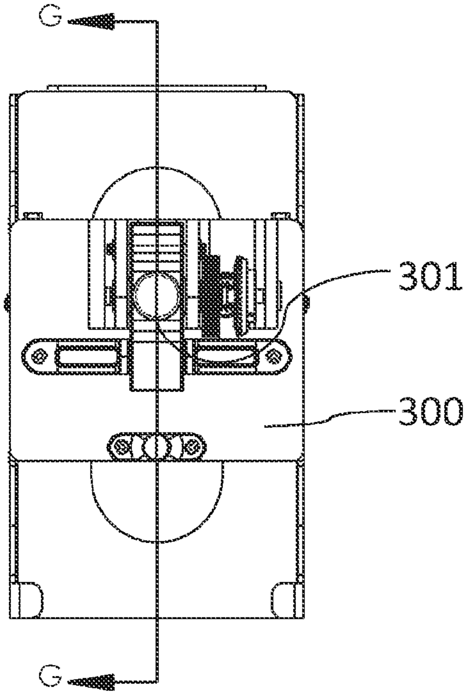
FIG. 66A is a top view of a container opener with a handle 301 in the up position.
Figure 66B:
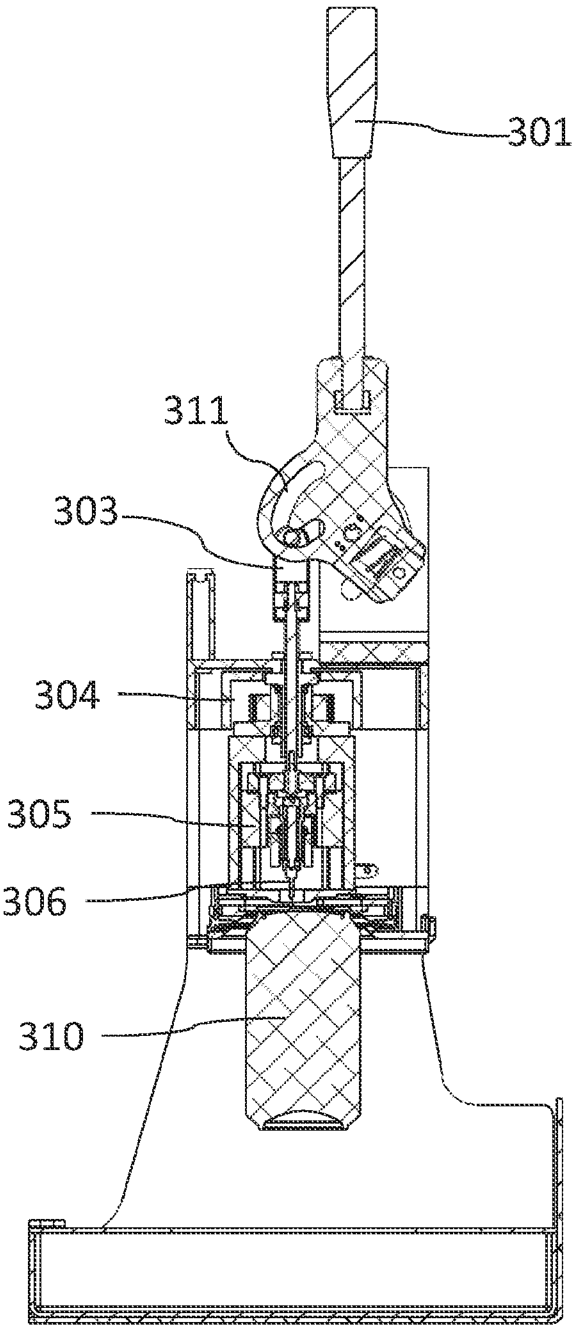
FIG. 66B is a right side cross-section view taken along G-G of FIG. 66A.

FIG. 66A is a top view of the container opener 300 with the handle 301 in the up position. FIG. 66B is a right side cross-section view taken along G-G of FIG. 66A. The cam slot 311 of the handle 301 has two sections: a vertical motion portion pushes the plunger carriage 303 down to a set distance, and a rotary motion portion of the cam slot 311 that is concentric with the pivot of the handle 301 which locks the plunger carriage 303 in its lower position and allows the handle 301 to continue to rotate without moving the plunger carriage 303 to drive a gear train of the gear assembly 304 in turn spinning the blade assembly 305.

Figure 67A:
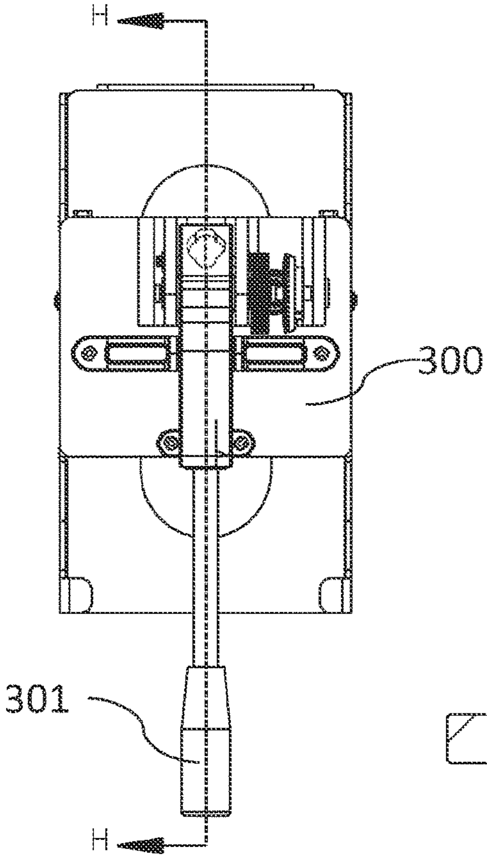
FIG. 67A is a top view of a container opener with a handle in the down position.
Figure 67B:
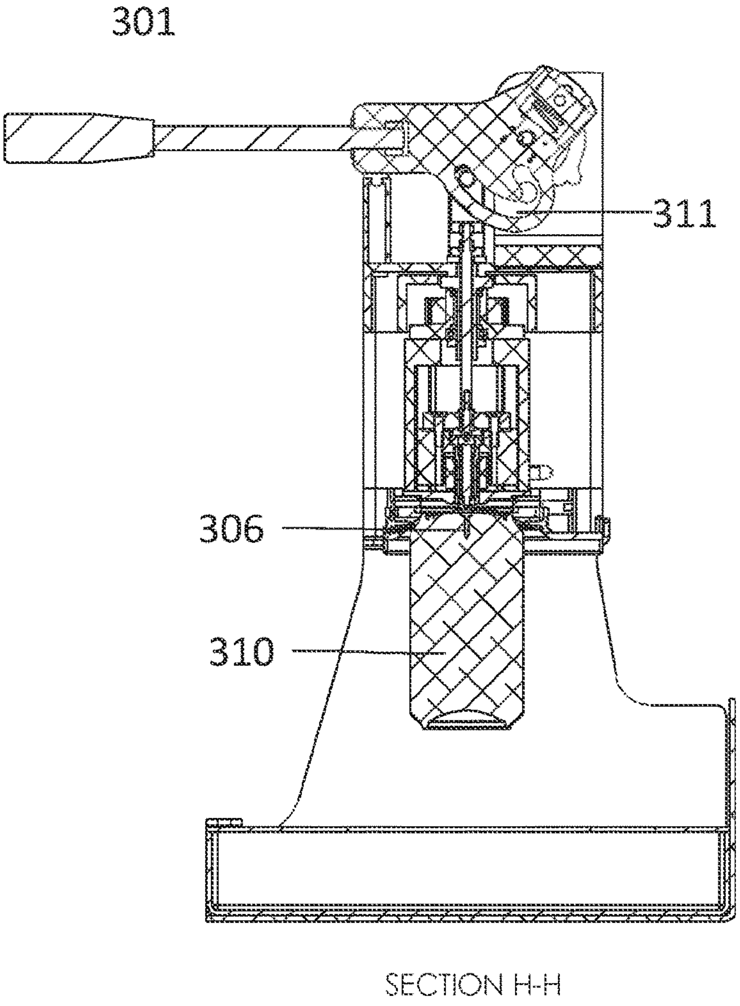
FIG. 67B is a right side cross-section view taken along H-H of FIG. 67A.

FIG. 67A is a top view of the container opener 300 with the handle 301 in the down position. FIG. 67B is a right side cross-section view taken along H-H of FIG. 67A.

Figure 68:
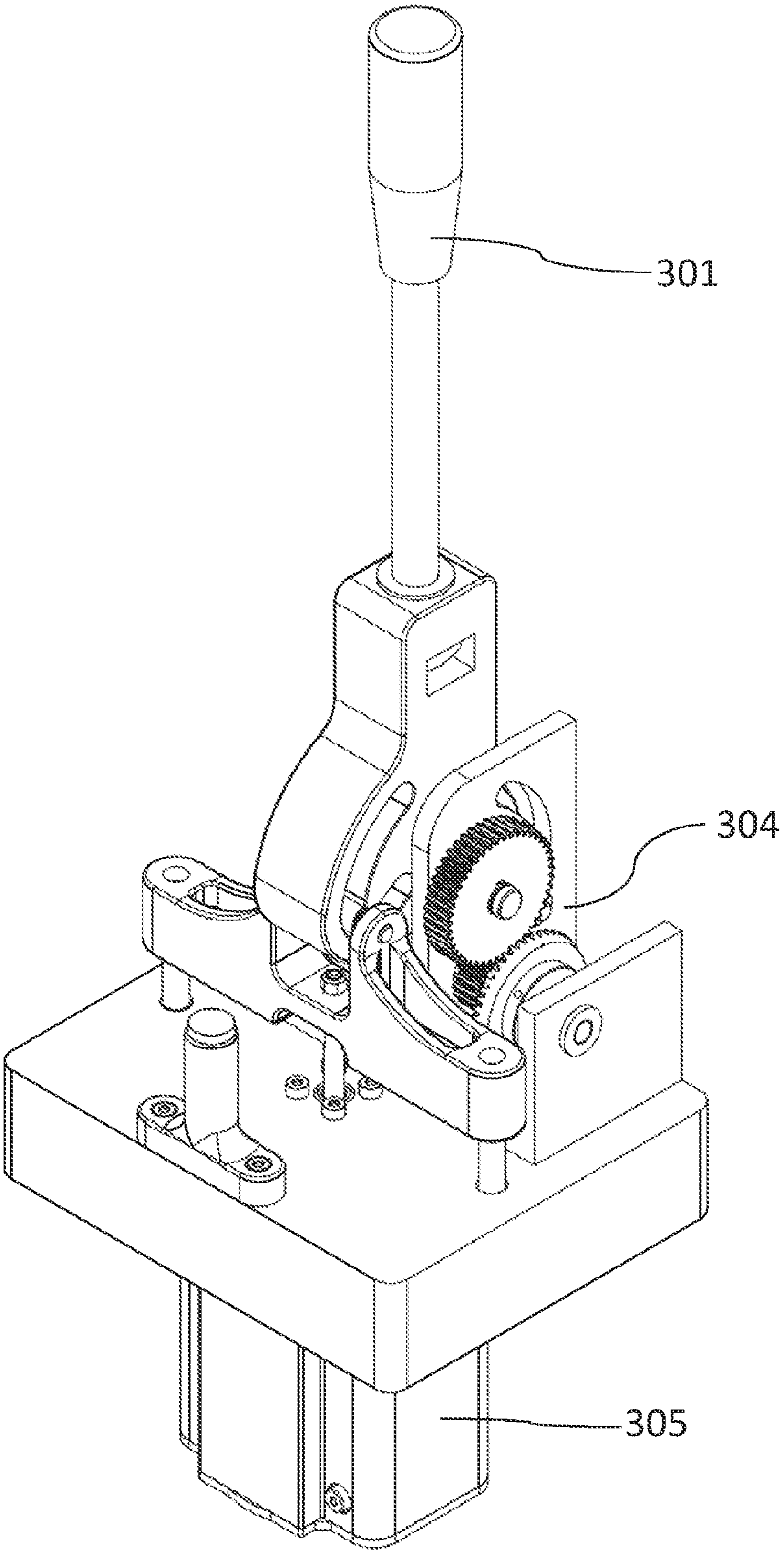
FIG. 68 is a perspective view of a handle and a gear assembly.
Figure 69:
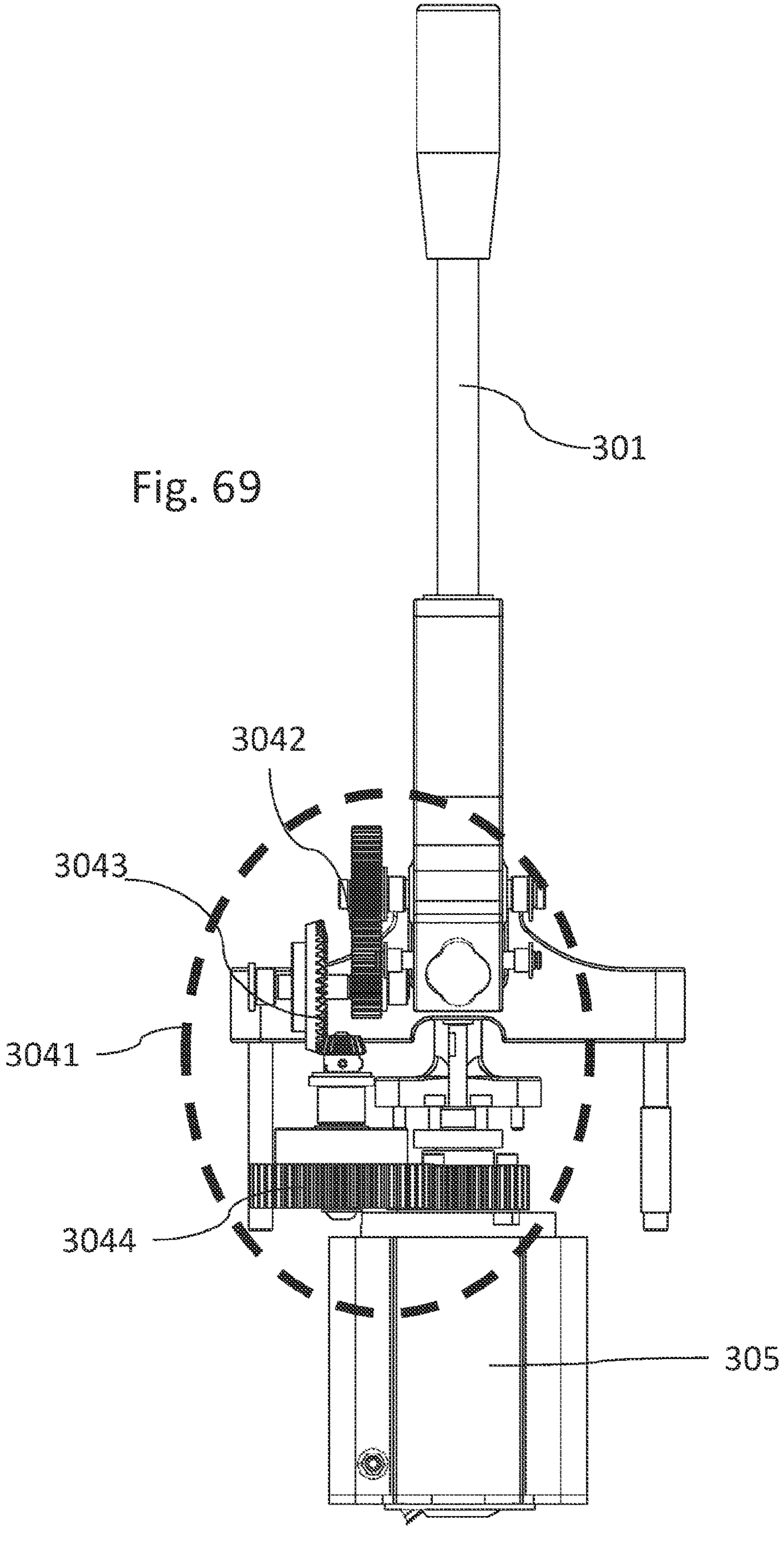
FIG. 69 is a view of a gear train.

FIG. 68 is a perspective view of the handle 301 and gear assembly 304. FIG. 69 is a view of a gear train 3041 (within the dotted circle) and the blade assembly 305. The gear train 3041 provides rotational motion to the blade assembly 305. A first set of spur gears 3042 transfers to a set of bevel gears 3043 to rotate the blade assembly 305. The first set of spur gears 3042 transmit the handle torque to the bevel gears 3043 through a gear ratio. The bevel gears 3043 change the direction of motion. The bevel gears 3043 then transmit torque through a second set of spur gears 3044 (with a gear ratio) to provide rotation of the blade assembly 305.

Figure 70A:
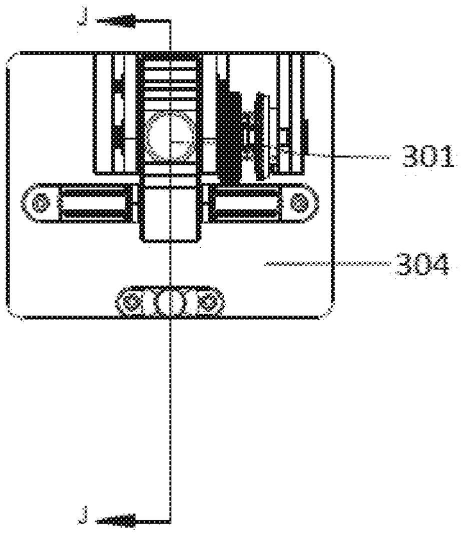
FIG. 70A is a top view of a handle and a gear assembly with the handle in the up position.
Figure 70B:
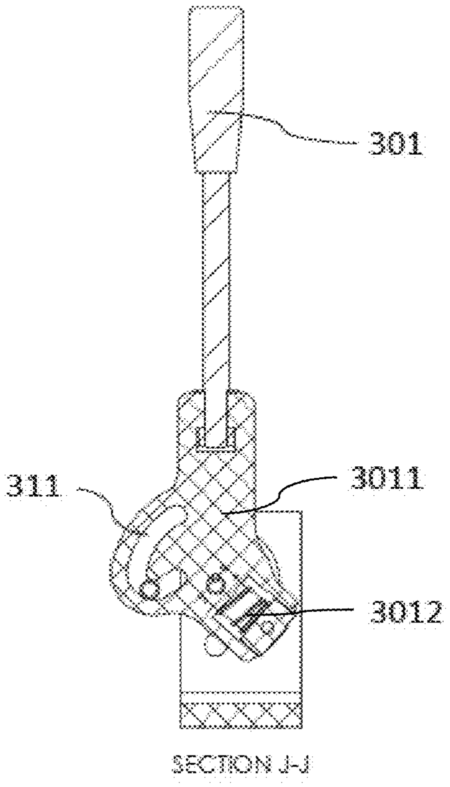
FIG. 70B is a right side cross-section view taken along J-J of FIG. 70A.
Figure 71A:
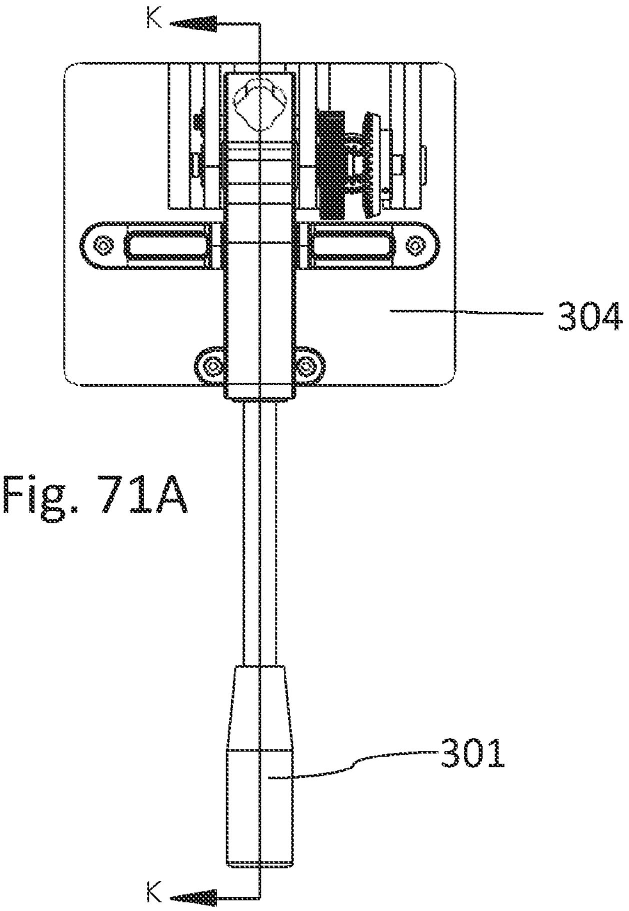
FIG. 71A is a top view of a handle and a gear assembly with the handle in the down position.
Figure 71B:
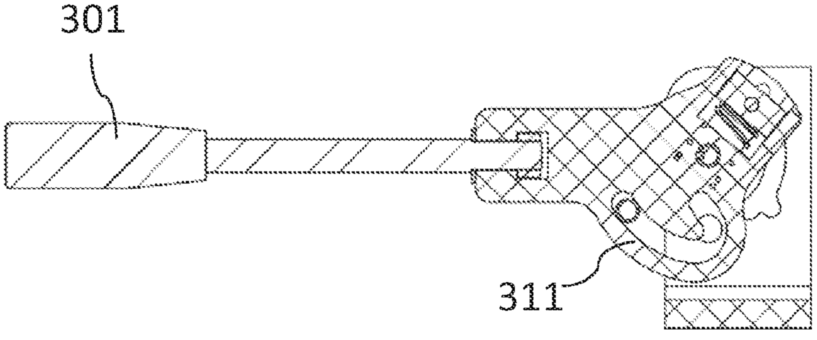
FIG. 71B is a right side cross-section view taken along K-K of FIG. 71A.

FIG. 70A is a top view of the handle 301 and gear assembly 304 with the handle 301 in the up position. FIG. 70B is a right side cross-section view taken along J-J of FIG. 70A. FIG. 71A is a top view of the handle 301 and gear assembly 304 with the handle 301 in the down position. FIG. 71B is a right side cross-section view taken along K-K of FIG. 71A. The cam slot 311 in the handle 301 creates the plunger carriage's 303 vertical motion, then the cam slot 311 becomes concentric with the pivot, so the vertical motion stops, but the rotational motion continues to spin the gears, spinning the blade assembly 305 to complete the cut of the lid from the can 310.

Figure 72:
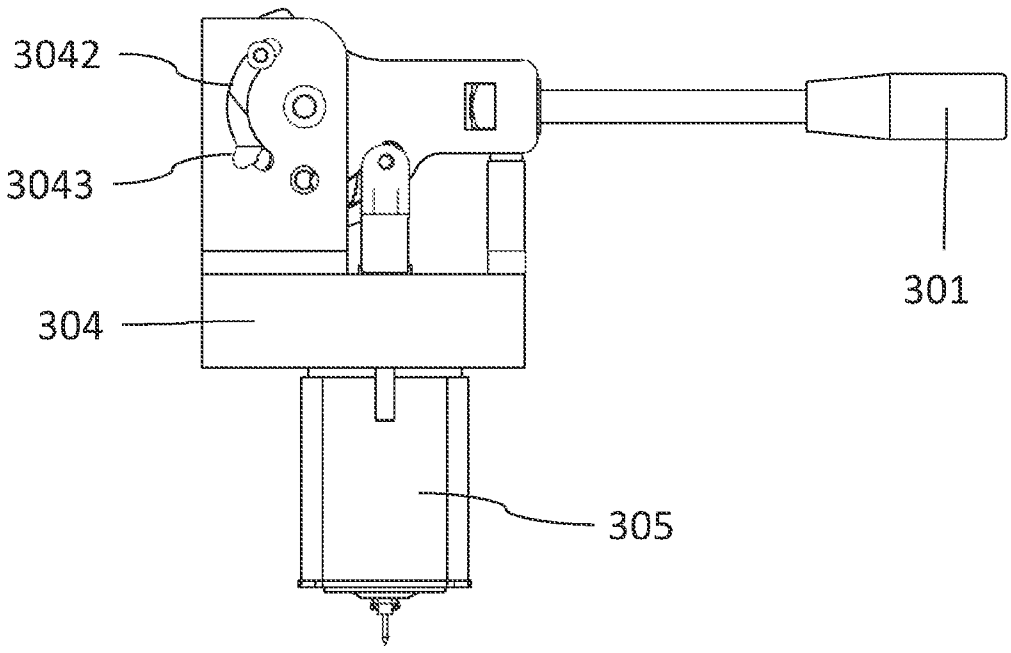
FIG. 72 shows a handle in the down position.
Figure 73:
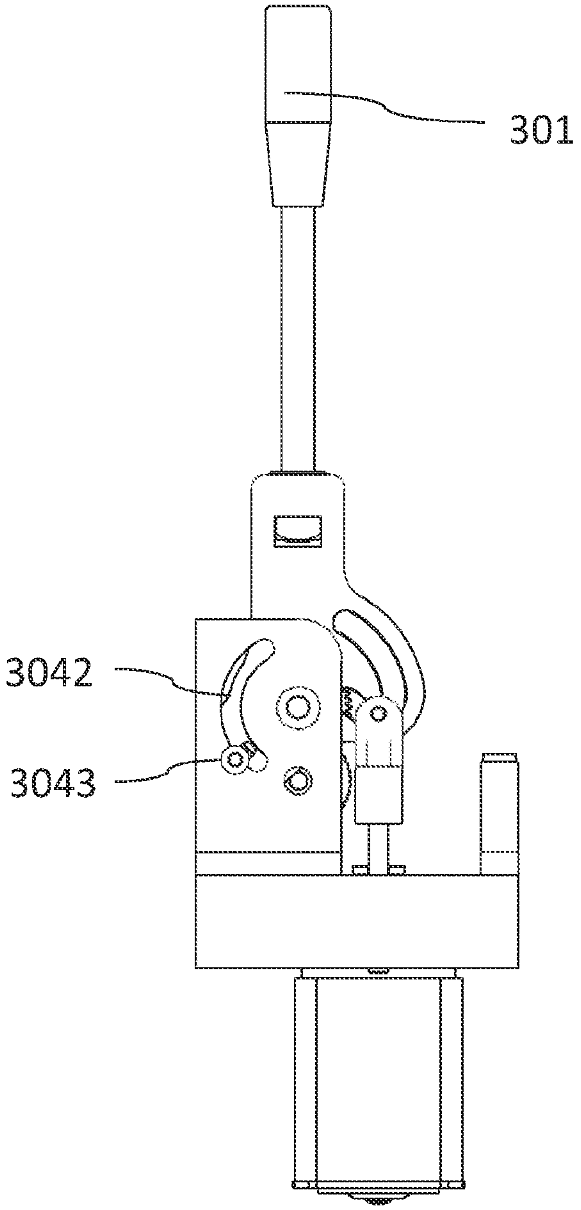
FIG. 73 shows a handle in the up position.
Figure 74:
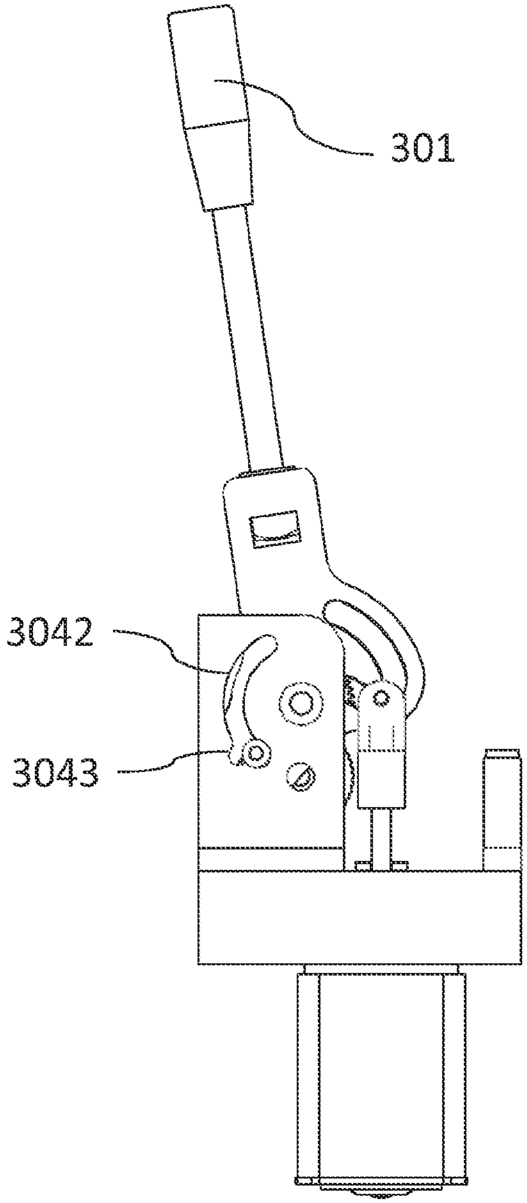
FIG. 74 shows a handle in the past-vertical position.

FIGS. 72-76 are used to describe how a cutoff lid is rejected. FIGS. 72-74 are left side views of the handle 301 and gear assembly 304. FIG. 72 shows the handle 301 in the down position. FIG. 73 shows the handle 301 in the up position. FIG. 74 shows the handle 301 in the past-vertical position. A slot 3042 in the gear assembly 304 can include a detent 3043 to keep the handle 301 in an upright position. When a user retracts the handle 301, the motion will hit this detent 3043 to impede upward motion of the handle 301 before continuing to the reject phase of the motion, which is the past-vertical position. There is a spring 3012 inside a handle cam 3011 (best viewed in FIG. 70B) that provides outwards force to keep a roller in the detent 3043. FIG. 74 shows that the handle 301 must be continued to be pushed backward (past-vertical) to reject the lid of the can 310.

Figure 75A:
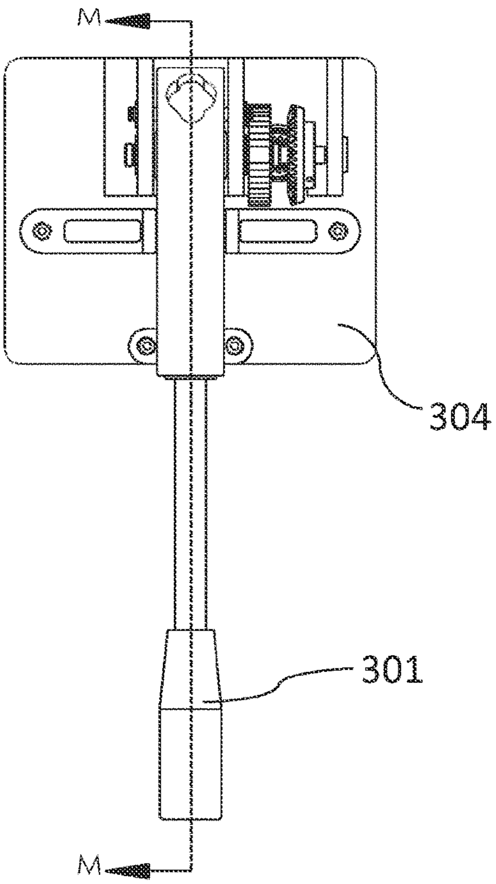
FIG. 75A is a top view of a handle and a gear assembly with the handle in the down position.
Figure 75B:
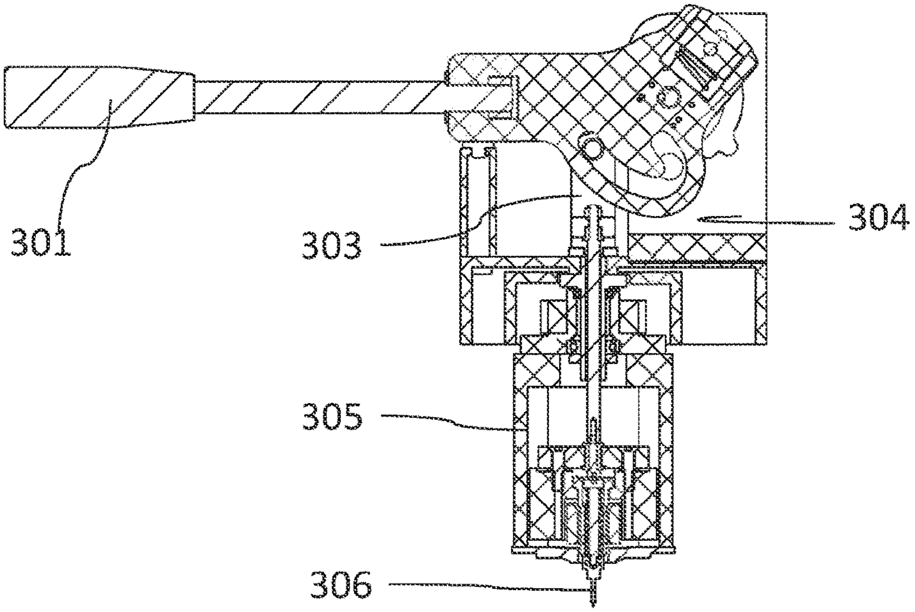
FIG. 75B is a right side cross-section view taken along L-L of FIG. 75A.
Figure 76A:
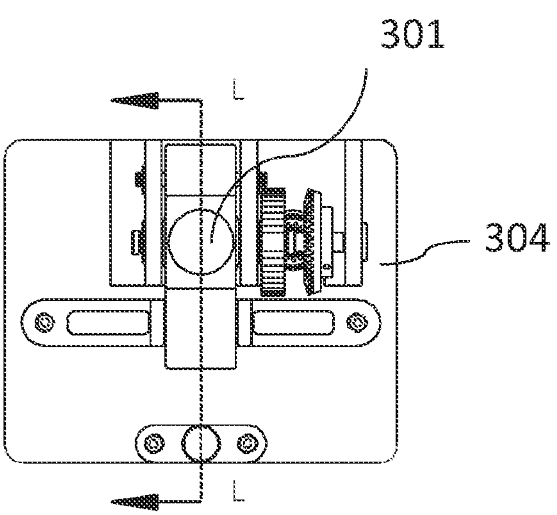
Figure 76B:
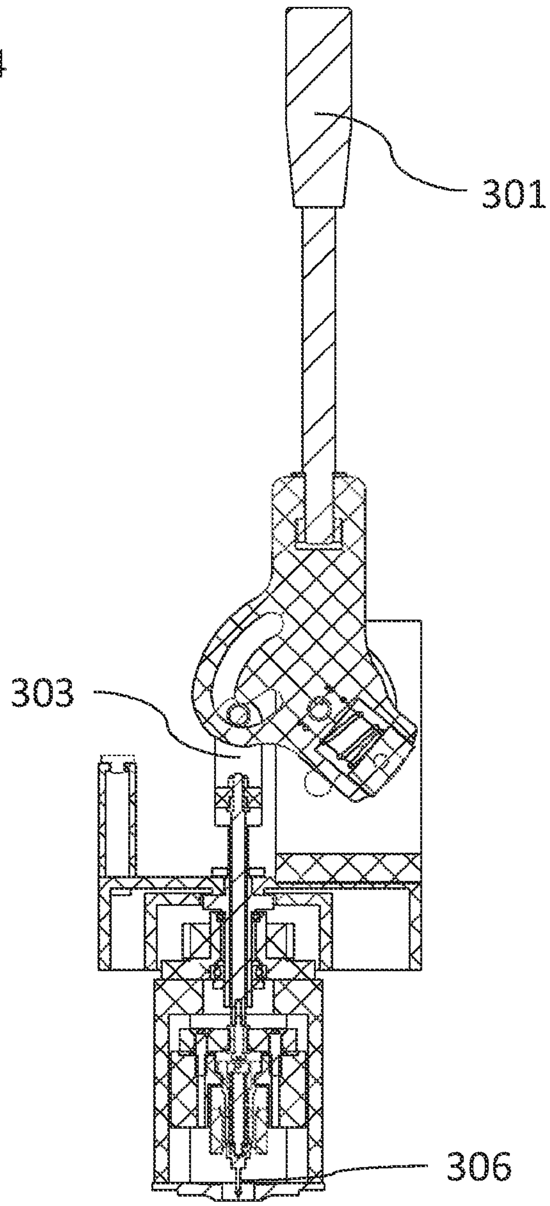

FIG. 75A is a top view of the handle 301 and gear assembly 304 with the handle 301 in the down position. FIG. 75B is a right side cross-section view taken along L-L of FIG. 75A. FIG. 76A is a top view of the handle 301 and gear assembly 304 with the handle 301 in the up position. FIG. 76B is a right side cross-section view taken along M-M of FIG. 76A. The plunger carriage 303 provides the downward force via the downward handle motion to push the barb 306 into the top of the can 310. The barb 306 is guided on a separate shaft with a light spring to allow for the barb 306 to lag. The lag is necessary to be able to remove the can before the cutoff lid rejects back into the drink.

Figure 77:
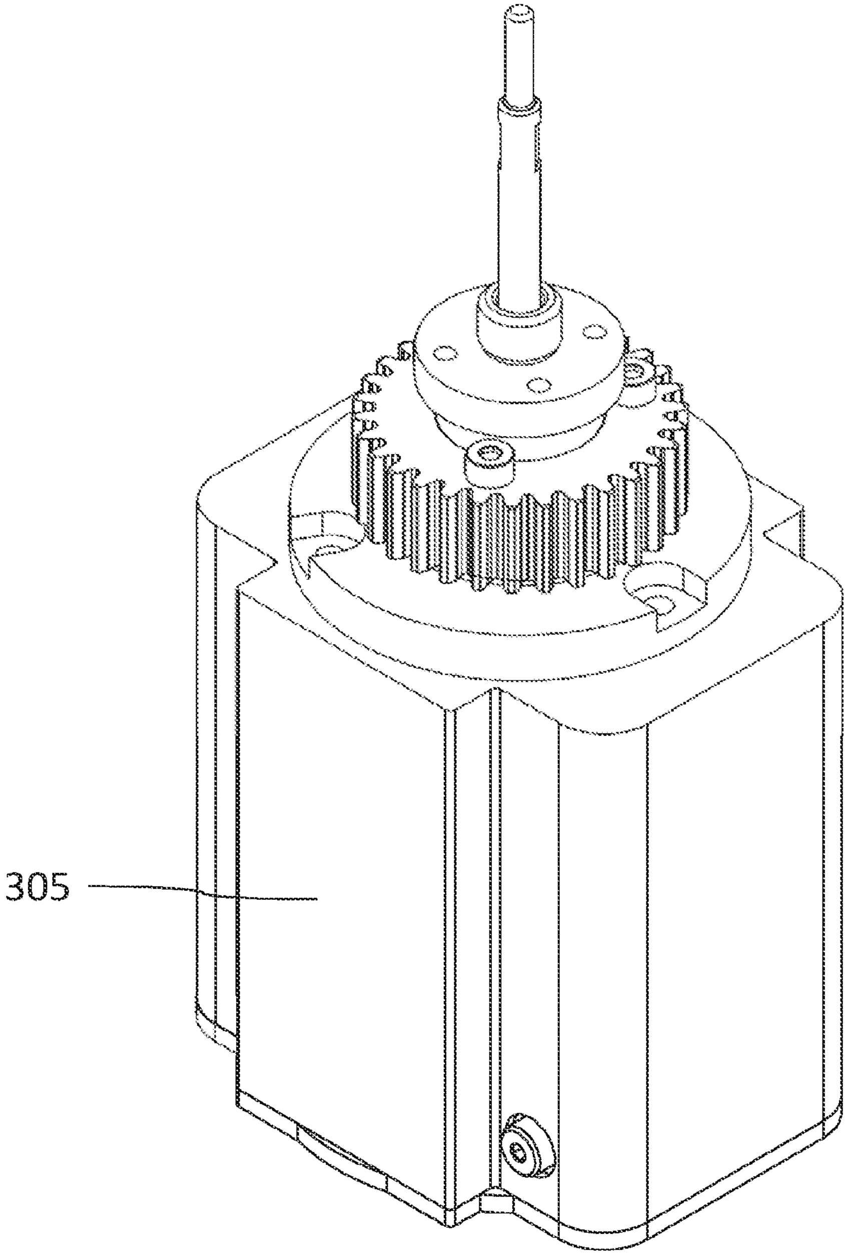

FIGS. 77-81 are used to describe the blade assembly 305. FIG. 77 is a top perspective view of the blade assembly 305. FIG. 78A is a top view of the blade assembly 305. FIG. 78B is a front cross-section view taken along N-N of FIG. 78A with a scaled version of Detail P. As the plunger shaft 314 is lowered, it pushes the blade spring block 318 down, pushing the blade springs (not shown) that push the blade bushing block 316. The blade bushing block 316 then pushes down on the blade arm 319 (through a cam in a slot) to rotate the blade arm 319 counterclockwise extending the blade 315 toward the inner rim of the can 310. The blade bushing block 316 also extends the barb 306 towards the can 310.

FIG. 79A is a top view of the blade assembly 305. FIG. 79B is a front cross-section view taken along R-R of FIG. 79A with a scaled version of Detail U. Once the blade 315 contacts the can 310, the blade arm 319 is now locked into position, but the plunger shaft 314 must continue travelling downward to force the barb 306 to puncture the lid of the can 310. For this to happen, the blade springs can compress allowing the extra travel needed for the plunger shaft 314. This compression also provides a set range of contact force on the blade 315 to accommodate for tolerances within components of the container opener 300 or tolerances of the diameter of the can 310. At the end of the stroke, the barb 306 punctures the center of the can 310 and continues to depress the lid of the can 310 to create downward pressure that helps separate the lid from the can body after it has been cut. Once the blade assembly 305 has spun 360+ degrees the can lid is separated from the can body and the can lid is now resting on a lip of the barb 306.

FIG. 80A is a top view of the blade assembly 305. FIG. 80B is a front cross-section view taken along V-V of FIG. 80A with a scaled version of Detail Y. With the can lid 3101 severed from the can body, the upward sequence now takes place. As the plunger shaft 314 retracts due to moving the handle 301 upward, the blade springs decompress and the blade spring block 318 bottoms out to pull the blade bushing block 316 up. This rotates the blade arm 319 clockwise to retract the blade 315 and the barb 306. This motion then pulls the can lid 3101 out of the can body until the can lid 3101 hits the blade bottom cover 317.

For the top level sequence to occur, the can clamp must release the can 310 before the lid 3101 is removed from the barb 306 to avoid the lid 3101 being dropped in the open can 310. This means the handle 301 would need to return to its vertical position which would return the blade assembly 305 to its state shown in FIGS. 78A and 78B. However, because the can lid 3101 is sitting on the barb 306 the thickness of the can lid 3101 now prevents the barb 306 from reaching its "home" position. In order to address this, the barb 306 is attached to a shaft 3061 with a light spring. This spring allows the can lid 3101 to "lag" and create a gap GAP between the barb 306 and the blade bushing block 316. This lag allows the blade bushing block 316/plunger shaft 314 to return to their home positions correlating with the vertical position of the handle 310. If this lag was not present, the handle 310 would return to its vertical position and force the barb 306 through the can lid releasing the can lid 3101 into the open can 310 below the can lid 3101.

FIG. 81A is a top view of the blade assembly 305. FIG. 81B is a front cross-section view taken along AA-AA of FIG. 81A with a scaled version of Detail AC. At this stage, the can 310 has been removed, the can lid 3101 is pinned between the step on the barb 306 and the blade bottom cover 317. The handle 301 is then rotated to the past-vertical position to the "reject" position. As this happens, the plunger shaft 314/blade bushing block 316 move upwards. This causes the barb shaft 3061 to continue to extend (compressing the spring) until the head of the barb shaft 3061 bottoms out on the step 3161 in the blade bushing block 316. The lagging of the barb 306 is now completed and the remainder of the reject stroke of the handle 301 pulls the barb 306 through the can lid 3101, ejecting the can lid 3101 from the barb 306, shown in FIG. 81B.

FIGS. 82-85 are used to describe the clamp assembly 307. FIGS. 82A and 83A are views of a plunger 3031 of the plunger carriage 303 and clamp assembly 307. FIGS. 82B and 83B are top views of the clamp assembly 307. The plunger's 3031 downwards motion forced by handle 301 also pushes a roller in a clamp cam arm 322 that closes the clamps 321. A profile of a clamp cam slot 323 in the clamp cam arm 322 closes the clamps 321 quickly before the barb 306 or blade 315 punctures the can 310. During the remainder of the downward stroke, the clamps 321 are kept closed by a vertical portion of the clamp cam slot FIGS. 84 and 85 are side views of the clamp assembly 307. At the "home position", when the handle 301 is vertical, there is enough space between the clamps 321 and the can 310 to comfortably insert the can 310 in the container opener 300, shown in FIG. 84. On the downward stroke, the clamps 321 would then close around the can 310 to hold it in place before the barb 306 or the blade 315 punctures the can lid, shown in FIG. 85. A urethane strip 3074 provides friction to keep the can 310 from rotating during cutting. Over time, it is to be expected that an edge that a lip of the can 310 sits on will wear down. Therefore, there is a can insert 3075 inside of the clamps 321 that can be easily replaced.

In an another aspect, FIG. 86 shows an alternative configuration where instead of gears that rotate the blade assembly 305, there is a motor 324 that is operated by a switch 325 that can be a push button. The switch 325 can be depressed when the plunger carriage 303 is lowered during the downward stroke of the handle 301. The motor 324 can be connected to gearing inside a housing. The cutting and removal of the can lid is identical to what is described above.

FIGS. 87-101 are used to describe a container opener 400 of a fourth embodiment of the present disclosure where the container opener 400 includes an electric motor.

FIG. 87 is a top perspective view of the container opener 400 with the handle 401 in the up position and a can 410 in position. FIG. 88 is a top perspective view of the container opener 400 with the handle 401 in the down position. FIGS. 89-101 are used to describe operation of the container opener 400.

FIG. 89 is a top view showing the can 410 in position before being pushed into clamps 421. At this stage, the clamps 321 and clamp flaps 4076 are sprung inwards to hardstops. In FIG. 90, the can 410 has engaged the clamps 421. The can 410 pushes the clamps 421 outward and compresses the clamp springs 4211. As shown, there can be two clamp springs 4211 per clamp 421. The clamp springs 4211 provide equal pressure on the left and right clamps 421 keeping the can 410 centered.

FIG. 91 is a front view of FIG. 90 showing how the can 410 interacts in the clamps 421. There is a channel 4212 cut in each of the can clamps 421 that permit the can rim to rest on the bottom of the channel 4212. The wall at the bottom of the channel 4212 pushes against the can body just under the can rim. FIG. 92 is a top view showing the can 410 continued to be pushed forward causing the can flaps 4076 to push outward compressing their springs 4077. FIG. 93 shows the can 410 after being pushed all the way into the clamps 421 until the can 410 reaches a drive wheel 413. At this stage, the can flaps 4076 are sprung outward to hook around a side of the can 410, keeping the can 410 temporarily in place. The can clamps 421 are sprung inward holding the can 410 centered. The can clamps 421 secure the can 410 during the cut to prevent the can 410 from tipping while being cut.

FIG. 94A is a top view with the can 410 in position and FIG. 94B is cross-section view along J-J of FIG. 94A showing the can 410 against the drive wheel 413. The drive wheel 413 can include a channel cut into it that allows the rim of the can 410 to rest on the bottom of the channel. There is also a friction surface that rests against the outer rim of the can 410. This will provide the necessary friction to spin the can when the blade applies a force to the inside of the rim.

FIG. 95A is a top view with the can 410 in position and FIG. 95B is cross-section view along J-J of FIG. 95A showing the can 410 against the drive wheel 413. As shown in Detail N, the drive wheel 413 has a channel 4131 defined into it that allows the rim of the can 410 to rest on the bottom of the channel 4131. There is also a friction surface 4312 forcing against the outer rim of the can 410. This will provide the necessary friction to spin the can 410 when the blade applies a force to the inside of the rim.

FIG. 96A is a top view with the can 410 clamped in position and FIG. 96B is a cross-section view along M-M of FIG. 96A showing the can 410 against the drive wheel 413. This is showing how the can is resting in the channels 4212 in the can clamps 421.

FIG. 97A is a top view with the can 410 clamped in position and the handle 401 up. FIG. 97B is cross section view along C-C of FIG. 97A. FIG. 97B shows how the blade 415 and a tab grabber 406 are mounted to the handle 401 and are moved away from the can 410 when the handle 401 is up. The handle 401 is held up by a spring 4011 at the rear of the handle 401. A lid remover 404 is also retracted with a spring 4041. There is also an electrical switch 425 below the handle 401 that actuates the motor 424 that spins the drive wheel 413. At this stage, the switch 425 is not engaged.

FIG. 98A is a top view with the can 410 clamped in position and the handle 401 down. FIG. 98B is cross section view along D-D of FIG. 98A. At this stage, as the handle 401 is pulled down, the blade 415 is engaged with the inner rim of the can 410. This forces the can 410 against the drive wheel 413. The force applied from the blade 415 creates enough friction between the can rim and the drive wheel friction surface 4312 to spin the can 410. The tab grabber 406 is also pushed against the top of the can 410. When the handle 401 comes down, this action engages the electrical switch 425. This provides power to the motor 424 to spin the drive wheel 413 and the can 410.

FIG. 99A is a side view with the can 410 clamped in position and the handle 401 down. FIG. 99B is cross section view along G-G of FIG. 99A. When the electrical switch is engaged, the motor turns the drive wheel 413, in turn rotating the can 410. During the rotation of the can 410, the tab of the can 410 turns with the can 410 until it is forced on top of one of the feet 4062 of the tab grabber 406. Once the tab of the can 410 reaches the vertical wall 4061 of the tab grabber 406, the tab is hooked and does not continue to spin. The can tab then remains stationary while the can 410 continues to spin to finish cutting the can lid.

FIG. 100A is a top view with the can 410 clamped in position and the handle 401 up. FIG. 100B is cross section view along E-E of FIG. 100A. Once the can lid 4101 is cut, the user would then lift up the handle 401. This would disengage the electrical switch 425 turning off the motor 424. Because the can tab is hooked on the tab grabber 406, the can lid 4101 will be removed with the upward action of the handle 401. This action also retracts the blade 415 away from the can 410.

FIG. 101A is a top view with the handle 401 up. FIG. 101B is cross section view along F-F of FIG. 101A. After the handle 401 is lifted upward, the can 410 is then pulled out of the clamps 421 in the reverse sequence as described above. After that, the user would push on the lever of the lid remover 404 to eject the can lid 4101 off the tab grabber 406 ending the operation sequence.

FIG. 102 is a top view of another configuration of a can clamp 500 shown open. FIG. 103 is a top view of the clamp 500 closed. A left clamp 502 can be manually closed by rotating a handle 501 clockwise by a user. The left clamp 502 pulls a right clamp 503 closed through a clamp spring 504. The left clamp 502 is held closed by a latch 505 and the right clamp 503 is held closed with the clamp spring 504. The clamp spring 504 ensures that a can is securely clamped between the left clamp 502 and the right clamp 503 when the clamp 500 is closed. The clamp 500 can be unlocked by a roller on a handle of a container opener to which the clamp 500 has been incorporated. The roller on the handle of the container opener can hit a flag that rotates a roller 506 to open the latch 505.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the disclosure.

What is claimed is:

1. A container opener comprising:

a clamp that holds a container;

a puncturing device that punctures a lid of the container held in the clamp;

a blade that cuts the lid from the container while the blade and the container rotate with respect to each other;

a separating device that separates the puncturing device from the lid; and a handle, wherein motion of the handle in a downward direction moves the clamp inward to hold the container, moves the blade to be in contact with the container, and rotates the blade and the container with respect to each other.

2. The container opener of claim 1, further comprising:

a handle cam attached to the handle that allows motion of the handle to travel backward past vertical.

3. The container opener of claim 1, wherein motion of the handle in the first downward direction forces the puncturing device to puncture the lid.

4. The container opener of claim 1, wherein motion of the handle in an upward direction causes the separating device to separate the puncturing device from the lid.

5. The container opener of claim 1, wherein the clamp is configured to hold containers having different diameters.

6. The container opener of claim 5, wherein the puncturing device moves a set distance to puncture the lid no matter a diameter of the container.

7. The container opener of claim 1, further comprising a motor that rotates the blade and the container with respect to each other.

8. The container opener of claim 1, wherein the blade is a plurality of blades.

9. The container opener of claim 8, wherein the plurality of blades and the container rotate at least 120 degrees with respect to each other.

10. The container opener of claim 1, wherein the blade and the container rotate at least 360 degrees with respect to each other.

11. The container opener of claim 1, wherein the puncturing device punctures the lid in a central portion of the lid.

12. A method of opening a container, the method comprising:
clamping the container;
puncturing a lid of the container by a puncturing device;
capturing the lid by the puncturing device;
rotating a blade and the container with respect to each other to cut the lid from the container;
unclamping the container; and
separating the puncturing device from the lid, wherein motion of a handle in a downward direction causes the clamping, the puncturing, and the rotating.

13. The method of claim 12, wherein motion of the handle in a backward past vertical direction causes the separating.

14. The method of claim 12, wherein motion of the handle in an upward direction causes the unclamping.

15. The method of claim 12, wherein the blade and the container rotate at least 120 degrees with respect to each other.

16. The method of claim 12, wherein the blade and the container rotate at least 360 degrees with respect to each other.

17. The method of claim 12, wherein the rotating is performed by a motor.

18. The method of claim 12, wherein the blade rotates and the container is stationary.

* * * * *